(12) United States Patent
Chan

(10) Patent No.: US 12,156,316 B2
(45) Date of Patent: Nov. 26, 2024

(54) FACILITY COMMUNICATION AND/OR LOCATION APPARATUS AND SYSTEM

(71) Applicant: INDOORSIGHTS LIMITED, Auckland (NZ)

(72) Inventor: Paul Kim Chan, Epsom (NZ)

(73) Assignee: INDOORSIGHTS LIMITED, Auckland (NZ)

( * ) Notice: Subject to any disclaimer, the term of this patent is extended or adjusted under 35 U.S.C. 154(b) by 0 days.

(21) Appl. No.: 17/408,126

(22) Filed: Aug. 20, 2021

(65) Prior Publication Data

US 2022/0061141 A1 Feb. 24, 2022

Related U.S. Application Data

(63) Continuation-in-part of application No. 16/642,950, filed as application No. PCT/IB2018/056538 on Aug. 28, 2018, now Pat. No. 11,127,266.

(30) Foreign Application Priority Data

Aug. 28, 2017 (AU) .................. 2017903463

(51) Int. Cl.
*H05B 47/19* (2020.01)
*H04W 4/029* (2018.01)
*H04W 4/33* (2018.01)
*H04W 4/38* (2018.01)
(Continued)

(52) U.S. Cl.
CPC ............ *H05B 47/19* (2020.01); *H04W 4/029* (2018.02); *H04W 4/33* (2018.02); *H04W 4/38* (2018.02); *H04W 4/90* (2018.02); *H05B 47/105* (2020.01)

(58) Field of Classification Search
CPC ..... H05B 47/19; H05B 47/105; H04W 4/029; H04W 4/33; H04W 4/38; H04W 4/90; H04W 4/023
See application file for complete search history.

(56) References Cited

U.S. PATENT DOCUMENTS

| 4,694,285 | A | 9/1987 | Scripps |
| 6,583,521 | B1 | 6/2003 | Lagod et al. |
| 8,547,036 | B2 | 10/2013 | Tran |

(Continued)

FOREIGN PATENT DOCUMENTS

WO 2016/079707 A2 5/2016

OTHER PUBLICATIONS

International Search Report issued in PCT/IB2018/056538; mailed Nov. 29, 2018.
(Continued)

*Primary Examiner* — Minh D A
(74) *Attorney, Agent, or Firm* — Studebaker & Brackett PC

(57) ABSTRACT

A luminaire and network for use in assisting persons in a building comprising: at least one lighting module, at least one communications component, a controller, an uninterruptible power supply in or coupled to the luminaire to power the lighting module, communications component and/or controller in the absence of a regular (e.g. AC) power supply, wherein the controller: triggers the lighting module to illuminate upon an activation event, facilitates communication via the communications and/or facilitates positioning of persons (or their devices) using the communications component and/or other components.

10 Claims, 36 Drawing Sheets

(51) Int. Cl.
*H04W 4/90* (2018.01)
*H05B 47/105* (2020.01)

(56) References Cited

U.S. PATENT DOCUMENTS

| | | | |
|---|---|---|---|
| 8,774,707 B2 | 7/2014 | Flammer, III et al. | |
| 9,123,221 B2 | 9/2015 | Puskarich | |
| 9,265,112 B2 | 2/2016 | Pederson | |
| 9,408,282 B1 | 8/2016 | Springer | |
| 9,536,407 B2 | 1/2017 | Todasco et al. | |
| 9,746,542 B2 | 8/2017 | Ikehara et al. | |
| 2004/0192227 A1 | 9/2004 | Beach et al. | |
| 2010/0226481 A1 | 9/2010 | Tischer et al. | |
| 2014/0340222 A1 | 11/2014 | Thornton et al. | |
| 2015/0035437 A1* | 2/2015 | Panopoulos | H05B 47/105 315/291 |
| 2015/0119071 A1 | 4/2015 | Basha et al. | |
| 2015/0250042 A1 | 9/2015 | Aggarwal et al. | |
| 2015/0271375 A1 | 9/2015 | Chien | |
| 2016/0133108 A1* | 5/2016 | Bucsa | H04L 67/12 340/629 |
| 2017/0080883 A1 | 3/2017 | Yasunori et al. | |
| 2017/0092109 A1* | 3/2017 | Trundle | G08B 25/006 |
| 2017/0098354 A1* | 4/2017 | Loeb | H04B 10/116 |
| 2017/0223807 A1 | 8/2017 | Recker et al. | |
| 2018/0139818 A1* | 5/2018 | Coombes | H05B 45/10 |
| 2018/0176521 A1* | 6/2018 | Laduke | H04N 9/3182 |

OTHER PUBLICATIONS

Written Opinion issued in PCT/IB2018/056538; mailed Nov. 29, 2018.

* cited by examiner

FACILITY COMMUNICATION AND/OR LOCATION APPARATUS AND SYSTEM

FIELD OF THE INVENTION

The present invention relates to luminaires and any in-building facilities/fixings/things configured to enable emergency communications, site access, site internet access, detection and/or positioning/location functionalities, civic address and a system comprising such luminaires and in-building facilities/fixings/things.

BACKGROUND OF THE INVENTION

Loss of power and lighting can occur in buildings putting occupants at risk, especially when they cannot communicate and/or cannot be found. This can occur, for example, in emergency situations. Such emergency situations can be, for example, natural disasters, such as earthquakes, floods volcanic eruptions, storms and the like; or other emergencies such as fires, power cuts, terror attacks, criminal attacks, or person health emergencies and the like.

In such situations, persons in the building may be in need of assistance, such as rescue. However, often it is difficult for emergency services, or other assistance to be provided as it is not known where the persons are, access authentication is required and/or the person(s) cannot be communicated with. This may be due to regular power supply and/or regular communications infrastructure being unavailable and/or environmental conditions (such as smoke) restricting assistance.

SUMMARY OF THE INVENTION

It is an object of the invention to provide an apparatus and/or system to assist people in a building, for example during an abnormal event such as an emergency situation.

For example, embodiments of the invention could assist with reporting positions or alerts, presence of persons and their movements in real time.

A building could be, but is not limited to, an apartment, commercial office block, house, office, shop, hotel, or the like.

In one aspect the present invention may comprise a luminaire for use in assisting persons in a building comprising: at least one lighting module, at least one communications component, a controller, an uninterruptible power supply in or coupled to the luminaire to power the lighting module, communications component and/or controller in the absence of a regular (e.g. AC) power supply, wherein the controller: triggers the lighting module to illuminate upon an activation event, facilitates communication via the communications and/or facilitates positioning of persons (or their devices) using the communications component and/or other components.

Preferably the luminaire further comprises at least one persons detection and/or positioning component, wherein the controller utilises the persons detection and/or position component to detect a person in a building and/or determining the position of a person in the building.

Preferably each communications component comprises one or more communications components being one or more of: a Wi-Fi transceiver, an internet gateway, a 3GPP transceiver, Bluetooth transceiver, removable modem router/RF signal enhancer using IEEE 802.11 networking standards.

Preferably each person's detection and/or positioning component comprises one or more components being one or more of: proximity sensor, motion detector, GPS transceiver, BLE beacon, Wi-Fi transceiver.

Preferably the controller can facilitate communications between a mobile communications device on a person in the building and a third party (e.g. outside the building) using one or more of the communications component(s).

Preferably the controller can detect a person and/or determine the location of a person in a building, and/or communicate the detection and/or location of the person to a third party (e.g. outside the building) using optionally the communications component(s).

Preferably the activation event is an emergency event.

Preferably the uninterruptible power supply is a battery, the battery preferably comprising two battery units, wherein at least one battery unit is removable/detachable from the luminaire.

Preferably the luminaire further comprises a wireless charging module for charging the uninterruptible power supply and/or for charging peripheral devices.

Preferably the luminaire further comprises one or more of: one or more power sockets for powering external devices, optionally from the uninterruptible power supply, a chargeable torch removably coupled to the luminaire and/or triggered to illuminate on an activation event, an AC power supply.

Preferably the luminaire further comprises a fixture box to hold the luminaire for mounting in/on a wall.

Preferably the uninterruptible power supply is configured to: operate in a first mode of operation for a first period of time; and operate in a second mode of operation for a second period of time.

Preferably in the first mode, the uninterruptible power supply provides power to all components in the luminaire; and in the second mode the uninterruptible power supply provides power to a subset of components powered by the uninterruptible power supply operating in the first mode.

Preferably in the first mode, the uninterruptible power supply provides power to: the at least one lighting module, the at least one communications component, at least one persons detection and/or positioning component, a Bluetooth beacon, a gateway router, and the controller; in the second mode, the uninterruptible power supply provides power to: the at least one persons detection and/or positioning component, the Bluetooth beacon, and the controller; wherein the uninterruptible power supply is configured to switch from operating in the first mode to the second mode when power is running out; and wherein the controller is configured to be powered by the uninterruptible power supply at all times.

Preferably the uninterruptible power supply is removable and/or detachable.

Preferably the luminaire is located outside of the building.

In another aspect the present invention may be said to consist in a system for assisting persons in a building during an event comprising: a network of luminaires wherein the network of luminaires can be controlled to: trigger the lighting modules to illuminate upon an activation event, facilitate communication via the communications modules, and/or utilise the persons detection and/or position module to detect a person in a building and/or determining the position of a person in the building.

In such situations, it is desirable to be able to detect persons, determine the position of persons and/or enable communications with persons in the building. However, usual telecommunications and/or positioning devices do not always work. Providing backup systems can be expensive and may not be warranted. Providing power back up for communication channels and electronic devices is also desirable, such as for network terminals, access points, mobile devices and the like.

In another aspect of the present invention, there may be provided a location detection system for use in assisting one or more persons in a building during an event, the system comprising one or more facilities, each of the one or more facilities comprising:
a civic address;
at least one communications component; and
at least one position detecting component, wherein, upon the presence of the event being indicated or triggered, the system is configured to:
detect the location of one or more devices of the one or more persons using the at least one position detecting component;
obtain the civic address of each of the one or more facilities in proximity to the one or more devices of each of the one or more persons; and
communicate the obtained civic address(es) to a third party using the at least one communications component.

In one embodiment, the one or more devices of the one or more persons are configured to initiate a connection with each of the one or more facilities in proximity to the one or more devices, to at least obtain the civic address of the one or more facilities in proximity to the one or more devices.

In another embodiment, the location detection system comprises one or more databases configured to record, store and/or provide the civic address of the one or more facilities when requested.

In a further embodiment, the one or more databases comprise a cloud database and/or a back-up local database.

In yet another embodiment, the one or more facilities comprise one or more of:
luminaire(s);
luminaire and/or light socket(s);
switch(es)
fire panel(s);
smoke detector(s)/alarm(s);
burglar alarm(s);
speaker(s) and/or video camera(s);
access control/lock(s);
electronic doorbell(s);
window control/louvers,
home and office equipment; and
unmanned and/or remote controlled objects.

In yet another embodiment, the one or more devices of the one or more persons comprise one or more of personal devices and/or wearable devices, wherein optionally, the one or more devices are configured to co-operate with the one or more facilities of the network to monitor the health conditions and/or indicators of the one or more persons.

In another aspect of the present invention, there may be provided a network for use in a building during an event, the network comprising one or more facilities, at least one of the one or more facilities being configured to record, store and/or provide building data, the building data comprising history of activities in the building and a civic address of the one or more facilities,
wherein, upon the presence of the event being indicated or triggered, the at least one of the one or more facilities is configured to:
operate as a gateway and/or access point of the network; and/or
to permit third party access to the network and/or the building.

In one embodiment, power supply and/or internet access of the building may be disconnected in the presence of the event.

In another aspect of the present invention, there may be provided an authorisation system for a building, the authorisation system being configured to connect to a network of the building for assisting one or more third parties to control and/or access the network of the building, the network comprising one or more facilities,
wherein at least one of the one or more facilities is configured to operate as an agent for the third party to:
form the connection between the third party and the network; and/or
provide the third party with the ability to access the building.

In one embodiment the third party can comprise any one or more of:
unmanned objects comprising one or more of remote controlled aerial vehicles and/or robotic machines;
emergency services operator(s);
warden(s);
property manager(s)
security officer(s).

In another embodiment the connection between the network and the third party and/or the access to the building is provided when electric power and/or internet access is or is not provided.

In another aspect of the present invention, there may be provided a luminaire for use in assisting persons in a building in an event, the luminaire comprising one or more of:
one or more light receiving portions;
at least one lighting element;
at least one communication component;
at least one position detecting component;
at least one controller; and
an uninterruptible power supply in or coupled to the luminaire to power the at least one lighting element, communication component, position detecting component and/or controller in the absence of a mains power supply,
wherein:
each of the one or more light receiving portions is configured to securably receive a lighting module or light bulb; and/or.

In one embodiment, the one or more light receiving portions comprise a socket.

In another embodiment, the luminaire comprises a main body comprising or enclosing one or more of the at least one light element, at least communication component, position detecting component, controller and uninterruptible power supply.

In another aspect of the present invention, there may be provided a luminaire for use in assisting persons in a building in an event, the luminaire comprising one or more of: at least one connector portion;
at least one lighting element;
at least one communication component;
at least one position detecting component;
at least one controller; and
an uninterruptible power supply in or coupled to the luminaire to power the at least one connector portion, lighting module, communication component, position detecting component and/or controller in the absence of a mains power supply, wherein each of the at least one connector portion is configured to be securably received in a cooperating portion.

In one embodiment, the luminaire comprises a housing comprising one or more of the at least one connector portion, lighting element, communication component, position detecting component, controller and uninterruptible power supply, wherein the housing comprises a connector portion for connecting to a cooperating portion.

Typically, buildings have emergency lighting systems (luminaire systems) to provide emergency lighting when an event occurs. These have their own independent power supplies, such as uninterruptible power supplies, to enable provision of lighting, even if the regular power supply has failed. The present inventor has determined how to utilise such an emergency lighting system network and/or the luminaire signage point of interest (e.g. toilet, information point, lift, etc.) system network to provide additional services. Embodiments disclosed herein provide a device and/or system to assist communication and location/detection of persons on a building in an event by leveraging off the existing emergency luminaire lighting devices and network.

BRIEF LIST OF DRAWINGS

Embodiments will be described with reference to the following drawings, of which:

DETAILED DESCRIPTION OF EMBODIMENTS

Overview

Figure 1:
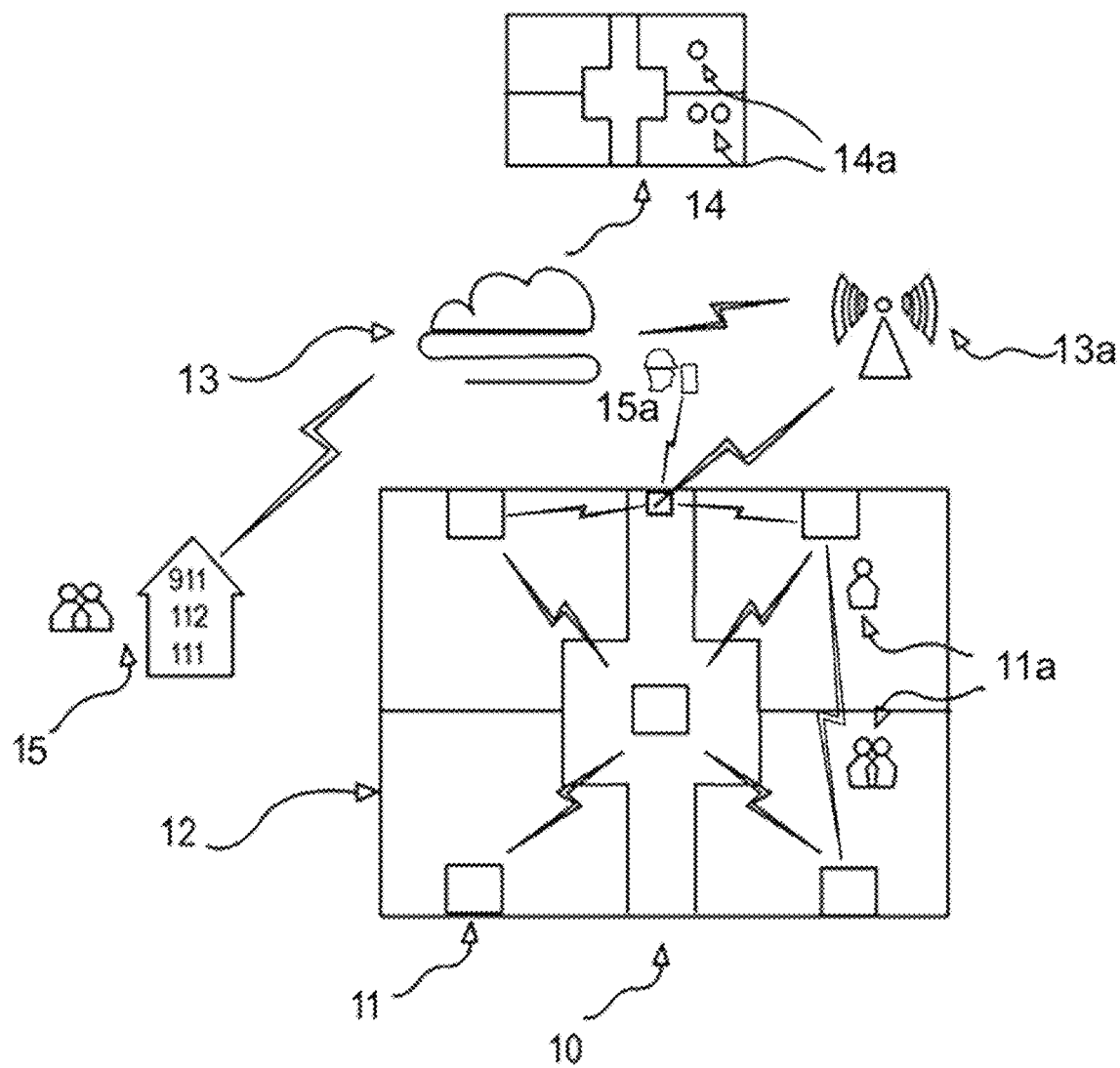
FIG. 1 shows in diagrammatic form a building floor plan with a network of facilities configured with communications and/or location functionalities for locating Persons on a building and/or allowing for communications from the persons.

FIG. 1 shows the floorplan of a building 10 level with a system/local area network comprising a network 12 of one or more facilities 11 (also referred to as fixings/fixtures/things) in general block diagram form that have been configured as described herein to provide communications, site access, site internet access, person detection and/or person location/positioning and/or civic address functionalities. It also provides power backup for supporting these functionalities and external mobile devices. The one or more facilities 11 may comprise but are not limited to one or more of the following features: luminaire(s), luminaire and/or light socket(s), holder(s) and shade(s), switch(es), fire panel(s), fire alarm(s), smoke detector(s)/alarm(s), burglar alarm(s), thermometer(s), speaker(s), video camera(s), access control/lock(s), electronic door bell(s), window control/louvers, fixed internet access equipment home and office equipment such as stove(s), coffee maker(s), fridge(s), printer(s), monitor(s), air-conditioning unit(s) and the like, as well as unmanned vehicle(s) (e.g., unmanned aerial vehicles), robotic machine(s) and the like.

The one or more facilities 11 may comprise electronic/electrical facilities which rely on the existing power supply infrastructure of the premises/building 10 to function. The one or more facilities 11 may be provided with an uninterruptible power supply (e.g., using a 2 stage of UPS) which may supply energy to subset(s) of component(s) of such facilities 11. The one or more facilities 11 can be networked together using at least one or more radio frequency standards, such as IEEE 802, for emergency communication purposes and the like.

One or more features of each facility 11 (e.g., luminaire) may function as a stand-alone feature and may be independent of other features of that particular facility 11. For example, a facility 11 may comprise a luminaire and a smoke detector that are independent/stand-alone that can connect to each other if required. Additionally or alternatively, features of a particular facility 11 may be provided and/or function as a combination and/or as a whole. For instance, a luminaire may function in combination with and/or be embedded within a thermometer sensor and smoke alarm.

Such features of the facility 11 may be integrated, coupled and/or removably or permanently attachable onto the facility 11 and may use the existing on-premise power supply infrastructure and/or uninterruptible power supply to instigate connection and communication with each other, as well as with third parties in an event (e.g., emergencies) both online and offline.

The third parties 220 may comprise emergency dispatchers/call centres which can be communicated with online or offline. Online can be through a local server/gateway of the facility 11 of the network 12 by for example, ISP services including wire and/or wireless means, such as FTTP (Fibre to the Premises), cellular network and commercial satellite and the like. In such arrangements, the local server/gateway may synchronize the data of the facility 11 of the network 12 to a database (e.g., the platform's cloud database 200). In some embodiments, third parties may comprise automatic and/or unmanned machines 210 (such as drones) that may be remotely controlled and/or disposed/placed within the premises/building 10. This would allow the machines 210 to be operated automatically and/or remotely and manually from outside or inside the building 10 to perform a range of tasks such as providing visual aids of inside the building, checking on the condition of person(s) within the building etc.

Offline communication can be achieved by connecting a user equipment to a local server/gateway of the facility 11 of the network 12, where such local server/gateway can also store network data as a back-up in case the local ISP services are cut. This lets third parties/responders 220 of an event at the premises/building 10, such as first responders and/or emergency services (e.g., fire/police/ambulance) and any other third party personnel including but not limited to wardens, security officers, property managers etc. to be able to retrieve historical data up to a certain period of time to allow for any required intervention to take place. The local sever/gateway may also be identified as a facility 11 (also referred to as a node) in the network 12 comprising uninterruptable power supply (e.g., a two stage UPS).

The connection between the facilities 11 in the network 12 may be made using for example, radio frequency networks. The facilities 11 may be mounted in suitable location(s) and provide an emergency network of all of the facilities or a subset of facilities.

In the example of the one or more facilities 11 comprising luminaires, the luminaires may be configured to provide an emergency lighting network where they can illuminate upon occurrence of an event, such as a natural disaster or human triggered emergency situation. Such luminaires (and other possible facilities 11) provide lighting to assist one or more persons 11a in the building during such an event. For example, such facilities/fixings 11 can be typically within reach by persons 11a in an emergency situation such as floor, wall at appropriate height that is reachable by a person 11a, and/or ceiling. They predominantly cover the following areas with lighting and/or communication coverage: exit/entrance, fire access, stairways, corridors, passages and open and/or confined spaces/rooms.

In brief, facilities 11 are configured to come on (activate) in an event, such as an emergency situation, to for example provide lighting (such as emergency lighting) to enable people to navigate and leave the building. The facilities 11 may comprise their own/independent power supply, such as an uninterruptible power supply, UPS (e.g., a two stage UPS) that allows for operation of the facilities 11 even if the regular grid/AC power supply and also the stand-alone UPS system at the premises/building 10 at a later stage are cut off. Facilities 11 typically activate and provide emergency lighting in and/or communication capabilities (and/or other necessary services of the building) situations such as black outs, fires, earthquakes and other natural disasters or situations where normal building services such as power and communication channels are cut.

The facilities 11 described herein are modified/configured to comprise additional functionality that leverages off the functionality and infrastructure provided by existing facilities 11 and networks 12. As emergency systems (e.g., emergency RF communication using luminaires) are typically provided in buildings, leveraging off these to provide additional location, detection and communication and civic address (explained in detail below) functionalities enables assistance to be provided to persons 11a in a building during an event or otherwise, where otherwise such an infrastructure would not be provided. For example, the network 12 (and at least a subset of its facilities 11) could be used in emergency situations to locate persons 11a in a building and/or allow those persons 11a to communicate with third parties in the building or the outside world. The modified facilities 11 can provide a local area network for communications, persons detection and/or persons location/positioning. The positioning functions can leverage off RF communication components such as BLE and Wi-Fi and any other RF standards of IEEE 802. For instance, when a person contacts a third party (e.g., makes an emergency call or triggers an SOS on an app), the person's device can pair/link up with at least one of the facilities 11 in the network 12 (i.e., an RF node) in the proximity of the person's device, such as a luminaire. The person's device is able to scan the facility/node's ID as well as its RF strength in dBm value, in order to indicate the location of the facility 11 with reference to the person's device and/or vice versa.

In the case of using the person's device to acquire data, such as the digital ID and/or civic address of the facilities 11, the facilities 11 may become an RF tag that beacons and reveal its location. By obtaining the digital ID and/or civic address of such facilities/nodes 11, e.g., a luminaire, the person's device may pass this digital ID and/or civic address to the network 12 (and optionally its cloud database 200) and retrieve and/or match the "civic" address of the facility/node 11, including but not limited to details of its physical location concerning the civic address of the premises. This allows such and any other relevant data/information (e.g., the emergency door location) to be communicated to third parties, e.g., emergency call centres.

In the case of facilities/nodes 11 such as a luminaire acquiring data of a user device, such as an encrypted advertisement packet, the digital ID and/or MAC etc. of the user device, the person's device operates as an RF tag that can beacon and reveal its location that is relevant to that facilities/nodes 11.

The network 12 of facilities 11 may also be configured to link/pair to the person's device if internet access is inaccessible or defunct due to for example, an outage in power and/or internet connection, by using one or more reserve/back-up communication standard channels under the IEEE 802 standard in order to transport data acquired by the facility/node 11 that links/pairs the person's 11a device to the facilities 11. In such circumstances, data can be reported/alerted (e.g., through network 12) to third-party personnel who may be stationed at the premises/building 10 and can retrieve such data by connecting to a facility/node 11 that may be configured to operate as a back-up gateway/server. This embodiment/functionality of the facility 11 of the network 12 is also referred to as the "Black-Box" that will be described in detail below.

The network 12 of the premises/building 10 (and especially its features/measures for communication during an event) may be permanently in operation and may be configured to connect to a permanently operational external communication network, such as an internet broadband network, to feed data from the premises/building 10 of interest to databases (e.g., cloud databases 200) for third-party 220 intervention. This data can be fed to third parties stationed remotely (such as emergency call dispatchers at public safety answering point (PSAP), the person's registered next of kin and/or other emergency service agencies) before (or at the same time as) locally stationed third parties such as property manager(s), warden(s) etc.

In some embodiments, one or more of the facilities 11 in the network may be configured with communication functionality that allows persons 11a in the building to instigate communications with third parties (such as emergency services 15, and/or Public Safety Answering Point in the US) inside or outside the building, even if the usual telecommunications systems (such as Internet, mobile telephony services and/or landline telephony services) are not functioning. The communications functionality enables persons 11a in the building to send alerts, text messages, voice/video messages, or any other data or communications to those third parties, for example using a personal mobile communications device such as a mobile telephone. This enables them to obtain assistance, indicate their whereabouts and existence, and generally provide/receive information with those inside and/or outside the building 10.

In addition, the facilities 11 may be configured with location functionalities that enable detection of persons' 11a device/user equipment (UE) by obtaining the RF strength of facilities 11 in proximity to the persons' device/UE (also referred to as the "fingerprint" of the facility 11). This entails the use of positioning and locating algorithms software or firmware installed on the person's device/UE, a mapping engine of the network or the like. These algorithms may be configured to store the fingerprints/RF strengths of one or more facilities 11 positioned in proximity to the person's device/UE. These fingerprints/RF strengths can help provide more stable and accurate positioning and locating algorithms for locating the person's device and/or enabling detection or identification of the person's 11a position within the building, for example by movement sensors, of which any detection data shall be forward to e.g., cloud 200 and local 400 servers using an indoor virtual map 14 labelling the persons as 14a, for example. This information can then be relayed to third parties inside or outside, so that it can be ascertained who needs assistance and to provide assistance, such as rescue. The functionalities can also be utilised in non-emergency situations, also, such as safe occupancy within the premises/building 10.

One or more facilities 11 in the network 12 can be configured as a "master device", and others as "slave devices" for connection and communication. In this configuration, master device(s) would be device(s) that are initially opted for use for a particular purpose, such as initiating an outgoing connection request to a slave device and scans for other slave devices to acquire data from. Slave device(s) would be device(s) which can merely be present within the network and wait for and accept an incoming connection request from master device(s).

The master and slave device(s) both are interchangeable, allowing the slave device(s) to function similarly to the master device(s), and vice versa. In some embodiments, a slave device may only be connectable to a single master device, whereas a master device (e.g., central node shown in FIG. 1) may be connectable to multiple slave devices.

In some embodiments, a first facility 11 can communicate with a second facility 11 at all times, independent of the other facilities 11 within the network 12. This communication can be achieved using one or more RF standards, allowing the other facilities 11 within the network 12 to be configured to use the one or more RF standards supported by the first and/or second facilities 11.

In some embodiments, the facilities 11 within the network 12 may be configured such that at least one facility 11 operates as a wired and/or wireless node. This node may be a local server that can also be a gateway that is able to synchronise the network data with the cloud data, as well as store such data locally. This allows the facility/node to be used as a back-up server so that for example, in an event (e.g., internet disruption), third party personnel such as warden(s), security officer(s), property manager(s) etc. can retrieve data from this node. The node may comprise an uninterruptible power supply, UPS that can comprise two stages, as described herein. This will be further explained in more detail in the section "exemplary embodiment—'black-box'".

In some embodiments, the facilities 11 of the network 12 may additionally or alternatively comprise their own individual civic address (which can be in any form/representation such as digital, co-ordinates etc.) that can essentially be used as a co-ordinate to indicate where exactly each particular facility/fixing 11 is positioned in a building. The civic address could be a physical address (e.g., a physical location of the facility/fixing 11) and/or a legal civic address registered on one or more suitable systems. For example, each facility 11 may comprise a civic address akin to a street address for a house or the like, where the location of the particular facility 11 may be specified by the street name (and/or the digital code of the particular street), the building, level and/or room (and/or their digital code(s)) within which the facility 11 is located. It will be appreciated that the civic address of the one or more facilities can be as detailed as required.

The civic address of the one or more facilities 11 can be stored, reviewed, accessed, obtained, modified and/or analysed on one or more of a local 400 or cloud-based 200 system/database, a central database accessible by multiple entities (e.g., post office registry) and the like, such as a digital address database of a territory accessible by emergency services for emergency purposes. Each facility/fixing 11 or a plurality of the facilities/fixings 11 may form a subnetwork of the entire building's network. The premises/building 10 may comprise its own civic address with each level of the building and/or each facility/fixing 11 comprising a sub-address or sub-coordinate that falls under the civic address of the building 10.

Further, as mentioned above, each level and/or one or more room at each level may also comprise their own civic address. This arrangement may be hierarchical, where the civic address of the one or more facilities/fixings 11 may be grouped according to the room/area and/or the level of the building 10 in which they are positioned in. Alternatively, each facility/fixing 11 may comprise its own civic address and network and may not be related to or comprise a subnetwork of the building's network. In some embodiments, some or all of the facilities/fixings 11 installed in the building may form a local radio frequency (RF) network that may be in communication with or coupled to the RF network of other facilities/fixings 11. Possible application of the civic addresses (and the systems used therefor) mentioned above will be explained later in the "facility/fixing location" section.

In some embodiments, the data of and/or metadata related to the civic address of one or more of: the building 10, the one or more levels of the building 10, one or more rooms at each of the one or more levels and each facility/fixing 11 may be placed in a building information modelling and management system (BIM) as well as a geographic information system (GIS). Such data may be related to the digital representation of information of the facilities 11 and all other necessary building information of any facilities 11 pertaining to the safety of the building and the occupants in all events. The GIS can comprise technologies, policies, standards, human resources, and related activities necessary to acquire, process, distribute, use, maintain, and preserve spatial data. For example. The GIS may be used for capturing, storing, checking and displaying data related to the civic addresses mentioned above, in order to aid third parties to better understand the spatial patterns and relations within and around the premises/building 10.

The GIS may combine the data related to the civic addresses with other features such as data about people, such as population and income, information about the landscape, such as the location of streams, different kinds of vegetation, and different kinds of soil and information about the sites of factories, farms, and schools, or storm drains, roads, and electric power lines. Using the GIS, one is able to compare the locations of different things in order to discover how they relate to each other. For example, using GIS, a single map could include information with regards to accessing the building 10, locating the persons 11a within the building 10 and/or approaching the person 11a to help and/or retrieve them from the building 10. The GIS can comprise as many features as required and such features may be as detailed as needed. For example, the features may be arranged specifically for indoor emergency service needs.

The GIS, which can primarily be a geographical indoor mapping, may comprise the abovementioned civic addresses and/or any data related thereto may be stored in an electronic database which can be accessed by authorised third parties such as emergency services 15 online. When online access (e.g., local online access) is cut, authorised third parties such as property managers or building security can access and view recent in-building activities records offline by for example, connecting to a facility 11 (such as a master facility and/or the electronic database). Facility Location Detection Method of Civic Address Supporting Position and Location of Person(s)

The third party user/operator can retrieve data (in a wired or wireless manner) such as the civic address of a particular facility 11 of interest (e.g., the signalled/communicated facility 11 in proximity to the person 11a) online and/or offline, so that they can obtain the (at least) approximate location of the persons 11a within the premises/building 10. This data or civic address can include details such as the level/floor in the building and/or a particular room/area of the level where the facility 11 is located, as well as possible access points from the outside of the building for reaching the particular civic address of the one or more facilities 11. In some embodiments, navigation to a particular civic address (e.g., digital address and/or co-ordinate) of the facility 11 in proximity to the person 11a may be provided by using one or more other facilities 11 to indicate possible (and/or the fastest) routes to the civic address of interest.

Figure 10:
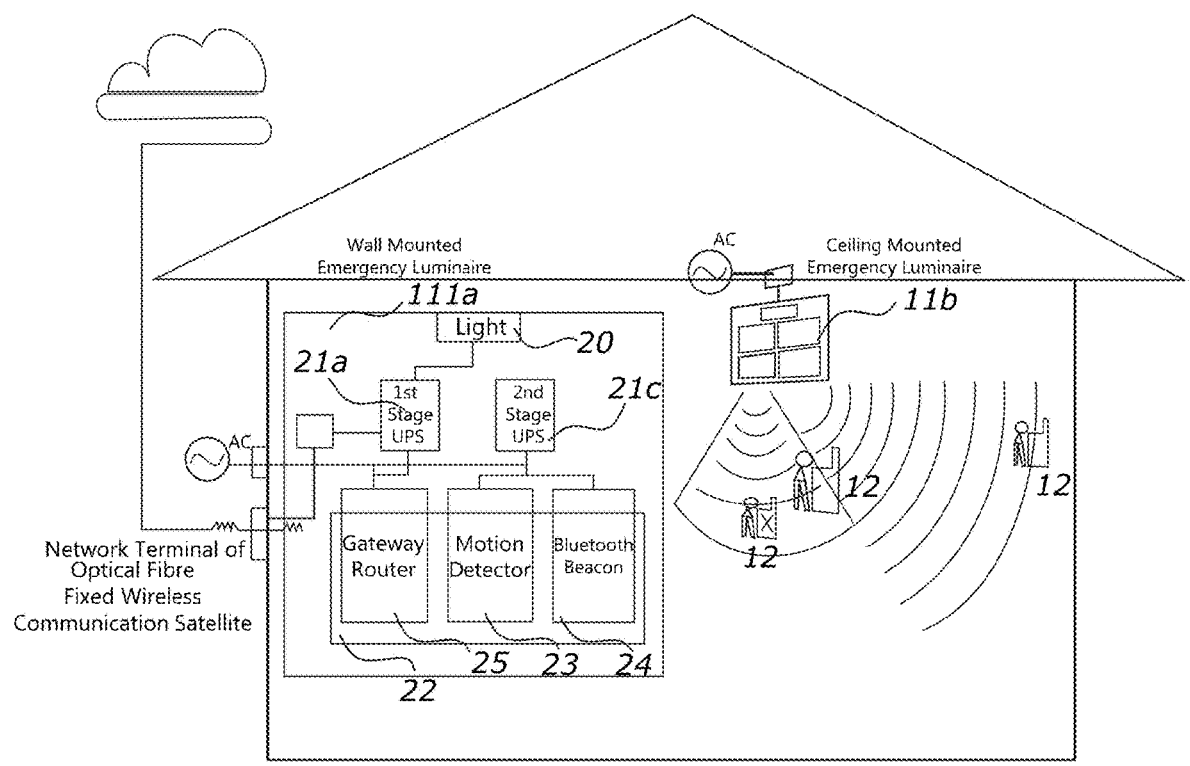
FIG. 10 shows in block diagrammatic form how the dual stage UPS facility embodiment may be installed as a wall mounted luminaire as well as a ceiling mounted luminaire.

In addition to the location detection functionality explained above (and as previously mentioned), the separate, individual civic address of each facility 11 can also be used for locating persons 11a in the premises/building 10 in an event of emergency or the like. Third parties (e.g., emergency services personnel, first responders, building manager etc.) using their own device/equipment can connect online to open internet access points inside the premises/building 10 such as FTTP fibre, cellular and commercial satellite and/or connect offline by connecting to the in-building back-up gateway. The digital ID/address of one or more facilities 11 in proximity to the person's 11a device can be retrieved and received via a signal/communication directly from one or more of the facilities 11 in proximity to the device of the person 11a, indicating that the persons 11a requires attention (e.g., emergency, medical or rescue) in the building 10. In such cases, the civic address of the one or more facilities 11 can be provided as an RF tag to be acquired by the device 12a of the person 11a (as shown in FIG. 10).

In normal circumstances, e.g., when back-up power supply is available in the premises/building 10, internet (e.g., WAN) may be accessible and the person's 11a device/UE may be configured to operate as a master node to directly acquire and/or transfer packet(s) of data containing the civic address/ID of one or more facilities 11 in proximity to the person 11a online. In this case, any facility 11 deployed at the premises/building 10 becomes a digital RF tag of the location of interest to be reported by the person's 11a device and/or one or more facilities 11.

In power outages when internet (e.g., WAN) may not be available, such as a broad internet blackout, one or more facilities 11 (e.g., luminaires) of network 12 may be configured to operate as a master node to directly acquire and/or transfer packet(s) of data advertised by the person's device and subsequently trigger communication of such connection with the person's device. The civic address (and/or any other relevant information) of such one or more facilities 11 within the network 12 may be relayed/communicated to the a local gateway/server or the 'Black-box' node. Therefore, the person's device may operate as an RF tag, or a slave node, to be triggered by the person 11a in order to interact with the facilities 11 to reveal its civic address so that the position/location of the person at civic address is confirmed and communicated to the local gateway/server or the 'Black-box'. Such data may also be communicated/transmitted to other databases (e.g., local and/or cloud) and/or to the third parties who may be stationed or can arrive at premises/building and may not be able to access databases (e.g., the cloud database 200) because of e.g., internet access failure.

Additionally, the presence and position of persons 11a within the premises/building 10 may be detected/determined/communicated and verified using detection by movement sensors when a trigger (e.g., emergency alert) is initiated by the person's 11a device/UE. For example, FIG. 10 shows the motion sensor 23 of (any abovementioned embodiment of) the facility 11 may be used to track and verify the location of occupants using the methods described herein. The civic address/ID of one or more facilities 11 described above may be communicated/transmitted to third parties.

Thus, a third party user/operator (e.g., emergency services staff) may be altered directly at least by a single facility 11, the device of the person 11a and/or by the building's system/network 12, upon receiving a signal/communication indicating the presence of one or more persons/occupants 11a. The third party may be alerted regarding the state of the persons 11a and their location in the building 10 based on the civic address of the physical interior location of each facility 11 that (a) is in proximity of the persons 11a and/or (b) has received a signal/communication from the device of the persons 11a.

Thus, the civic address of the one or more facilities 11 may be used to determine the location of each person 11a of interest. The device of the persons 11a include but are not limited to UEs such as laptops, tablets mobile phones and wearable devices such smartwatches, electronic access/medical tags, headphones and the like. The third party user/operator may receive the alert from the building's system/network remotely and/or locally at the premises/building 10 using one or more of such devices/UEs.

In some embodiments, the civic addresses of the facilities 11, rooms, levels and/or the premises/building 10 may be stored in an electronic database which can be accessed by authorised third parties such as emergency services 15 online.

When local online access is cut, third parties such as first responders, property managers or building security can access and view the records offline by connecting to one or more facilities/nodes 11 (e.g., local server and/or back-up data storage).

Facility Network Supporting Safety and Health Monitoring

In some embodiments, the signal/communication from the device of the person 11a can be sent based on a number of different triggers and thresholds of data which can relate to the safety and well-being of the persons 11a within the premises/building 10. For example, the device of the person 11a can operate as a thermometer (e.g., a wearable thermometer) and send the signal/communication to one or more facilities 11 if and when the temperature of the person exceeds a certain threshold. This can be useful for early detection of infected/ill persons in a building to identify and stop potential outbreaks of infections at an early stage. In another example, the device of the person 11a monitors various health indicators of the person 11a such as their heart rate, blood pressure, blood sugar and the like and sends a signal/communication to one or more facilities 11 if a certain threshold is reached to indicate that the person 11a requires attention.

Facility Network Supporting Search for Lost Items

In yet another example, the network 12 can be used to track and find misplaced/lost items by communicating with an RF tag attached to such items. Such RF tags may (constantly or intermittently) communicate the location of one or more facilities 11 in proximity to the item. In some embodiments, the civic address of the one or more facilities 11 in proximity to the misplaced/lost item(s) can also be retrieved/accessed by the third party user/operator (e.g., by a prompt sent from the third party user/operator).

The third party user/operator can wirelessly retrieve data such as the civic address of a particular facility 11 of interest (e.g., the signalled/communicated fixing/facility 11 in proximity to the person 11a) online and/or offline, so that they can obtain the (at least) approximate location of the persons 11a within the premises/building 10. This data or civic address can include details such as the level/floor in the building and/or a particular room/area of the level where the facility 11 is located, as well as possible access points from the outside of the building for reaching the particular civic address of the one or more facilities 11. In some embodiments, navigation to a particular civic address of the facility 11 in proximity to the person 11a may be provided by using one or more other facilities 11 to indicate possible (and/or the fastest) routes to the civic address of interest.

Facility Network Supporting Authorisation System Control by Third Parties

In some embodiments of the present invention, the network 12 (which may comprise in-building emergency communication services) of the facilities 11 can be used to support authorisation system control by a third party (e.g., first responders or unmanned machines/robots such as drones) that may be authorised to connect to one or more facilities 11 of the network 12 to gain access into the premises/building 10, for example, by using at least one facility 11 to connect with a device/UE of the person(s). The electronic lock may connect with the network 12 of facilities 11, of which the electronic lock device operates as a node of such network 12 of facilities 11 as well. The one or more device(s)/UE(s) and/or the unmanned machine XX may be configured to operate as the master (or provisioner) to activate one or more facilities 11 (e.g., a luminaire) in its proximity to act as the master's agent or proxy to control the lock, therefore authorizing/permitting access in and out of the premises/building 10.

In some embodiments, authorisation system control can be gained via one or more facilities/nodes 11, where the third party's device/UE may be configured to connect to one or more facilities 11 of the network 12. The one or more facilities 11 may be equipped with two stages UPS and the authorisation system may or may not be a facility/node 11 of the network 12. The third party's device/UE may connect to the network 12 that responds to such connection by fetching/receiving a single-use or multiple-use passcode (that may be stored in a database/server of the network 12 such as local 400 or the cloud 200) for providing third party control of the authorisation system and therefore access into and out of the premises/building 10. On obtaining such single-use or multiple-use passcode, the device/UE of the third party may use RF to pair with the a locking device of the authorisation system to exchange credential generated by the authorisation system and/or the network 12 for access into and out of the premises/building 10. This may be advantageous for providing a secure access of the premises/building 10 during normal operation circumstances where the authorisation system can operate as desired and also during an event (e.g., power failure), where the authorisation system can provide the third party for performing rescues, repairments, etc with control/access into the premises/building when access to the premises/building may otherwise be locked/prohibited.

Figure 2:
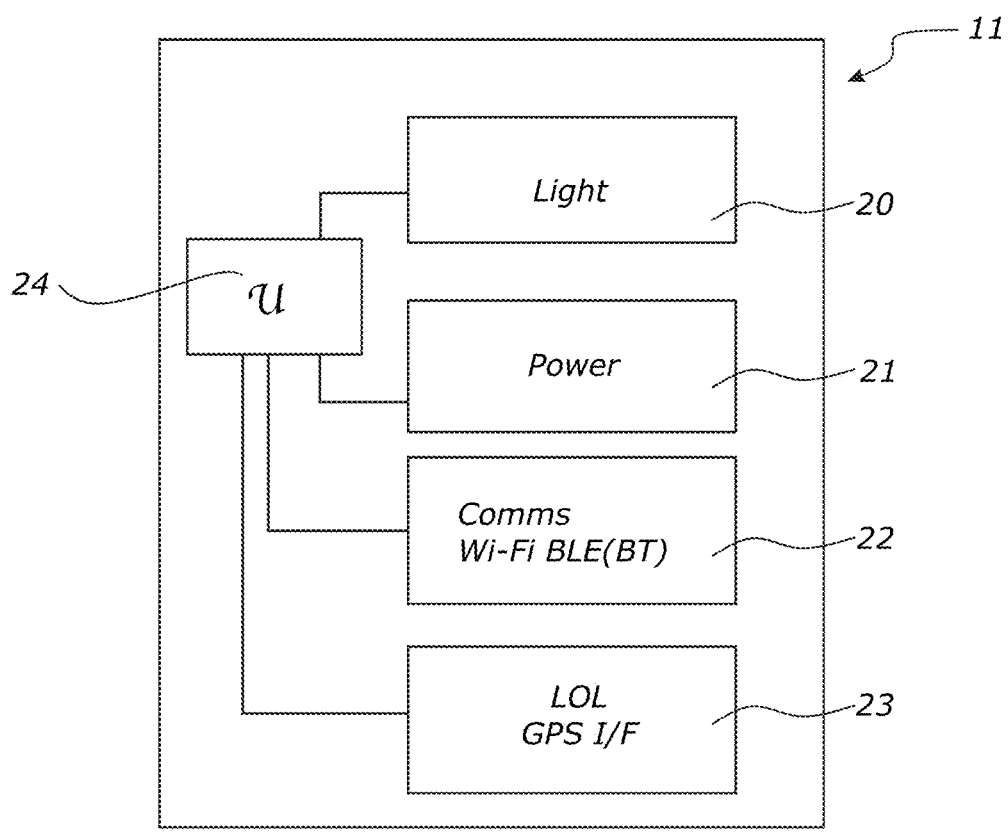
FIG. 2 shows in diagrammatic block form an example of a facilities configured with emergency lighting, an uninterruptible power supply, communications functionality and location services, using BLE and WIFI, LiFi and/or other scope of technology using mobile devices built-in sensors including magnetometer, gyroscope, barometer and accelerometer etc.

FIG. 2 shows in general block diagram a facility 11 in the form of a luminaire module configured to provide the communications and/or location/positioning functionalities. The luminaire module comprises at least one (e.g. emergency) lighting, an uninterruptible power supply (UPS) 21, such as a battery, at least one communications module 22 comprising one or more communications components, and at least one detection and/or positioning module providing one or more positioning/detection components (for example, of the facility 11 and/or the person 11a), including PIR detector which might be triggered to function on a power outage. The communication components can be one or more of IEEE RF standards 802, such as Wi-Fi, Bluetooth (e.g. Bluetooth low energy—BLE) or the like. The location/positioning components can be one or more of BLE Beacons, Wi-Fi, GPS, Infrared sensing or the like working with typical built-in sensors in mobile devices. These can detect/locate/position the one or more facilities 11 proximate to the person 11a, the person(s) 11a and/or devices/UEs on a person 11a to report via the luminaire communications positioning/detection of persons 11a via the communications channels of the facilities 11. The combination of the luminaire functionality and the device and its sensors enable the detection/location/positioning of persons 11a, by either obtaining data related to the location of the one or more facilities 11 proximate to the person 11a (and therefore their device) or the location of the person 11a (and therefore their device), or both. In some embodiments, the data related to the location of the one or more facilities 11 proximate to the person 11a will be in one or more various formats of the civic address explained above.

In some embodiments, predetermined thresholds of distance(s) in one or more directions between the facility 11 and the person (and therefore their device(s)) will be established such that the facility 11 is only considered to be "in proximity" to the person (and therefore their device(s)) if the distance(s) are under this predetermined threshold (e.g., a predetermined threshold that is equal to the distance between two facilities 11, such as 24 meters). In other words, a binary arrangement may be put in place where a particular facility 11 is configured to be in proximity to the person and their device(s) or not in proximity to the person and their device(s). Additionally or alternatively, the facility 11 may be configured to quantify and communicate the distance between the facility 11 and a device of the person 11a in one or more directions at all times, using communication and displaying methods described hereinabove and/or hereinbelow.

The device of the person 11a may be any one or more of: wearable devices such as watches (such as smart watches and/or watches with health monitoring functionalities), tags, chips, headphones, wristbands etc., keys and key tags, animal/pet tags, body implants, landline telephones, desktop computers, mobile phones, tablets, laptops and the like. Other components and features can be provided, and these will be described in more detail later. A controller is provided to control functionality and components of the luminaire. Not all components described necessarily need be provided, and a subset of them may exist only.

Each facility 11 can communicate as necessary with the other facilities 11 through wired (which may be referred to as "wireline" in description or drawings) or wireless networks 12, e.g., using Bluetooth and/or Wi-Fi communications and/or any RF standards. Each facility 11 in the network 12, as well as the persons' device, can be a master or slave node for connection other facilities, and such a master and slave facility and the person's device can communicate via a suitable means such as wired or wireless network to third parties, and can control communications in the network 12 itself. For example, the master facility/fixing 11 can communicate with third parties via a telecommunications network 13a through the system's internet (e.g., local internet) data/computer network server/gateway 13. The third parties include but are not limited to emergency services 15, property managers, building security, or the like.

The facilities/fixings 11, and the network 12 of facilities/fixings, can operate/function in a situation when one or more of ordinary methods of communication, such as landlines, mobile telephones, Wi-Fi and Internet networks, GPS or other location and/or communications services and the like will not operate. The modified facility/fixing 11 utilises the emergency power supply of the facility/fixing to operate the communications and positioning/detection modules, which will provide emergency communication channels when the ordinary methods of communication channels are not available, for example due to power cuts.

Exemplary embodiments of the system and facility/fixing 11 will now be described. A first embodiment of the facility/fixing 11 relates a luminaire module with a single UPS (uninterruptible power supply), and a second embodiment of the facility/fixing 11 relates to a luminaire module with a second UPS as further backup. It will be appreciated that these are non-limiting examples.

Exemplary Embodiment—Single UPS Wall Mounted Luminaire

Figure 3A:
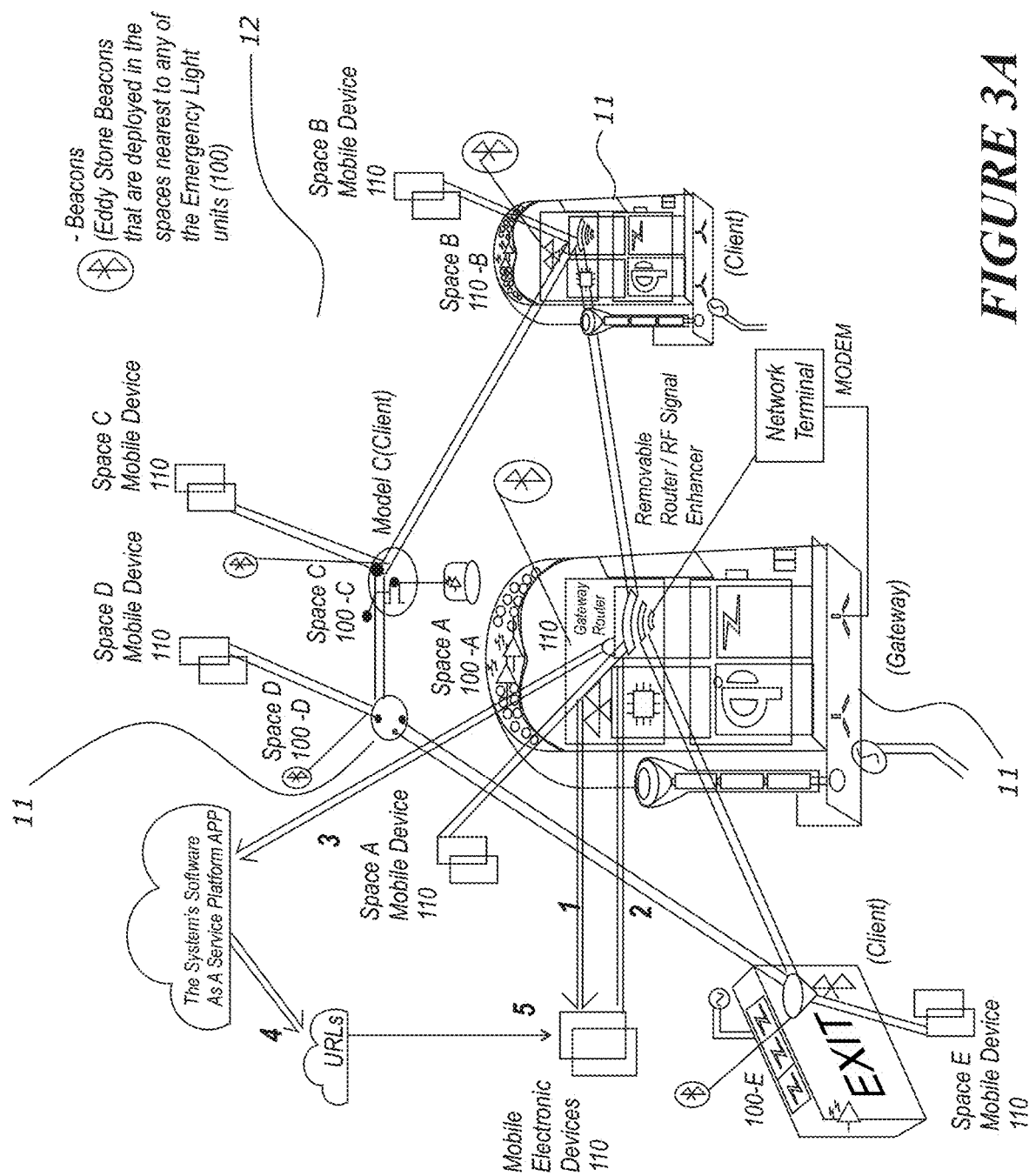
FIG. 3A shows in diagrammatic block form an exemplary embodiment of a network of facilities configured according to embodiments described herein for providing communications and/or location functionalities.
Figure 3B:
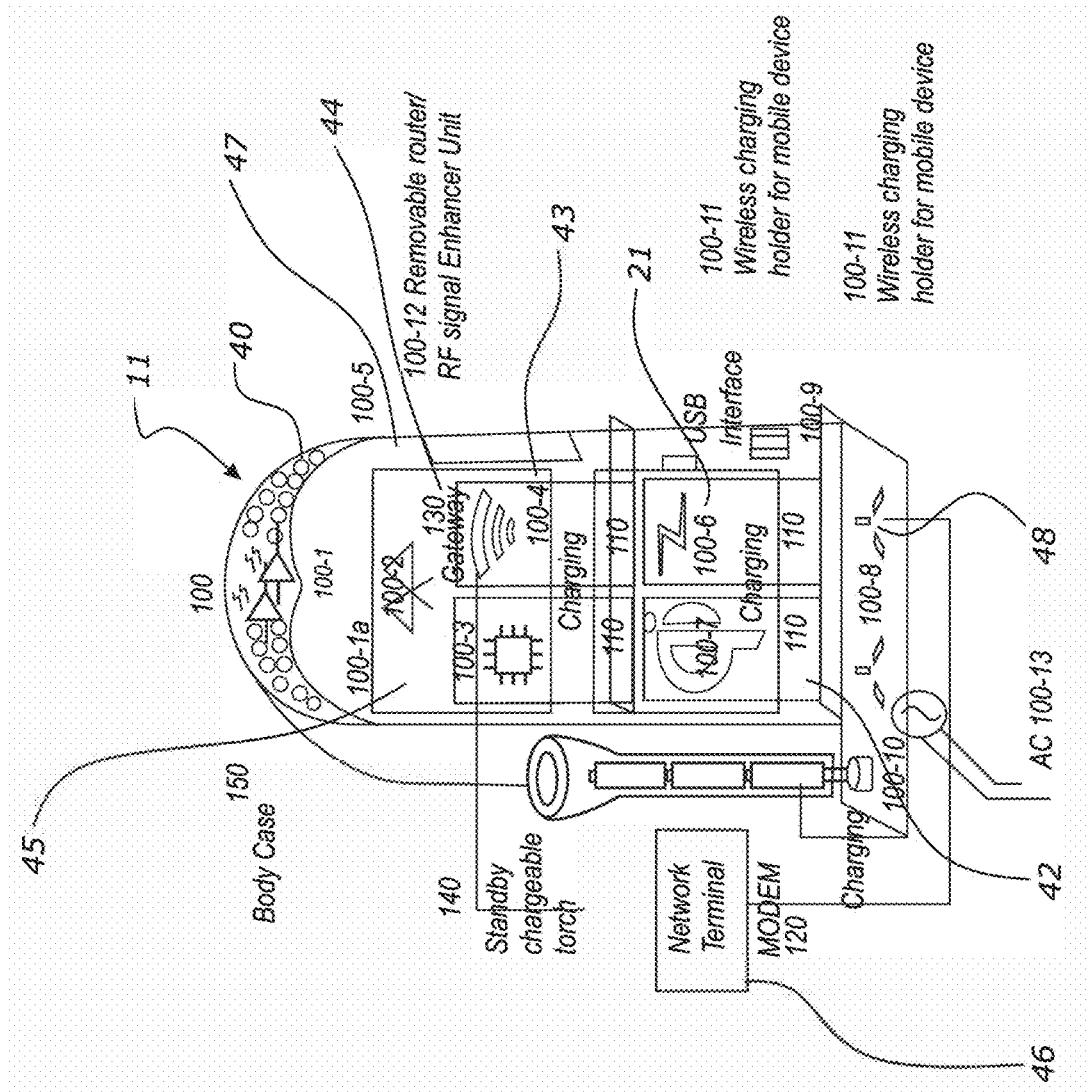
FIG. 3B shows in diagrammatic block form an exemplary embodiment of a facility use in the network of FIG. 3A.

A first embodiment will now be described with reference to FIGS. 3A, 3B. FIG. 3A shows one possible embodiment of a lighting, power backup, location/detection and communication system comprising a network 12 using modified luminaire modules as discussed. FIG. 3B shows one possible embodiment of a corresponding luminaire module used in the network/system. The network 12 comprises two wall mounted luminaire modules (master/slave), by way of example and as shown in FIG. 3B, which are placed within the building space and can communicate with each other. Two such luminaire modules are shown by way of example, but it will be appreciated that any suitable number of luminaire modules could be provided to adequately provide coverage and functionality to the building in which the network is installed. In addition to the wall mounted luminaire modules, other luminaires (also configured with communication and location functionality but packaged in a different form) can be provided also. For example, two ceiling mounted luminaire modules can be provided, along with an emergency exit sign luminaire module. Some or all of the luminaire modules can be configured with communications, location/positioning and/or detection functionalities such as those described above and can all communicate with each other in a network to provide the system. Any or all of the luminaire modules can communicate with mobile communications devices, such as mobile telephones carried by persons 11a in the building. The luminaire modules enable communication from the luminaire module and/or the mobile devices to third parties through a communications or other network. This could be through Internet, mobile communications technologies, or other network communications technologies. The third parties can communicate in any suitable manner, using telephony, VOIP, apps, servers, data or any other suitable technologies.

FIG. 3B shows the wall mounted luminaire module in more detail. It comprises a housing 40. A controller 47 is provided to control the components and overall functionality of the luminaire module. The luminaire module may comprise an emergency power supply 21, in this case in the form of an uninterruptible power supply (UPS), such as a battery. There may also be an inductive wireless charging unit 42 for charging the uninterruptible power supply or peripheral components and/or external devices such as mobile telephones from the UPS. The luminaire module may comprise lighting, for example, in the form of light emitting diodes (LED), which are powered from the emergency power supply 21. There may also be included appropriate lamp shading. The luminaire module can contain circuitry that triggers/activates when there is an event, such as an emergency, and the lights will be activated and illuminate. For example, this trigger might detect when the normal grid/AC power supply is cut. Alternative forms of triggers could be utilised. For example, it may trigger through mobile device proximity, e.g., mobile smart phone could activate the luminaire to illuminate, and carry out the communications, detection and/or positioning functions.

The luminaire module may also comprise a Wi-Fi communications circuitry 43 (e.g., Wi-Fi access point and/or router), forming part of a communications module 22. It can communicate with a person's device or other devices. The Wi-Fi router is coupled to an ISP gateway to provide a means for communication via Internet protocol communications to relay communications from a person's device via the network 12 to a third party inside and/or outside the premises/building 10. The ISP gateway 44 (e.g., router and/or modem) could be in the luminaire module itself, or alternatively, could be external and connected to the luminaire module (e.g., a network terminal and modem 46). A Bluetooth low energy transceiver 45, able to be powered by the UPS, is also provided for communications between a person's device and the luminaire module.

The Wi-Fi (access point) can also provide positioning functionality. An onboard or off-board processor and/or an onsite/offsite server can receive and process/calculate the radio signal strength indicator provided by nearby devices of the person(s) to determine the positions of those devices (and therefore persons 11a carrying them) relative to the Wi-Fi access point and/or one or more facilities 11 (in this case luminaire modules) in proximity to the persons 11a. In particular, when a person's device approaches an area, the radio signal (fingerprint) issued from all of the Wi-Fi access points in the area of the building 10 may be collected/recorded physically/manually to form a data resource to be stored in the server prior to the time of the person's device approaching any of these areas and issuing an alert. The device's and/or nearby facility's MAC ID and Radio Signal Strength Indication (RSSI) fingerprint may be sent to the server to calculate their position relative to the data and RSSI fingerprints previously acquired and stored in the server. The process of collecting data may be done by the person's subscribed device that is configured to disclose its location in an event. Therefore, data resources of RSSI radio signal (fingerprint) of all the Wi-Fi access points (routers) and gateway of the facilities 11 in relation to the person's device users may be obtained.

Similarly, the BLE radio signal strength data can be used to determine location of devices/persons 11a in the same manner. This positioning information can be communicated to third parties, using the BLE, Wi-Fi and other RF communications standard functionalities of a facility 11 over the network 12 of the facilities 11.

The facility 11 can also detect the presence of one or more persons 11a (and their devices), for example through motion, proximity and/or object sensor (e.g., using IR motion sensor, heat sensor or similar).

The facility 11 (in this case luminaire module) may also comprise an optional removable router/RF signal enhancer, to improve communications signals.

In addition to the lighting, communications and positioning functionalities, the facility 11 can also be configured or adapted to comprise optionally one or more of the following.

It can have a UPS backup power socket 48 for supporting power from the UPS to the nearest network interface device (internet network terminal) and external access point/router/gateway in normal time and in power outage as well. It secures power supply to the communication network terminal of the ISP (internet Service Provider) by connecting such network interface device to its UPS socket. This way, the device can function as normal in a black out in a reasonable time frame, so as to supply uninterruptible power in a power-cut to secure the internet and Wi-Fi service access for the local area network. The socket 48 can also be used to power other external devices, such as those carried by occupants/persons 11a who may be stranded/trapped in the building 10 and may be in need for power to maintain communication within and outside of the building 10; and more importantly, for revealing their (i.e., their device's) position and/or the position of one or more facilities 11 which are in proximity to the person 11a (and therefore their device). The facility 11 can also use the UPS (e.g., two-stage UPS) to supply backup power to the modem/router/Wi-Fi.

It can have a USB power charging socket for charging devices, such as mobile communications devices (e.g. mobile telephone). It can also have a wireless charging holder for the person's 11a device. There can be an AC power supply for supplying normal A/C powered appliances or other devices.

There can be an AC power supply for the facility 11 itself, which can be hardwired to the mains power supply, or connected via a typical power plug.

It can also have a device holder for receiving and/or charging devices, either through the power socket or via inductive charging; from the UPS or from the mains supply accessible by the facility 11.

A removable router/FR signal enhancer unit can be provider. This can be extracted by a person 11a and taken with them to improve/extend coverage and communications between their device to the facility 11 or to other communications networks.

An emergency torch can be coupled to the facility 11, which will activate when the lighting is activated. It can be charged from the facility 11 power supply.

Not all components described necessarily need be provided, and merely a subset of them may exist.

Figure 5:
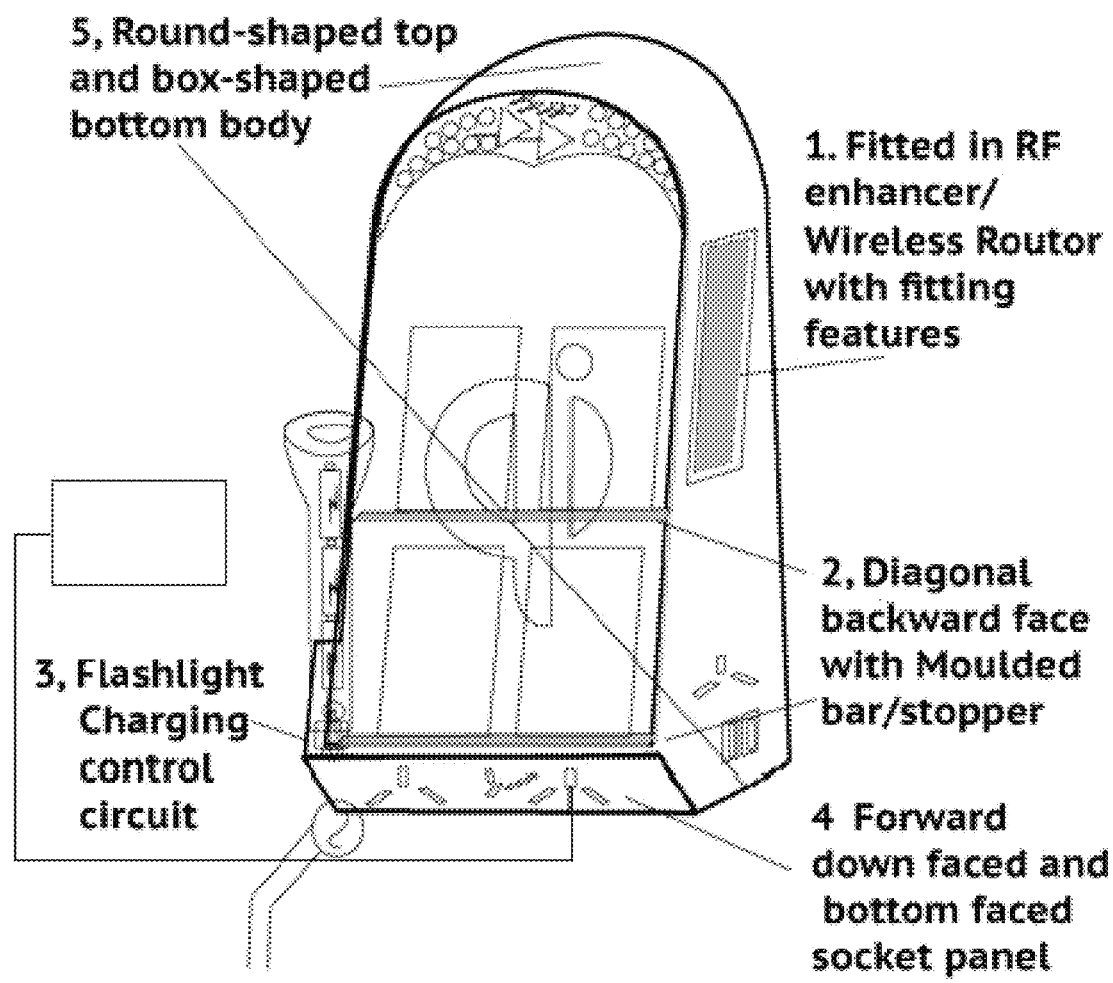
FIG. 5 shows in diagrammatic form an exemplary embodiment of a physical configuration of a facility according to embodiments described herein, and with removable communications components.

FIG. 5 shows one possible physical form of the luminaire module. It comprises a housing with a round shape top and box shape bottom body, and RF in hearts/wireless router, which is removable and fitted within the body, a torch adapted to attached to the outside of the body, various charging and power ports, and a diagonal backward face with mould bar stopper to facilitate wireless charging for mobile devices.

Figure 6:
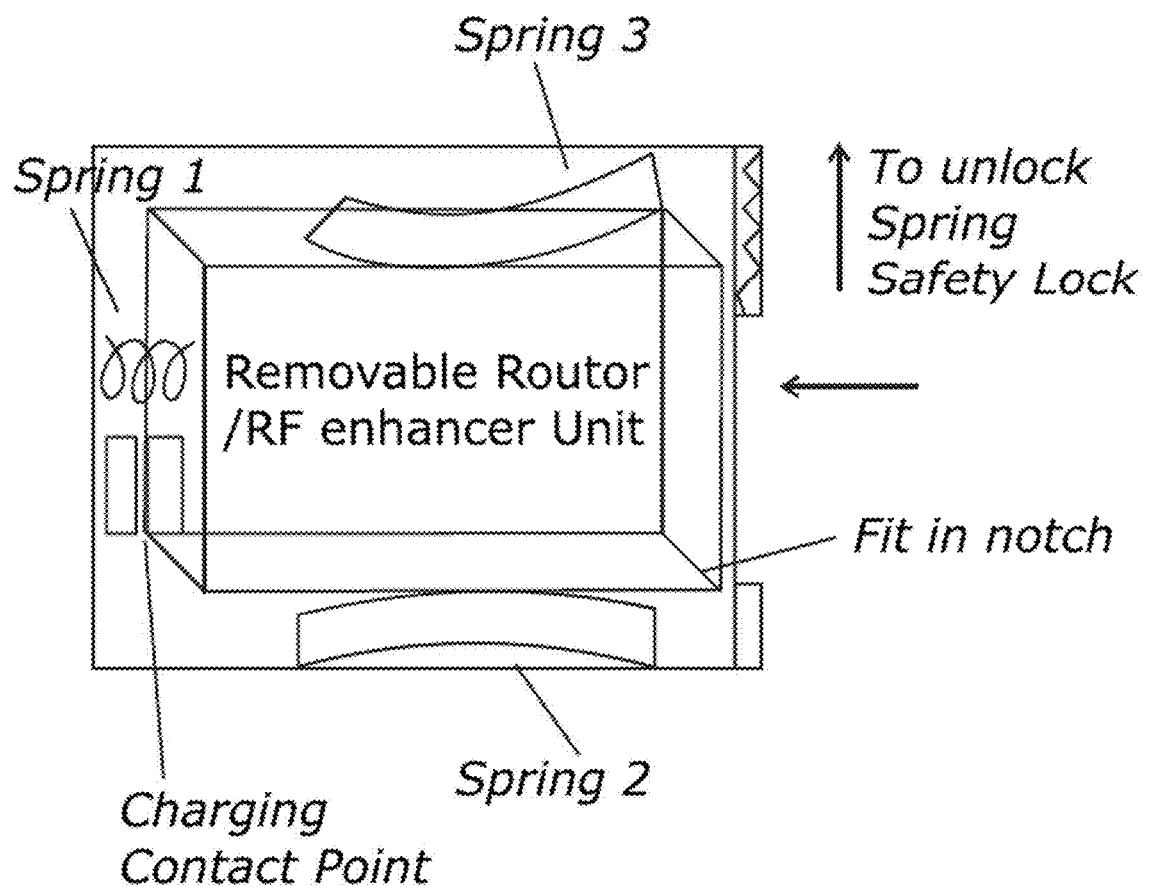
FIG. 6 shows in diagrammatic form the configuration of removable communications components for use with the facility of FIG. 5.

FIG. 6 shows the removable communications module, which is a press fit/spring fit into the luminaire module housing. The communications module comprises a board with the communications module on it. There is a charging contact point to couple to a corresponding charging point within the housing of the luminaire module. Two springs within the luminaire module housing and 1 spring on the removal unit itself are provided. To install the removable communications module, the spring lock/stopper is pressed upward before pushing the body and would against the spring 1 which pushed the body into the fit and the Notch, while the spring safety lock keeps the body in place. The lateral springs hold the removal communications module in place on the notch. To remove the communications module, the spring safety lock stopper is unlocked before pushing the body against the spring and the body lifts up before bouncing outwards.

Figure 7A:
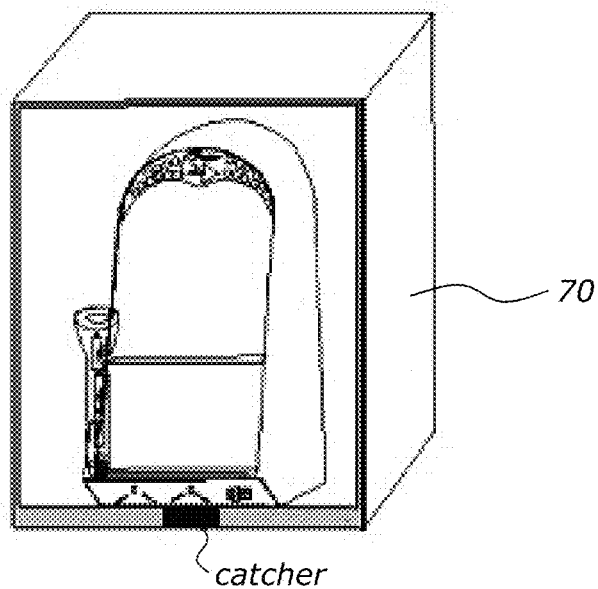
FIG. 7A, 7B shows a housing fixture to house/mount the facility, in a wall for example.
Figure 7B:
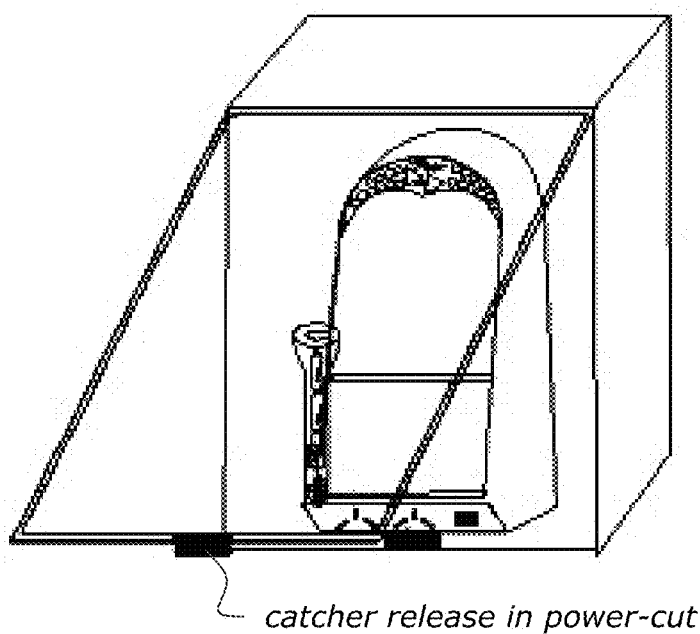

Each facility 11 can be mounted in a suitable location, such as on a wall. It can be fitted to the wall at appropriate height that is reachable by a person 11a at key locations of exit and entrance points, fire access, stairways, corridors, passages and other confined space/room in a building. Referring to FIG. 7, a box or housing fixture 70 can be used to mount each luminaire on a wall or in a recess/cavity in the wall. The luminaire sits within the housing. The face/door of the housing has a catch, such as an electric magnetic-catch door openable upward with the catch on the bottom frame. It may be made with light-weight material of clarity, e.g., clear plastic, with a frame that comes with the electric magnetic catching point/device controlled by the AC power, wherein such face/door is released at AC power failure. The luminaire can be wired to the AC power supply and/or be connected via a standard power point.

This is just one exemplary embodiment of a luminaire and lighting, communications and location/detecting system. Those skilled in the art will appreciate that variations are possible. Some more embodiments are now described

Exemplary Embodiment—Single Stage UPS Exit Sign Ceiling Mounted Luminaire

Figure 4A:
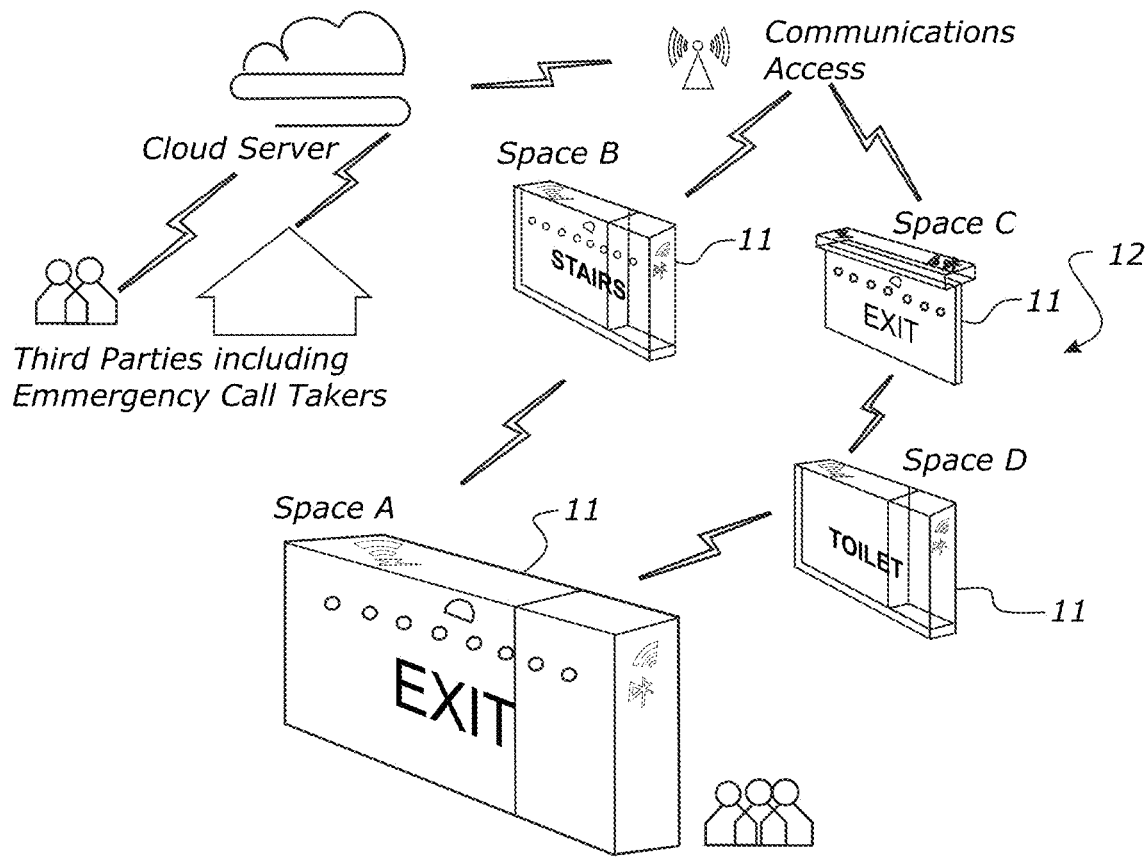
FIG. 4A shows in diagrammatic block form another exemplary embodiment of a network of facilities configured according to embodiments described herein for providing communications and/or location functionalities.
Figure 4B:
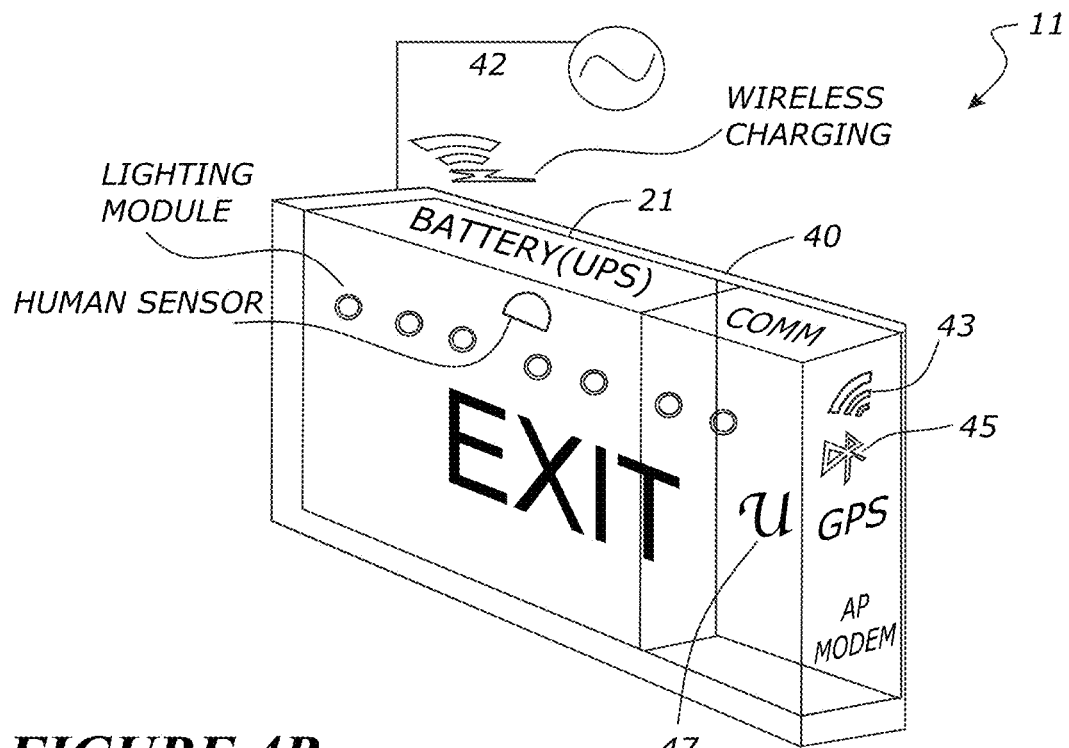
FIG. 4B shows in diagrammatic block form an exemplary embodiment of a facility use in the network of FIG. 4A.
Figure 4C:
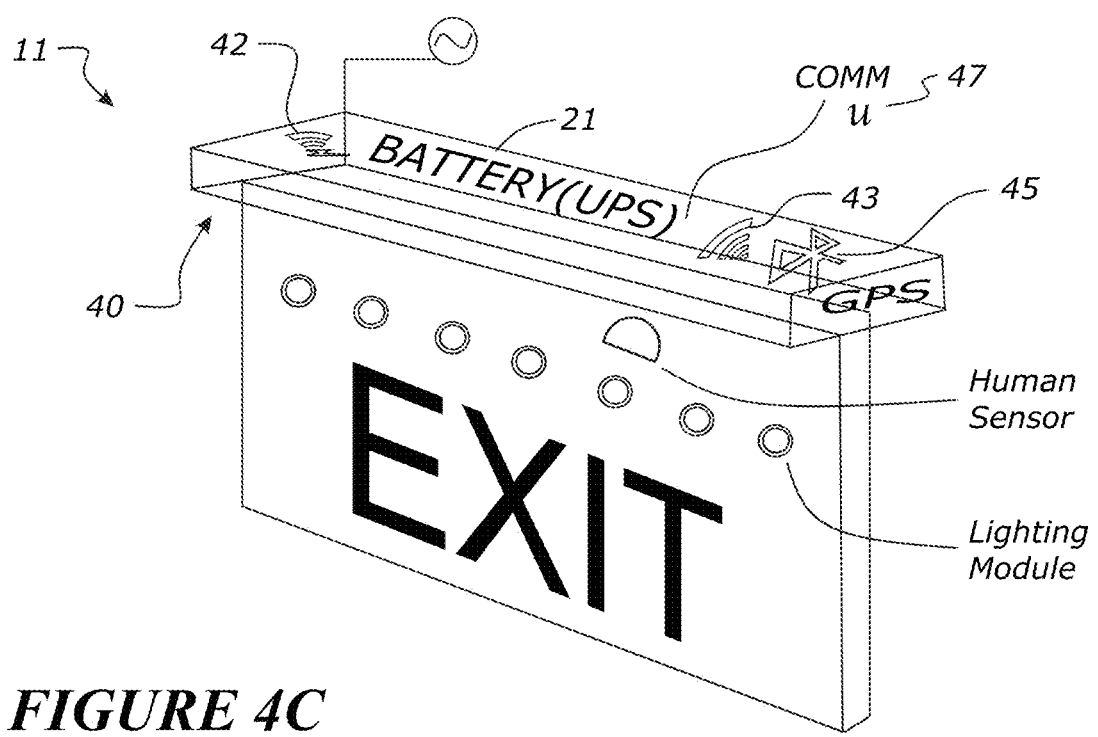
FIG. 4C shows in diagrammatic block form an exemplary embodiment of a facility use in the network of FIG. 4A.

FIGS. 4A-4C show an alternative embodiment. This embodiment has many of the same features as the first embodiment, but it has some differences. For example, the embodiment shown in FIGS. 4A-4C does not have a UPS backup power socket 48, nor does it have a USB power charging socket, nor an emergency torch. Other embodiments with different combinations are possible also.

Exemplary Embodiment—Dual UPS Luminaire

Another exemplary embodiment will now be described. This embodiment uses a dual stage UPS (uninterruptible power supply) for additional backup. This could comprise a single UPS with two stages or modes of operation, or a dual UPS with each UPS providing one of two stages or modes of operation (that is, power supply). Many aspects of the embodiment of the same of those previously described, but some description will be made here. Insofar that the embodiment is not fully described, it will be appreciated by those skilled in the art that the description for the embodiments above will be relevant here.

Figure 8:
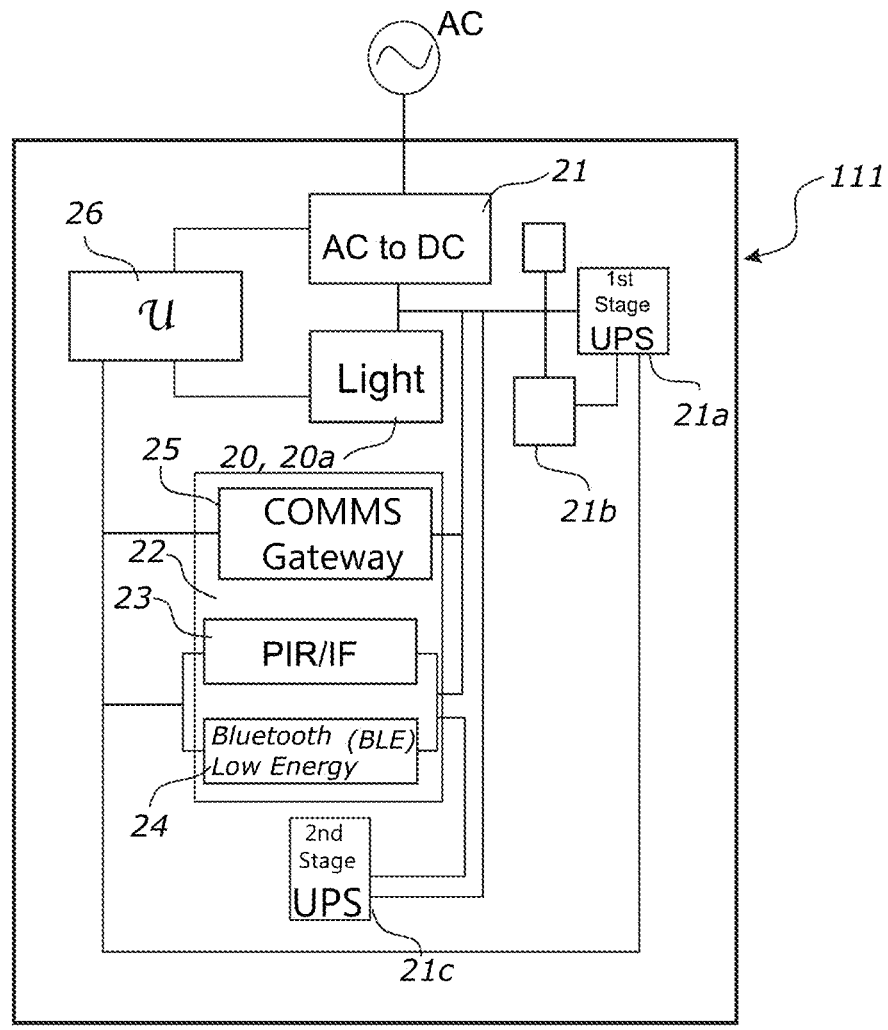
FIG. 8 shows in diagrammatic form a dual stage UPS facility embodiment.

FIG. 8 shows in general schematic diagram block diagram form an embodiment of a luminaire module 111 configured to provide the communications and/or location/positioning and power backup functionalities for detecting and locating presence of person(s) 11a in a building 10 and/or allowing for communications and power backup for such communications from the person(s) 11a. The luminaire module 111 comprises at least one (e.g. emergency) lighting module 20 & 20A (e.g., in the form of light emitting diodes (LED)), wherein the lighting module 20A may be activated and illuminated in response to an event, such as an emergency, while the lighting module 20 may be activated to illuminate ambient light at all times.

The luminaire module 111 also comprises normal AC to DC power supply and/or converter 21. It also has at least one external AC power point, and/or wireless charging point 21b that provides power backup for internet connection and external peripherals and device, such as internet network terminal, gateway/router, and/or users' devices during both normal times and/or power outages. The luminaire module 111 also comprises at least one communications module 22 comprising one or more communications components, and at least one detection and/or positioning module 23 providing one or more position detecting components, including motion sensor (e.g., PIR detector, heat sensor or similar), which can be activated during a power outage. The communication components can be one or more of Wi-Fi, Bluetooth (e.g. Bluetooth low energy (BLE) transceiver/transmitter 24, or the like. The communication components can be triggered to function during normal times, and/or when there is a power outage and/or during an emergency event. The communication components may also include one or more of Wi-Fi, BLE gateway for internet connection 25 or the like, which may be detachable from the luminaire module 111.

The location/positioning components can interact with a person's device (e.g., the device's built-in BLE sensor). Additionally or alternatively, the location/positioning components can also detect a person's motion and/or their infrared body heat. The location/positioning components can work in collaboration with one or more of BLE Beacons, Wi-Fi, magnetometer, gyroscope, barometer and accelerometer, infrared sensing, other built-in sensors within devices or the like. The location/positioning components can allow the luminaire module 111 to detect/locate/position person(s) 11a, and/or device(s) on a person 11a and/or the position of one or more luminaire modules 111 that are in proximity to the person 11a.

The luminaire module 111 has a UPS that operates in a first stage and a second stage (or two UPSs, one operating in a first stage and one operating in a second stage). Hereinafter, reference to a first and second stage UPS can refer to a single or double UPS arrangement, either of which can provide two stages of operation. Multiple modes of power supplies with multi-stage UPSs for dealing with power outages is provided for all components including lighting and all sensing and communication components in the luminaire module 111. The second stage UPS supply can simply supply power for maintaining detection and positioning presence of persons until normal power supply resumes. In this way, the second stage UPS can last for longer than the first stage UPS. The first stage can supply power to the luminaire module 111 (considered to have a relatively higher power consumption) for a first time period, whereas the second stage UPS can supply the less power demanding detection, positioning and communications functions. Therefore the UPS of the luminaire module 111 can power the detection, positioning and/or communication components and functions for a second time period, such that the second time period can be longer than the first time period. In normal operating conditions, AC power supply 21 is the primary power supplier; while during power outages, the first stage UPS is activated to support lighting elements and all communication and sensing components. After a predetermined period of time (e.g., 90 minutes as required by managed emergency lighting regulations) or if the UPS is running low on power, the UPS may switch from operating in the first stage to operating in the second stage so that the luminaire module 111 can continue to detect signals from persons' devices, and continue to detect body movement. The second stage provides a power source for the detecting, positioning and location functionality before normal power supply resumes. The UPS may optionally be removable/ detachable from the luminaire module 111. The UPS may comprise two battery units, with at least one battery unit being removable/detachable from the luminaire module 111.

A controller 26 may be provided to control functionality and components of the luminaire module 111. A standby detachable and chargeable torch 27 is provided.

Exemplary Embodiment—Socket/Holder Arrangement

Figure 8A:
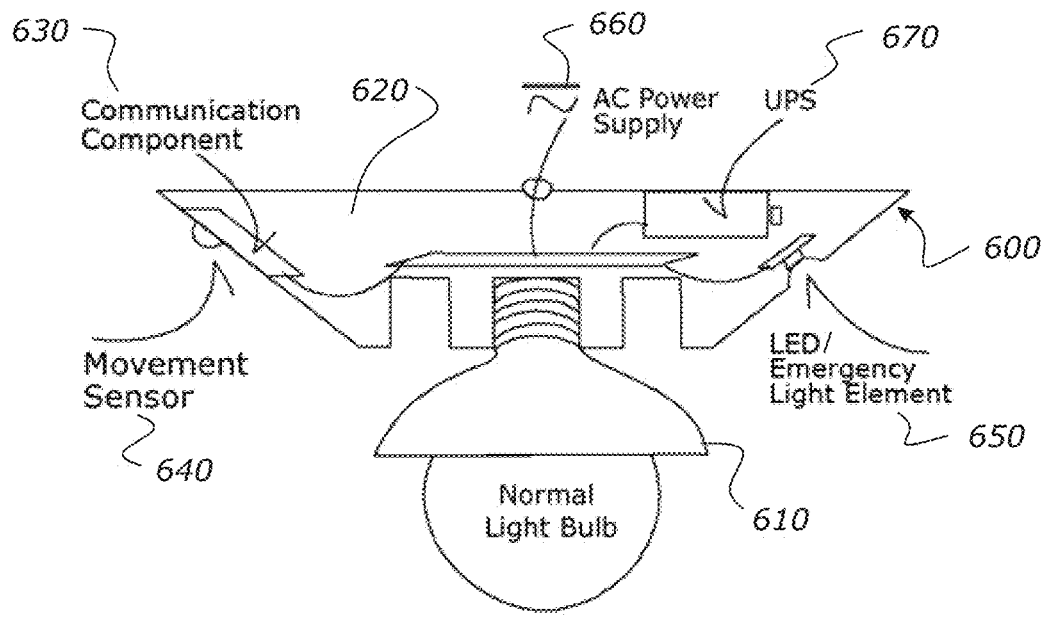
FIGS. 8A-8D show isometric views of the facility according to various possible embodiments of the present invention.

FIG. 8A shows another possible embodiment of the facility 11. In this embodiment, the facility 11 may be provided in a holder 600 arrangement. The facility 11/600 may comprise a main body 620. The facility 11/600 (e.g., its main body 620) may comprise one or more functionalities/features of any of the embodiments herein. For example, the facility 11/600 may comprise one or more of controller(s), movement/motion sensor(s) 640 (such as those described above), AC power supply 660 which may be connected to the power supply mains/system of the building 10, one or more communication components 630 (such as those described above), one or more emergency lighting elements 650 (e.g., LEDs) and a UPS 670. The UPS 670 may be a single stage UPS or a dual stage UPS, such as those described above.

The facility 11/600 (and perhaps its main body 620) may comprise one or more light (e.g., light bulb) receiving portions 610 that may be provided in a male or female (e.g., a socket) arrangement and may be configured to securably receive a lighting module or an ordinary/normal light bulb. To achieve this, the light receiving portion 610 may be provided in a screw/threaded or a bayonet mount/connector arrangement. Further, the facility 11/600 may be wall mounted or ceiling mounted (e.g., an exit sign), such as those described above.

It will be appreciated that the main body 620 of the facility 11/600 may be of any configuration and comprise one or more of the features listed immediately above. The light receiving portion 610 (and therefore the light bulb) and/or the one or more emergency lighting elements 650 may be connected to the AC power supply in normal operation circumstances or the UPS 670 in an event. In an event, the light receiving portion 610 (and therefore the light bulb) and/or the one or more emergency lighting elements 650 may not be able to receive AC power supply 660 from the power supply mains/system of the building 10 and so one or both of these features (e.g., the one or more emergency lighting elements 650 only) and a subset of components/features of the facility (e.g., one or more of controller(s), communication component(s) 630, movement sensor(s) 640) would receive power from the UPS 670 in a single stage or a two stage arrangement, as described herein.

Exemplary Embodiment—Integrated Configuration

Figure 8B:
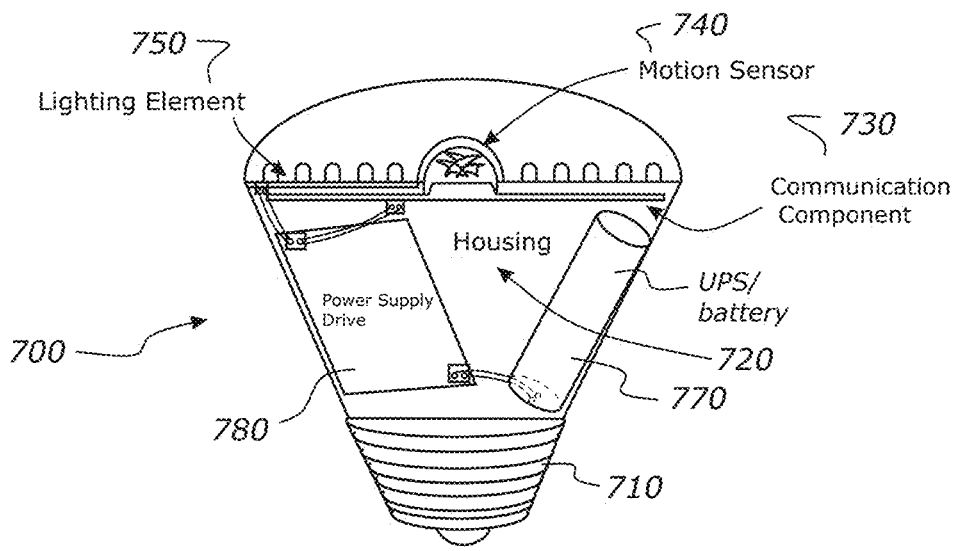

In yet another possible embodiment, the facility 11 and its one or more various features mentioned herein may be provided in an integrated arrangement/configuration 700. For example, the facility 11/700 of FIGS. 8B (show in a light bulb arrangement) and 8C (shown in a lampshade arrangement) comprises a housing 720 that is configured to securably contain one or more position detecting component(s) and/or one or more movement or motion sensors 740 (such as those described above), at least one lighting element 750 removably or permanently attached thereto, at least one emergency lighting element 790, AC power supply 760 which may be connected to the power supply mains/system of the building 10, one or more communication components 730 (such as those described above), a UPS 770 and a power supply driver 780. The UPS may be a single stage UPS or a dual stage UPS, such as those described above. Further, the facility 11 may be wall mounted or ceiling mounted (e.g., an exit sign), such as those described above.

It will be appreciated that the housing 720 of the facility 11/700 may be of any suitable configuration and comprise one or more of the features listed immediately above. The at least one lighting element may be connected to the AC power supply or the UPS, or both. In an event, the at least one lighting module may not be able to receive AC power supply from the power supply mains/system of the building 10 and so the lighting element may be adapted to receive power from the UPS.

Figure 8C:
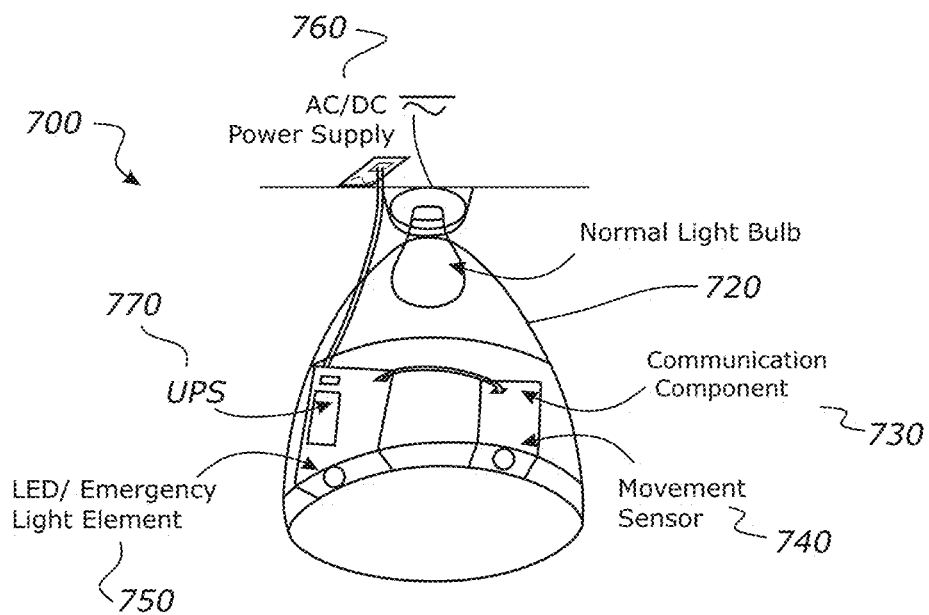

The facility 11/700 (and perhaps its housing 720) may be comprise one or more connector portions 710 where for example, the connector portion 710 is received by a cooperating portion in a ceiling or a wall. The connector portion 710 may be provided in a male (e.g., standard light bulb connector) or female arrangement and may be configured to be permanently or removably attached to a corresponding female (e.g., standard light bulb socket) or male cooperating portion, respectively. To achieve this, the connector portion 710 and the cooperating portion may be provided in a screw/threaded or a bayonet mount/connector arrangement. Further, the facility/fixing 11 may be wall mounted or ceiling mounted (e.g., an exit sign), such as those described above. The facility 11 shown in a lampshade arrangement in FIG. 8C may be configured to fit between an ordinary light bulb and the connector portion and/or the cooperation portion described above.

Wired/Cordless Desktop Phone/Device Arrangement

Figure 8D:
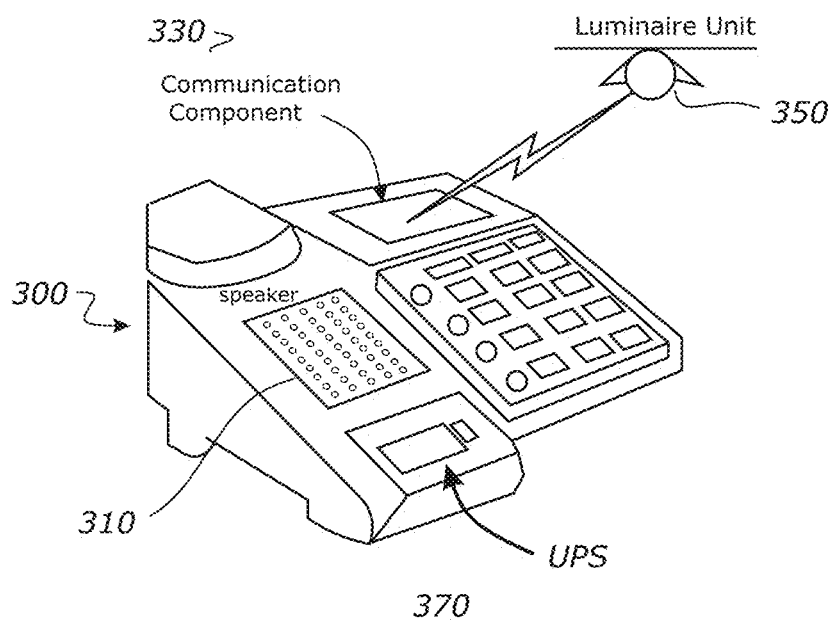

In yet another possible embodiment, the one or more facilities 11 may comprise wired and/or cordless desktop phone or other devices such a wired telephone/landline, such as the arrangement 300 depicted in FIG. 8D.

Each wired and/or cordless device 300 may comprise one or more various features of the facilities 11 mentioned herein. For example, the facility 11/700 may comprise (or subset of) at least one communication component 330 (e.g., RF) as explained above. The wired and/or cordless device 300 can further comprise a unique ID (e.g., civic address) which can represent the status and location of the wired and/or cordless device. Such data can be stored in a back-up local database, e.g., a "black-box" (as will be explained later) that may be configured to synchronize data to a cloud database. The wired/cordless device 300 may comprise one or more of dialing numbers, microphone(s), speaker(s), mains power supply, landline telephone connection optionally including private branch exchange (PBX), a cellular phone connection, a UPS 270 (single or multi-stage as will be explained later on) and a luminaire/LED module.

Upon activation indicating the occurrence of an event (which can be achieved in various methods, such as dialing the emergency numbers and/or a shortcut that indicates the occurrence of an event), the communication component can communicate data (for example, a request for a secure connection) with one or more facilities 11 in proximity to the person 11a who makes that particular call. By establishing a secure connection with one or more facilities 11 in proximity to the person 11a, the wired/cordless device 300 is able to communicate information to third parties (using local and/or cloud databases) regarding the location (e.g., civic address) of the person (and/or their device and/or the wired/cordless device) and/or the one or more facilities 11 in proximity to the person 11a (and/or their device and/or the wired/cordless device). The civic addresses may be of one or more of: the person, their device, the facilities/fixings of interest, the level(s)/room(s) of interest and the building(s) of interest.

On receiving the communication from the wired/cordless device, third parties are able to accurately and efficiently allocate and dispatch operators to the communicated location (civic address) of interest.

For the cordless version of the embodiment described above, a subset of the features/components may be coupled and/or placed in an all-in-one arrangement of the device, which may also comprise a dial pad and speaker.

Not all components described necessarily need be provided, and merely a subset of them may exist.

Figure 9:
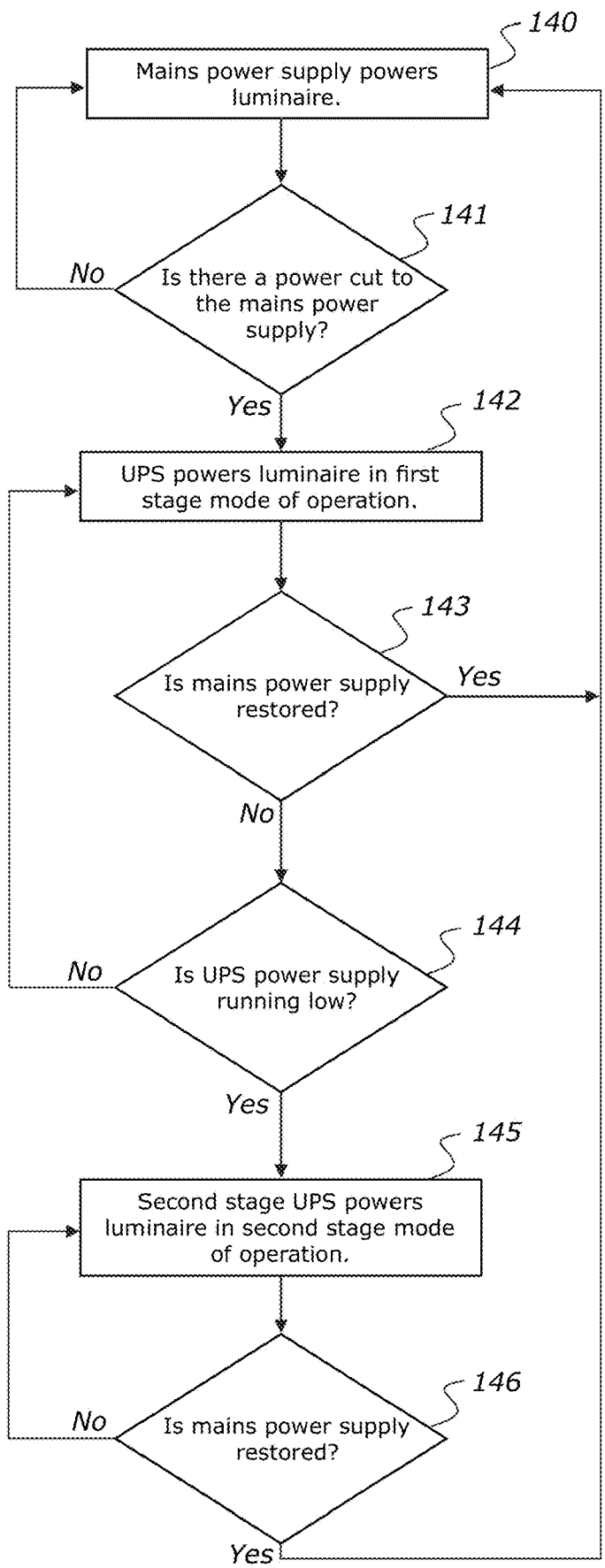
FIG. 9 is a flow diagram of how power supply is controlled in a dual stage UPS facility embodiment.

FIG. 9 shows a flow chart of the operation of the dual stage UPS luminaire module 111. The operation of the dual stage UPS is controlled by the controller. Discussion will now turn to how a multi-stage UPS can improve the reliability of the luminaire module 111 by way of example with reference to FIG. 9. In overview, the dual stage UPS provides 2 stages or modes of operation whereby in the first stage/mode for a particular (first) time period backup power is provided to all aspects of the luminaire module including functionalities provided by the lighting module 20, communications module 22, motion detector 23, Bluetooth beacon 24, gateway router 25 and controller 26. In the second stage/mode, for a second time period that may follow the first time period, only a subset of the components are powered. This subset of components may comprise components that are of a higher priority in an event. For example, the subset may comprise components providing location and/or communication functionalities including but not limited to motion detector 23, Bluetooth beacon 24, and controller 26. In the first time period, all functionality is powered, wherein in the second time period, only the subset of the more critical components are powered. This reduces the overall power consumption of the luminaire module 111 and as a result increases the time that the more critical components (for a particular purpose/application) can be powered by UPS.

More particularly, FIG. 9 shows a flow diagram of how a dual-stage UPS can operate within a luminaire module 111. By default, the luminaire module 111 is powered by power supply mains via the AC to DC power supply. If the building experiences a power cut, step 141, the luminaire module 111 can no longer be powered by the power supply mains and must instead be powered by the UPS operating in a first stage mode, step 142. While the luminaire module 111 is powered by the first stage UPS, the luminaire module 111 can continue to provide all the functionalities as described above, including functionalities provided by the lighting module 20, communications module 22, motion detector 23, Bluetooth beacon 24, gateway router 25 and controller 26. Preferably, the first stage UPS 21a may be configured to provide power for a duration of time that is longer than the power cut duration for supporting the full functionalities of the luminaire module 111, including power backup for internet connection. However, unless the mains power supply is restored to the building, step 143, the UPS may eventually run low on power, step 144. In this instance (or after a predetermined period of time), the UPS can switch operation from the first stage (mode) of operation to a second stage (mode) of operation, step 145. When the UPS is operating on its final stage of operation (in this example, it will be the second stage of operation), the controller restricts the supply of power to a subset of components/functions which are deemed to consume minimal amounts of power. For example, the controller may simply restrict the supply of power to just the communications module 22. Or more generally, the UPS operating in the second stage 21C becomes the power supplier for the motion detector 23, Bluetooth beacon 24, and controller 26 for maintaining communications detection/location functionalities inside the mesh network so that the motion detector 23, BLE beacon transceivers/transmitters 24 and the controller 26 remain active so that the communicating/detecting/locating capabilities of the luminaire module 111 remain operational. The second stage UPS may provide power for a longer period of time in comparison to the first stage UPS, since in the second stage (mode) the UPS only supports communications detection/location functionalities which result in lower energy consumption. Once the mains power supply is restored, step 146, the luminaire module 111 can draw power from the mains power supply. In this arrangement, the UPS may be recharged in order to have the ability to once again provide power in the first stage (mode) should it be required to do so (e.g., in another subsequent event).

A skilled person will recognise that the luminaire module 111 may be powered with three or more stages of UPS provided by one or more UPS. A skilled person will also recognise that there are other ways of controlling and/or restricting the supply of power to the various components within the luminaire module 111.

In summary, the dual stage UPS method of control in FIG. 9 can in one example do the following: In the first mode, the UPS (uninterruptible power supply) provides power to: at least one lighting module 20, at least one communications component (module) 22, at least one person(s) detection and/or positioning component, such as a motion detector 23, a Bluetooth beacon 24, a gateway router 25, the controller 26. The detection and/or positioning component may be configured to detect the position of the one or more luminaire modules 111 in proximity to the person's device(s) (e.g., the digital address of the one or more luminaire modules 111) and/or the position of the person (and therefore their device(s)). In the second mode, the UPS (uninterruptible power supply) provides power to: at least one person detection and/or positioning component, such as a motion detector 23, the Bluetooth beacon 24, the controller 26; and wherein the UPS (uninterruptible power supply) is configured to switch from operating in the first mode to the second mode when power is running out or after a predetermined amount of time. Preferably, the controller 26 is configured to be powered by the UPS at all times.

FIG. 10 shows in block diagrammatic form how the dual stage UPS luminaire module 111 (and any other abovementioned embodiment of the facilities/fixings 11) may be installed. A wall mounted emergency luminaire module 111A and a ceiling mounted emergency luminaire module 11b as described herein. This provides a network of nodes, for detection, position/location of persons and their devices using modified and reconfigured emergency luminaires modules 111. Two such luminaire modules 111a and 11b are shown by way of example, but it will be appreciated that any suitable number and configuration (such as those described above) of emergency luminaire modules 111 could be provided to adequately provide coverage and functionality to the building in which the network is installed. In addition to the wall mounted emergency luminaire module 111a, other designs of emergency luminaire modules (also configured with communication and location functionality but packaged in a different form) 111 may also be envisioned. For example, two ceiling or wall mounted luminaire modules 11b can be provided, along with an emergency exit sign luminaire in a corridor and a wall mounted luminaire module 111a anywhere in the building in propagation range.

Each luminaire module 11 can be mounted in a suitable location, such as on a wall and or ceiling as disclosed in FIG. 10, wherein, one or more of wall mounted luminaire modules 111a can be fitted on the wall at appropriate height that is reachable by a person such as above the floor at 2 meters at predetermined locations of exit and entrance points, fire access, stairways, corridors, passages and other confined space/room, such as private home, building manager's office in a building. On the other hand, the ceiling or wall mounted luminaire modules 11b may be installed in place of conventional emergency lighting and light units (which are there specifically for meeting legal emergency lighting and light requirements under jurisdictions of any countries).

Figure 11:
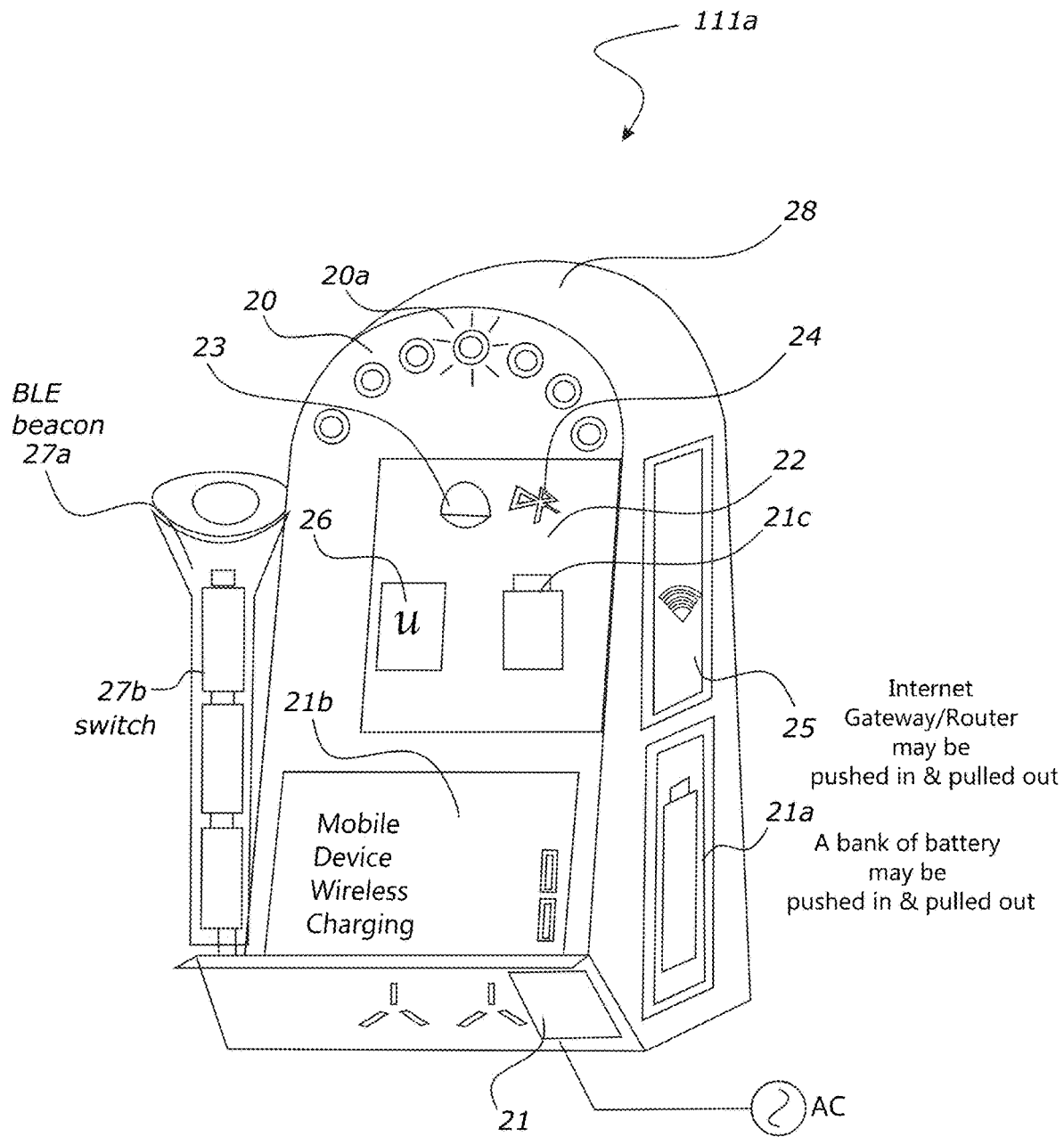
FIG. 11 shows an exemplary ceiling mounted dual stage UPS facility embodiment.

FIG. 11 shows one possible physical form of a wall mounted luminaire module 111a as described above with reference to FIGS. 8 and 9. It comprises a housing 28 with a round shape top and box shape bottom body, an RF in-house/wireless router which is removable and can be fitted within the body, a torch adapted to be attached to the outside of the body, various charging and power ports, and a diagonal backward face with mould bar stopper to facilitate wireless charging for the person's device(s). The luminaire module 111a may comprises a mains power supply 21 and an uninterruptible power supply (UPS) (e.g., in the form of a bank battery) and a controller 26 that may be provided to control the components and overall functionality of the wall mounted luminaire module 111. The wall mounted luminaire module 111a may also comprise an inductive wireless charging unit 21b for charging the UPS, peripheral components, or external devices such as mobile telephones from the UPS. The wall mounted luminaire module 111a has lighting modules 20 and 20A (e.g., in the form of light emitting diodes (LED)), which are powered from the mains power supply 21. The wall mounted luminaire module 111a may also have appropriate lamp shading. The wall mounted luminaire module 111a can contain circuitry that triggers/activates the wall mounted luminaire module 111 when there is an event, such as an emergency, wherein the lights will be activated and illuminate. For example, wall mounted luminaire module 111a might be triggered when the mains power/AC power supply is cut. Alternative forms of triggers could be utilised to provide a warning signal across all the luminaire modules in the local luminaire network, for example in a localised area of a floor level. The wall mounted luminaire module 111a may be triggered through a device in proximity, i.e. a device could activate the wall mounted luminaire module 111a to illuminate, and carry out the communications, detection and/or positioning functions and issue an emergency alert.

The communications component 22 comprises one or more communications components of mobile device detection and/or position module being one or more of: a Wi-Fi and/or Bluetooth transceiver and/or beacon transmitter that has internet protocol connectivity, such as IPV6, an internet connectivity gateway, and/or a removable modem router/RF signal enhancer using IEEE 802.11 networking standards. The Bluetooth transceiver and/or beacon transmitter may be integrated in the above-mentioned detection and/or position module; and/or coupled to the UPS individually using Universal Serial Bus (USB) protocols; or may be an individual unit that can be detachable from the wall mounted luminaire module 111a, such as a button cell battery. The parameters in communication by the Bluetooth transceiver and/or beacon transmitter may contain information about the physical location of the building the wall mounted luminaire module 111a is located in including: physical address as per public information data system, and horizontal and vertical position information of the emergency luminary apparatus deployed in the building. This information can be crucial for enabling the rescuer to trace the building occupant's whereabouts, especially during power outages when such information is predominately acquired by GPS and WiFi pinging an access point IP address, but could be disrupted by power cuts.

The wall mounted luminaire module 111a can detect the presence of one or more persons, for example through motion, proximity and/or object sensor 23 (e.g. using IR motion sensor, heat sensor or similar) to detect persons who may not necessarily have a working device.

The Bluetooth low energy transceiver/transmitter 24, powered by the multi-stage UPS, may be provided to facilitate communications between the wall mounted luminaire module 111a and the person's device to communicate with third parties inside and/or outside the building 10. The wall mounted luminaire module 111a can acquire position/location data using BLE, WiFi, and or cellular technologies; and in conjunction with the person's device's built-in proximity positioning sensors, such as GPS, WiFi, Bluetooth, initial sensor of gyroscope, earth magnet compass, or accelerator, the wall mounted luminaire module 111a can be adapted to facilitate indoor positioning of the wall mounted luminaire module 111a and/or the person (and their device) inside the building 10.

The BLE radio signal strength data acquired from the BLE beacon can be used to map out position/location of devices (which can be assumed to represent a person's location in the building 10). The RSSI (Received Signal Strength Indicator) as measured by a device can be calibrated to provide an estimate of a device location relative to a BLE beacon. For a device to be positioned by Bluetooth beacons, such power calibration involves a process in which the alert mobile device actively scans and measures the signal strength output of the beacon transmitters in proximity. During scanning three radio signals, in conjunction with, trilateration (with kalman filtering and finger printing method) can enhance positioning accuracy. This involves an onboard or off board processor and/or an onsite/offsite server that can receive and process/calculate the radio signal strength indicator provided by the nearby device to determine the position of the device (and therefore the person carrying the device) relative to the wall mounted luminaire module 111a. In particular, the radio signal (fingerprint) issued from all of the Bluetooth beacon transmitters in the building may be collected/recorded physically/manually during the instalment and deployment of the wall mounted luminaire module 111a and system to form a data look up table which can be stored in the server. When a device is in proximity of a BLE beacon, the positioning process described above can be initiated. The mobile device's MAC ID and Radio Signal Strength Indication (RSSI) fingerprint may be sent to the server to calculate its position based on data previously stored in the server. The process of collecting data maybe done by subscriber device using a software tool kit, which is available from the server's application and may be installed in the user's or subscriber's device, such as smart phone. Therefore, RSSI radio signal (fingerprint) data acquired by the BLE beacon transmitters in relation to the device users may be retained in the server and updated as long as the device remains in proximity to a BLE beacon.

Acquired data representing the position of a real person and their device and/or a luminaire module in proximity to a real person may initially be stored and processed in the peripheral components of the wall mounted luminaire module 111a. The acquired data may then be transmitted to a central controller 26 of wall mounted luminaire module 111a assigned as the proxy master luminaire module before it is sent to the system platform cloud server, in which the positioning data may be shared with third parties. Having a network of emergency luminaires modules 111 (with each luminaire module 111 in the network configured with a gateway/modem router to facilitate personal communication and power backup) allows persons in the building to instigate online and/or offline communications with third parties (including emergency services, and Public Safety Answering Points in the US) even if the usual telecommunications systems (such as, optical fiber, fixed wireless, Wi-Fi Internet, communication satellite, mobile telephony services and/or landline telephony services) are not functioning because of a power outage. The communications power backup functionality enables persons stranded in power outages in the building 10 to send alerts, text messages, voice/video messages, or any other data or communications to those third parties, by using a personal communications device such as a mobile telephone. This enables them to obtain assistance, indicate their whereabouts and existence, and generally exchange information with third parties such as those outside the building 10 during an abnormal event/emergency.

The wall mounted luminaire module 111a may also comprise a Wi-Fi communications circuitry 25 (e.g. Wi-Fi access modem and/or router) forming part of a communications module 22 and may be powered by a UPS. It can communicate with a person's device in proximity to the wall mounted luminaire module 111a. The Wi-Fi router is coupled to an ISP gateway connected with the wire and/or wireless network terminal, such as optical fiber, fixed Wireless, satellite communication at the premises to provide a means for communication by internet protocol communications to relay communications from a person's communications device via the network 12 to a third party. The ISP gateway could be in the wall mounted luminaire module 111a itself (router and/or modem), or alternatively, could be external and permanently or removably connected to the wall mounted luminaire module 111a. In the case of a network terminal and modem 25, the network terminal and modem may also have a RF signal enhancer functionality such as Wi-Fi mesh to improve communications signals. Such Wi-Fi access point can also facilitate indoor positioning similarly to the Bluetooth transceiver/transmitters functionalities configured in the wall mounted luminaire module 111a as described above.

In addition to the emergency lighting, power backup & communications and positioning functionalities, the wall mounted luminaire module 111a can optionally be configured or adapted to comprise one or more of the following.

The wall mounted luminaire module 111a can have a UPS backup power socket 21b for supplying power from the AC power supply 21, and/or for an uninterruptible supply of power (from UPS 21a) to the nearest network interface device (internet network terminal such as optical fiber network terminal) and external access point/router/gateway of either optical fiber, fixed Wireless and/or satellite communication in normal time, as well as a power outage. The wall mounted luminaire module 111a provides power supply to the communication network terminal of the ISP (internet Service provider) by connecting the network interface device to its UPS socket. This way, the device can function as normal in an event where there is not supply of the mains power (e.g., a black out) in a reasonable time frame, so as to supply an uninterruptible source of power to secure the internet and Wi-Fi service access for the local area network. The socket 21b can also be used to power other external devices, such as those carried by occupants who may be stranded in the building and may want to recharge their device to communicate with others within and/or outside of the building 20; and more importantly, to disclose their indoor position or the position of one or more facilities/fixings 11 (in this case wall mounted luminaire modules 111a) in proximity to the person. The wall mounted luminaire module 111a can also supply UPS power backup to the Wi-Fi modem/router for a reasonable length of time under the multi-mode power supply by at least two stages as disclosed above.

The wall mounted luminaire module 111a can have a USB power charging socket for charging devices, such as mobile communications devices (e.g. mobile telephone). It can also have a wireless charging holder for a mobile communications device. There can be an AC power supply for supplying normal A/C powered appliances or other devices.

The wall mounted luminaire module 111a can have an AC power supply 21 for the luminaire 11a itself, which can be hardwired to the mains power supply, or connected via a typical power plug.

The wall mounted luminaire module 111a can also have a device holder for receiving and/or charging devices, either through the power socket or via inductive charging. The charging may be achieved by drawing power from the UPS backup power socket 21b in connection with the UPS 21a or from the mains supply 21 accessible by the wall mounted luminaire module 111a.

A removable modem/router unit with RF signal enhancer 25 as disclosed above may also have an RF signal enhancer functionality such as Wi-Fi mesh, to improve communications signals. The removable modem/router can be extracted by a person and taken with him to improve/extend coverage and communications from their device to the wall mounted luminaire module 111a or to other communications networks.

Similarly, a set of detachable power bank coupled to the UPS battery 21a can be extracted by a person to be used as a portable power backup for electronic devices such as smart phones, laptops, wearable devices, etc.

An emergency torch 27 can be coupled to the wall mounted luminaire module 111a, which can be charged from the UPS 21a. A BLE beacon transmitter 27a may be embedded inside the torch, in which the chargeable battery of the torch can provide stable power supply to the BLE transmitter. In a power outage, persons in a building can use the emergency torch that is readily on stand-by with full chargeable battery level. The torch 27 upon flicking a switch 27b, can illuminate, but also can trigger an emergency alert, wherein, the embedded BLE transmitter can communicate with the wall mounted luminaire module 111a proximate to the person to report position and movement by BLE radio wave, in a similar manner to how the movement of a device can be traced.

Not all components described necessarily need be provided, and a subset of them may exist only. It will be appreciated that the features described with regards to the wall mounted luminaire module 111a may be applicable to other embodiments and examples of the facility/fixing 11.

Figure 12:
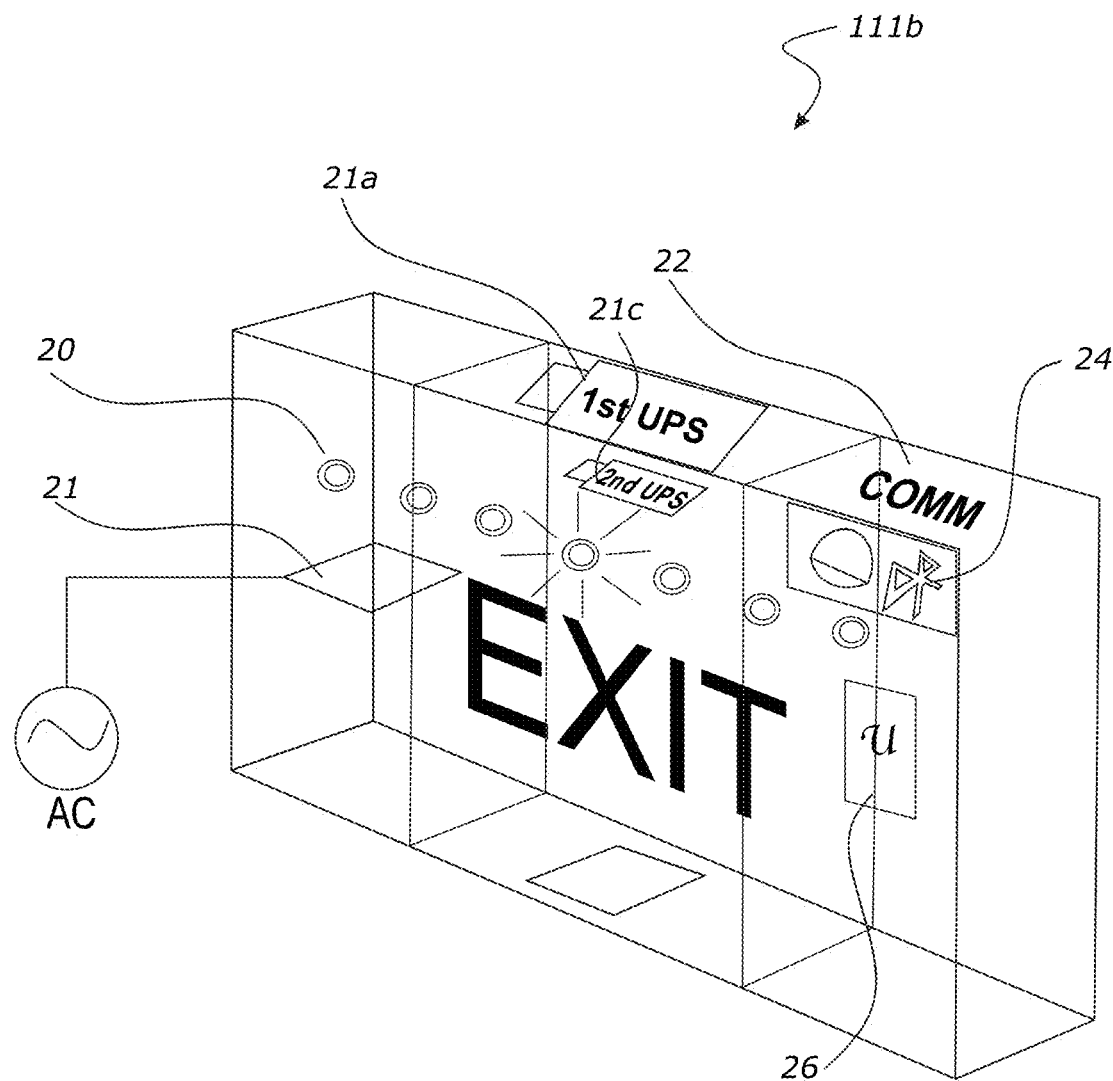
FIG. 12 shows an exemplary exit sign dual stage UPS facility embodiment.

FIG. 12 shows another possible physical embodiment of the fixing/facility 11 in the form of a ceiling or wall mounted luminaire module 111b. The ceiling or wall mounted luminaire module 111b may be in common areas, such as fire escape exit routes, stairways for emergency evacuation; and also in hallways, lobbies, mezzanine and other places in the building where occupants are likely to be. The ceiling or wall mounted luminaire module 111b may be installed on private premises, and/or used as normal emergency lighting in response to events (e.g., power cuts) for facilitating provision of assistance during or after the event.

Many jurisdictions set mandatory distance visuality for providing minimum emergency lighting for evacuation (e.g., 24 meters visuality). Often in narrow spaces (such as corridors, escape routes, stairways), there may not be enough nodes for trilateral positioning, since trilateral positioning requires at least three radio points. This arrangement is common in many buildings, where deployment of the luminaire module 111 and/or joined provisioned nodes of other facilities is fewer than three in proximity. Further, it may not be possible to use BLE trilateration to estimate a person's location as the person may not possess working device, such as mobile device 112b. It is also possible that the motion sensor 23 can capture the positions of all building occupants in a building. This is useful for reporting the total number of persons in a building.

Figure 24:
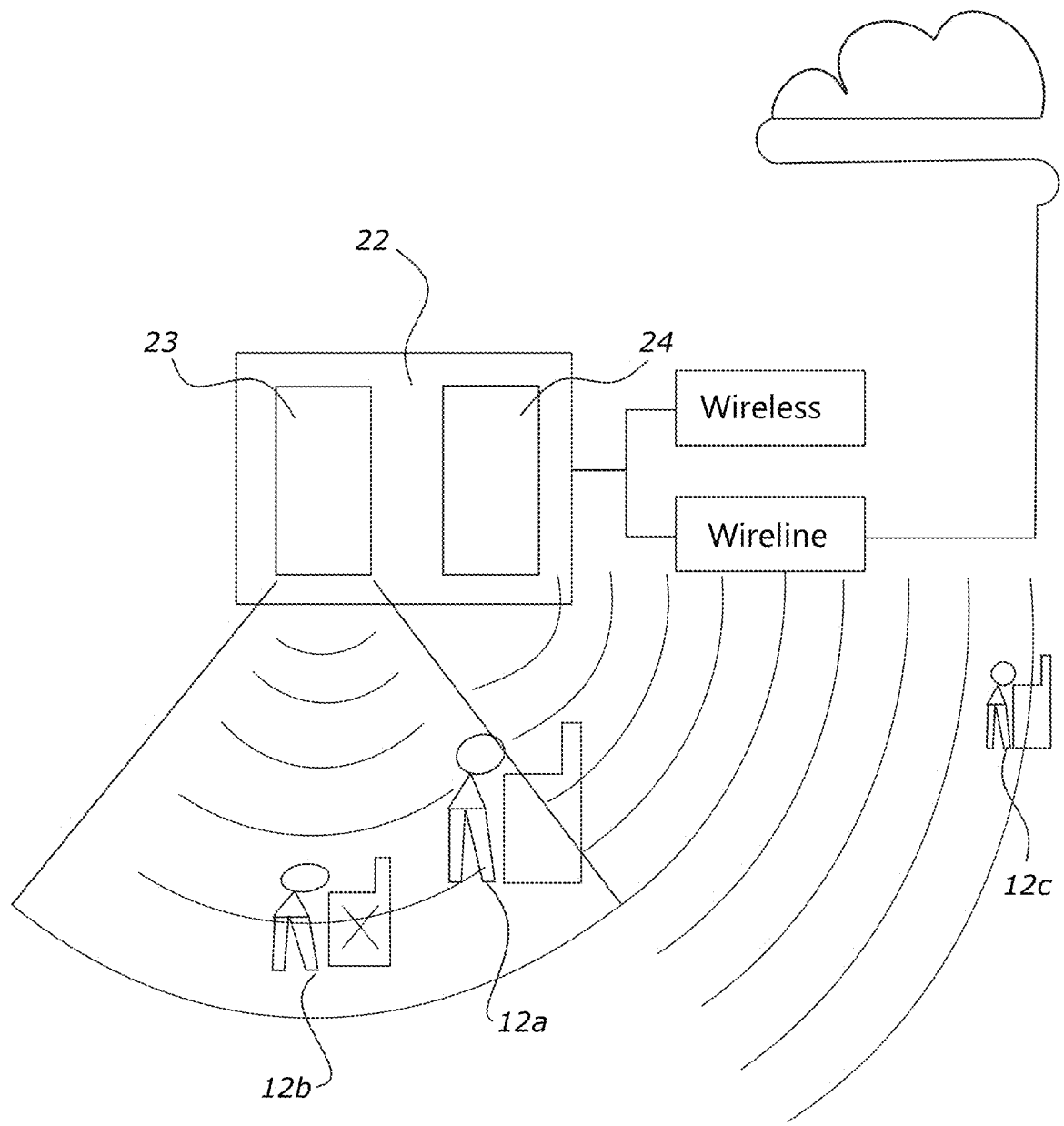
FIG. 24 shows how a facility can employ a dual-mode method of detecting building occupants.
Figure 25:
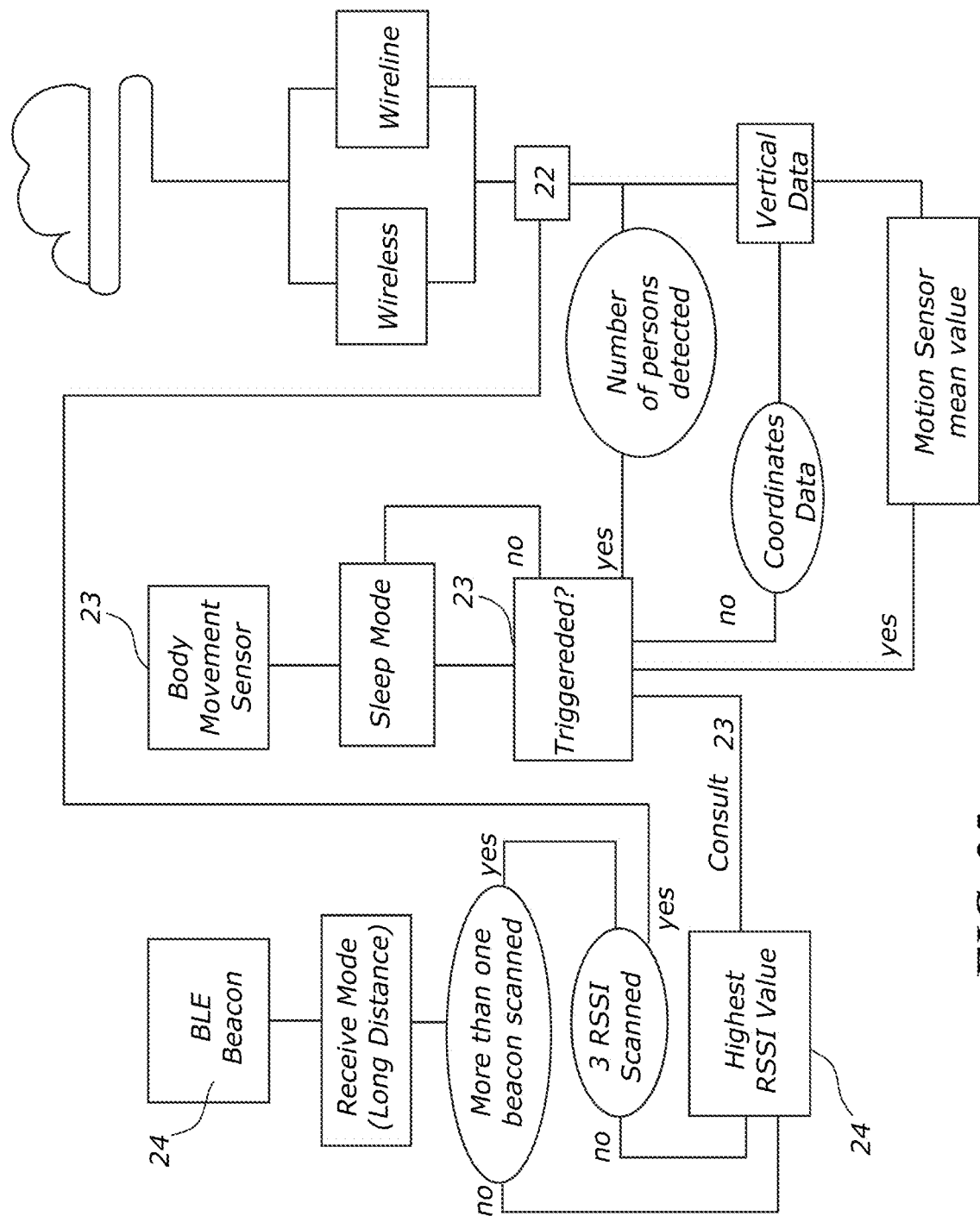
FIG. 25 is a flow diagram of how a facility can employ a dual-mode method of detecting building occupants.
Figure 26:
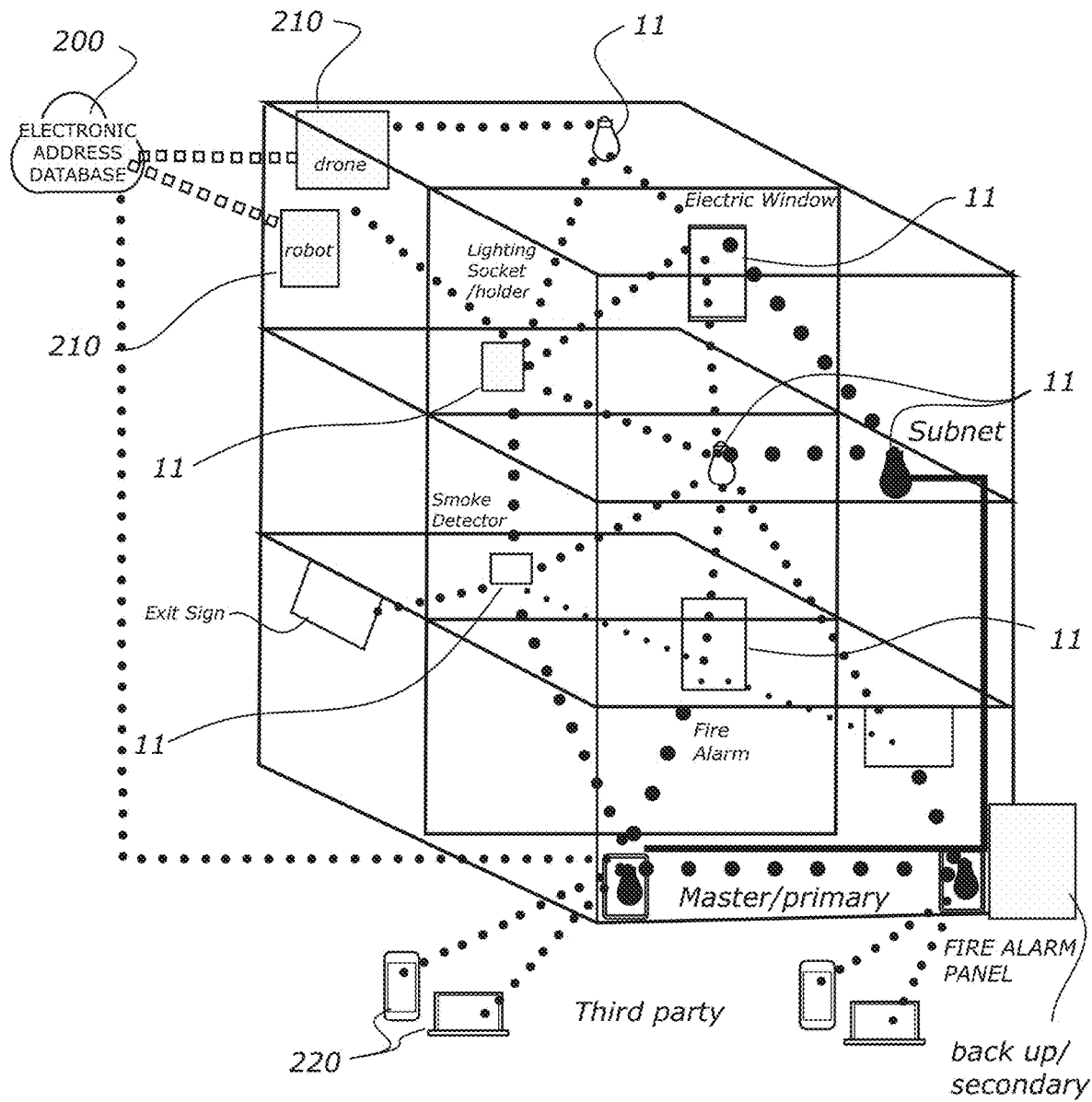
FIGS. 26-32 show overviews of various exemplary use case scenarios.
Figure 27:
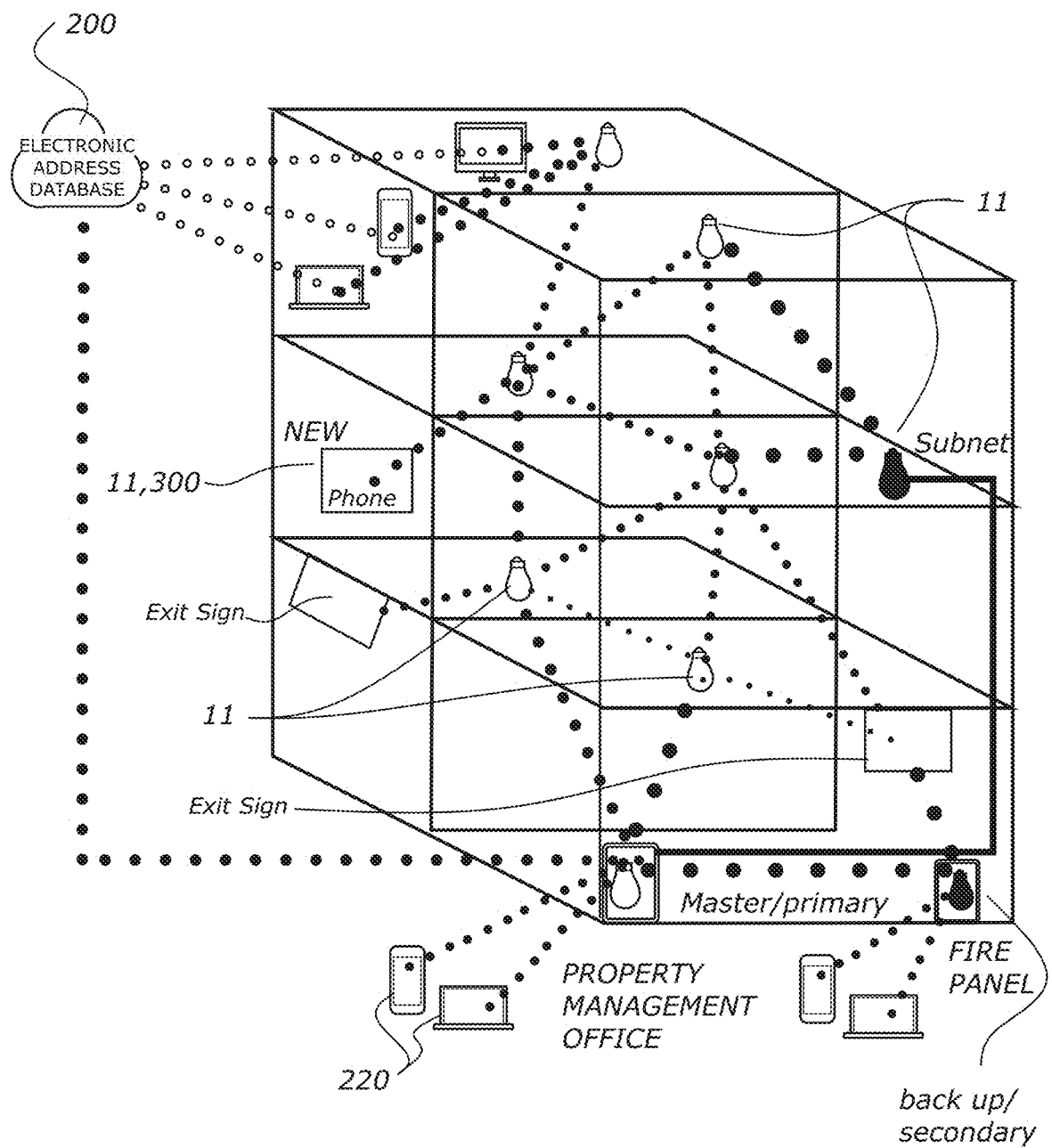
Figure 28:
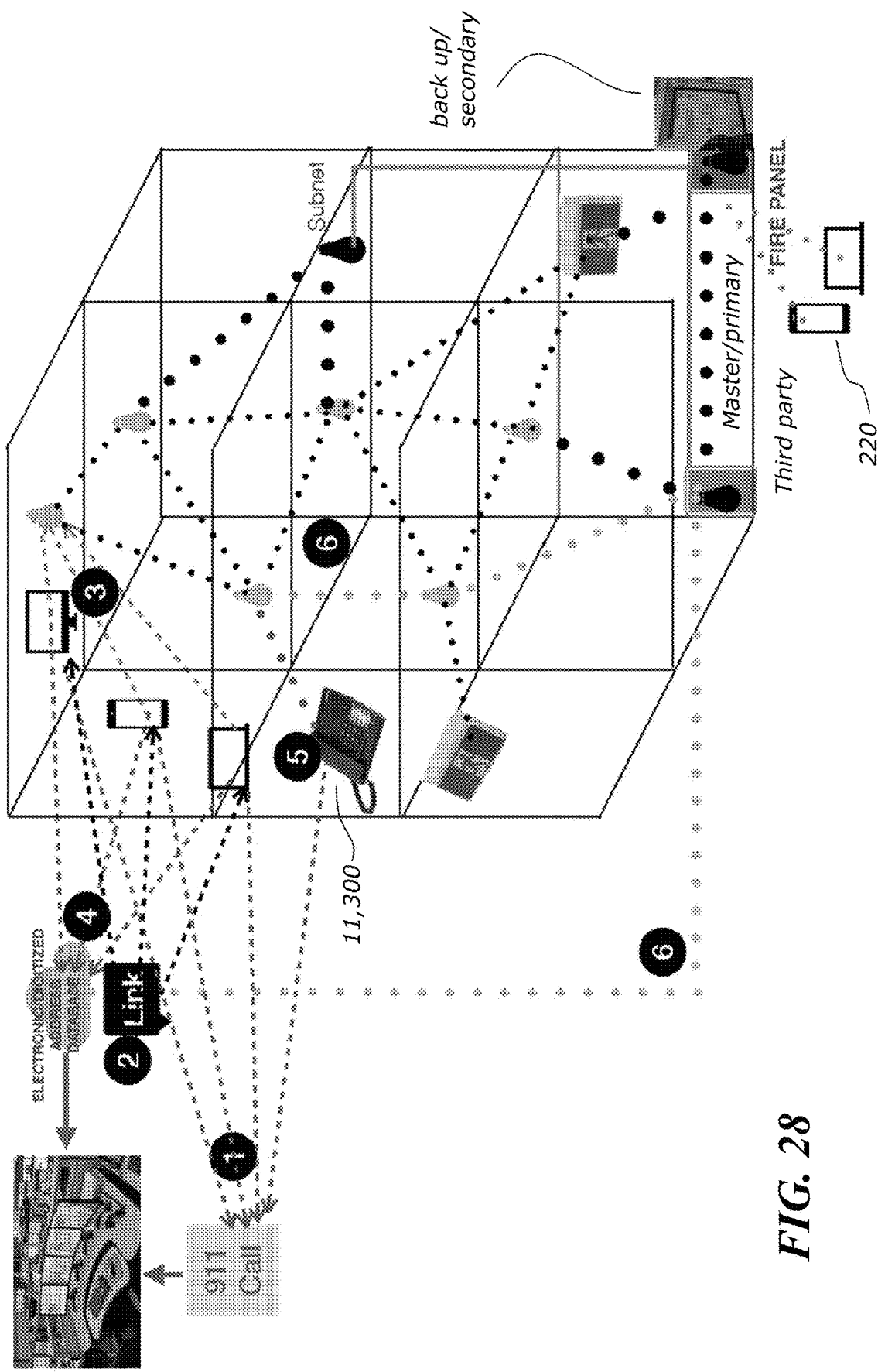
Figure 29:
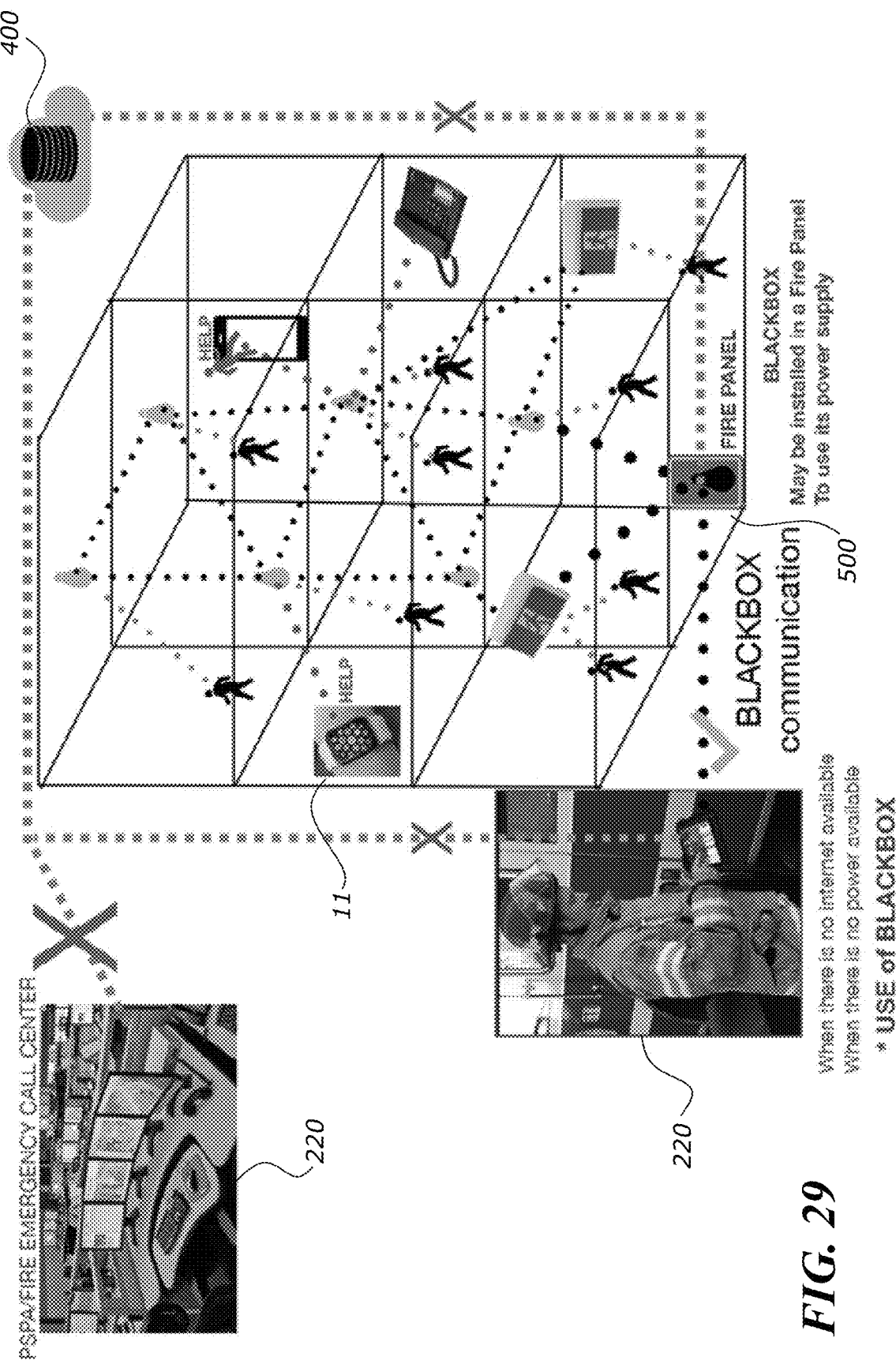
Figure 30:
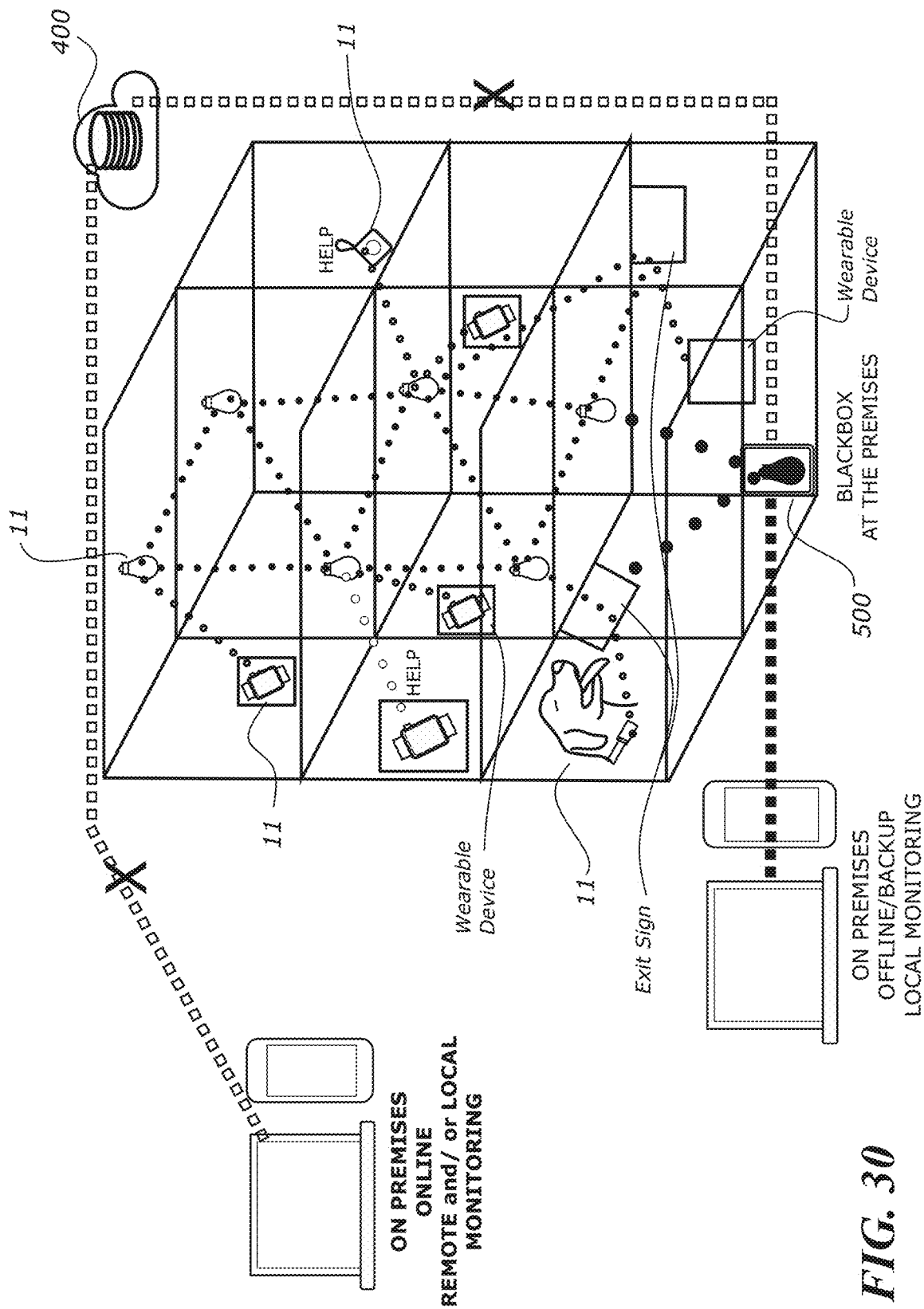
Figure 31:
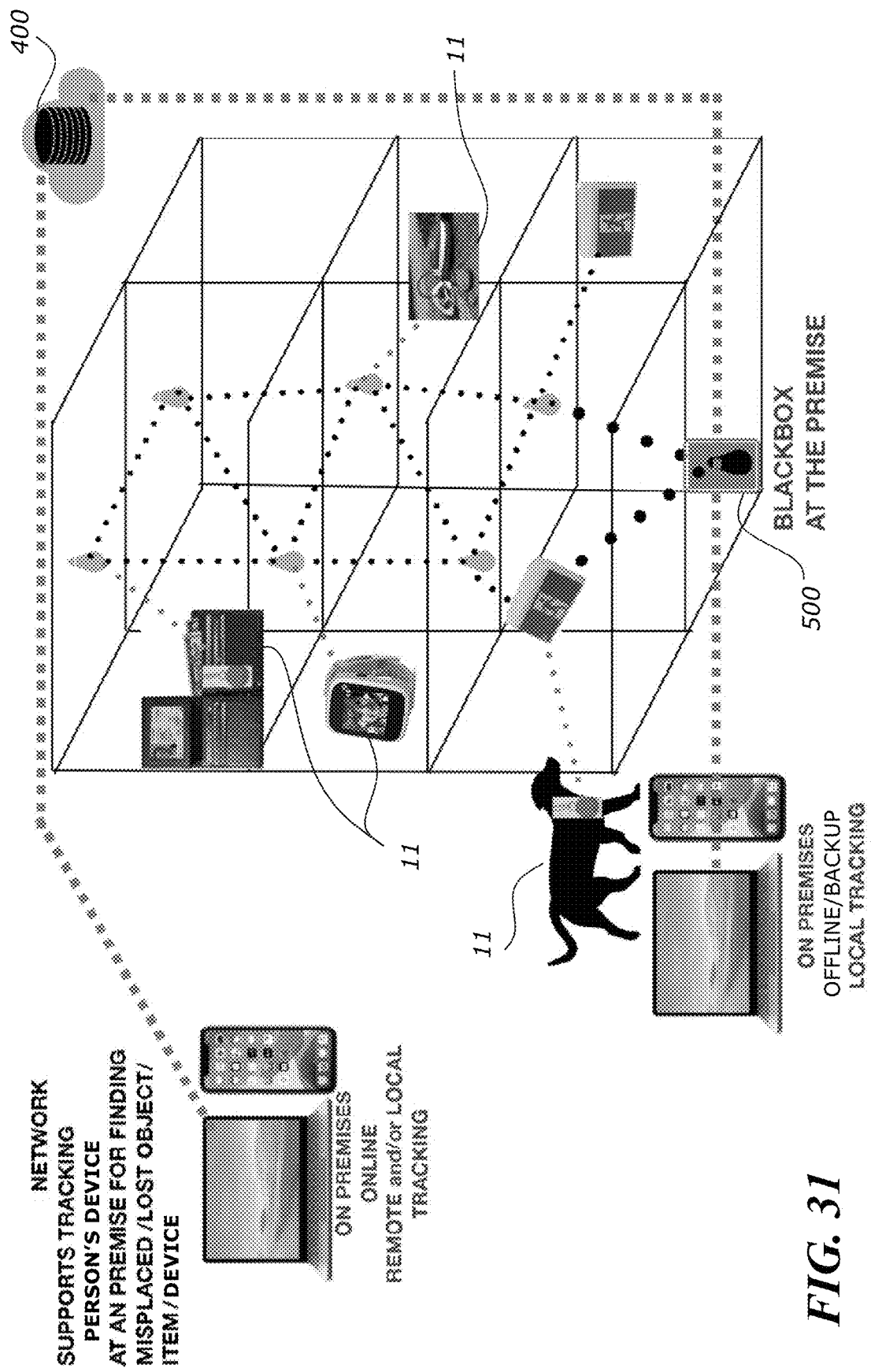
Figure 32:
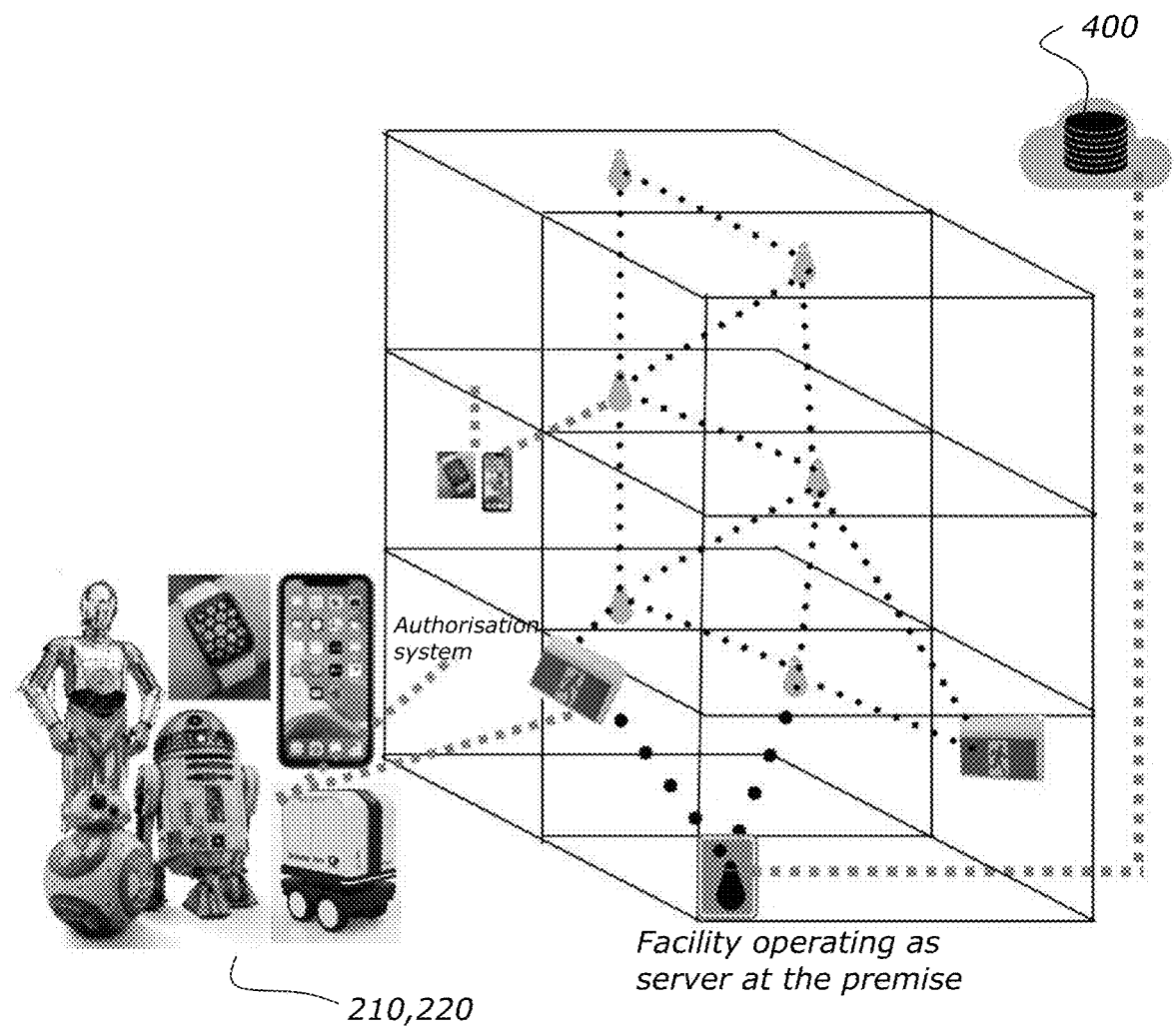

FIGS. 24 and 25 show in diagrammatic block form and function operational flowchart of an example of a luminaire module 111 used in events (e.g., power outages) and event evacuation, configured with a dual-mode method of detecting/locating the position of building occupants based on radio signal and body movement persons. The BLE beacon can be used to track the location of a person's device, and the motion sensor 23 can be used to track the location of a building occupant in possession of the said device. Combining these two functions together can help improve the location accuracy of the building occupant. As will be explained in more details later (in the "facility/fixing location" section), these two functions (possibly in addition to other functions) also provide the ability to provide the location of one or more facilities/fixings in proximity to the person. FIGS. 24 and 25 show an exemplary operational embodiment and a flowchart of an example of a dual-mode positioning system configured in a luminaire module 111 which may be used during a power outage or during evacuation, wherein, the luminaire module 111 is integrated with BLE beacon transceiver and/or transmitter 24, and motion (body movement) sensor (e.g. PIR motion sensor, heat sensor or similar) 23. The luminaire module 111 may optionally connect to other nodes of equipment such as fire alarms, smoke detectors, fire sprinklers and other equipment that may use the same communication standard, such as IEEE 802.15. The luminaire module 111 may in some situations be deployed in a position that makes it difficult to be scanned by user's device (as the luminaire module 111 may be placed in a poor orientation, such as being mounted on the ceiling above a narrow space (e.g., a corridor, escape route, stairway)) where trilateral positioning that requires at least 3 nodes may not be possible. In this type of situation, trilateration may not be possible because the RSSI value that represents directional distance in between the BLE beacon and the person's device may not always be accurate and reliable, and/or RSSI scanning by the person's device may fail. If it is not possible to use trilateration to estimate a building occupant's position then the measurements taken by motion sensors 23 may be used to capture presence of persons 12a in short distance in such narrow spaces. The power setting of BLE beacon transmitter 24 is set to transmit at a relatively long distance, enabling its intermittent radio wave transmission to cover the whole building both vertically and horizontally.

For instance, when 12a and 12c of 2 persons/occupants are detected/scanned, the scanned RSSI value by device 12a is much greater than that of device 12c, indicating that device 12a is closer to beacon transceiver and/or transmitter 24 than device 12c. The person/occupant in possession of device 12b (who may not be using their device—as indicated by the cross in FIG. 24) may be captured by motion sensor 23.

FIG. 25 discloses a programming flowchart showing how the dual-mode positioning method may be used in situations where trilateral positioning is not possible/feasible. The BLE transceiver/transmitter 24 may be set for long distance detection based on maximum power of the best propagation range setting. In conjunction, the PIR motion detection may be also in use for short range detection for any presence of persons. If the device position is determined to be close to the position of a building occupant, it can be inferred that the building occupant in possession of the device. In this instance, the highest RSSI value (this value scanned by person's mobile device) can be cross-referenced against the measurements picked up by the motion sensor 23 as a double confirmation of the presence of the device on the person. This may be done by obtaining an estimated position of the device based on the horizontal and vertical position of the BLE beacon that produced the highest RSSI value. The horizontal position of the BLE beacon can be obtained by extracting the latitudinal and longitudinal coordinates of the BLE beacon 24. Optionally, the device's RSSI (which is a value representative of distance between the BLE beacon and the device) may be compared against the mean distance of the person from the motion detector. The vertical position of the BLE beacon may be inferred based on the vertical height of physical floor level that the facility/fixing (e.g., luminaire module_is located on (this value can be stored as a parameter of the BLE node 24).

If a person does not have a functional device, they may be detected by the motion sensor 23 if they are in close range. The person's position may be determined in a similar way as how a person with a working device may be detected. In addition, total number of persons in the building and their respective horizontal and vertical positions may be obtained in real time through communication components 22. This information may be transmitted by multi-hopping messaging means to send to the nearest gateway to send to the online cloud platform; and/or send (by offline application) to emergency call dispatchers, first responders, rescuers, building managers and security officers, and/or other authorized third parties of interest.

FIGS. 26 to 32 have been shown to demonstrate various exemplary use case scenarios and their arrangements have been describe hereinabove and hereinafter.

Exemplary Embodiment—"Black-Box"

Possible applications and functionalities of the facility 11 according to the present invention have been described above, along with various embodiments in which the facility 11 may be provided in.

In addition to such disclosure, the facility 11 can provide the additional functionality of operating as a back-up server (which may be local), i.e., a "black-box" 500 that is configured to record and store data regarding activities, civic addresses and/or statuses of the one or more facilities 11 at the premises/building 10 for a certain time period (e.g., 3 months). The black-box 500 may operate in a similar way to an airline black box. As will be explained in further detail below, the black box can provide another means for providing data/information to third parties both online and offline. One or more of the facilities 11 within the premises/building 10 can operate as a black-box per se or in addition to comprising one or more of the various aforementioned features of the facilities 11. For example, a facility 11 may operate as a black-box while also operating as an internet access point directly or indirectly supported by ISP (Internet Service Provider) via wire and or wireless means, such as HTTP (fibre optic), cellular and/or commercial satellite and the like.

In some embodiments of the present invention, one or more black-boxes 500 are provided to store details/data locally and synchronize such details/data online (with other databases such as a cloud database) with regards to the premises/building 10, its network 12 and the abovementioned electronic database. This includes the civic address of the building, the one or more facilities 11 (optionally including the level/floor and/or the room/area on the level/floor) and navigation paths (e.g., on a virtual map) as explained above. Further, the black-box 500 may store details/data with regards to the building information files, GIS, information of the venue of premise/s building 10, reports of past events/incidents (such as movements and SOS alerts issued by the persons within the premises) at the premises/building 10 and the like. Such data/details can be accessed by a third party user/operator such as emergency services personnel, first responders, fire warden, security officer or a property manager and this access can be provided online, and offline to the user/operator remotely (i.e., outside and away from the building) via a wireless network/connection locally onsite at the premises/building 10. In some embodiments, the black box(es) 500 may be ideally positioned in order to accommodate physical access by third parties (e.g., from outside the premises/building 10).

Each facility 11 may operate as or be provided with its own assigned black-box or a single black-box provided by a facility 11 may be connected/linked with a one or more other facilities 11, forming multiple sub-networks where the black boxes may be connected to each other using their own assigned wired or wireless connection. The one or more black boxes may be used as the server of the RF network of the facilities 11 mentioned above and may function in a master/slave arrangement, where the master and the slave black-boxes have the capability of communicating (wired or wirelessly) with a device of the third party user/operator. The configuration of a master/slave (or primary/secondary) arrangement of the black boxes can be similar to the master/slave of the facilities/fixings explained above (e.g., on page 8).

The black-box may be installed and use the power supply (e.g., mains power supply at the premises/building 10) provided in a specifically assigned space/room, next to the fire control panel that may be positioned externally on a wall of the building, the entrance/exit of the building and the like. Additionally or alternatively, the black-box may comprise its own independent UPS or may be linked to an existing UPS used for one or more of the facilities 11 including the emergency lighting system (e.g., UPS of a facility/fixing 11 as described above) in the building. The one or more black boxes can also comprise their own, separate communication components/channel that is used to send/receive information.

Additionally or alternatively, the one or more black boxes can utilise the communication components of one or more facilities 11. This is particularly useful in events/situations where internet and/or connection to emergency services and/or the database are disconnected/cut-off within the premises/building 10.

The one or more black boxes may be connected (in wired or wireless manner) to a device of the third party user/operator such that the third party user/operator is able to retrieve the required civic addresses (e.g., of the facilities/fixing 11 proximate to the person and/or the navigation path) and any other critical data such as SOS alerts and movements suggesting the presence/position of persons from the one or more black-boxes. The power supply of the one or more black-boxes is supported by a UPS (e.g., two stage UPS) configuration, where the UPS may support a subset of components, such as the communication components and the controller of the 'black-box'. This can be important for allowing third party personnel to wirelessly retrieve historical data at the premises/onsite of the building as may be necessary for immediate intervention/rescue, as by then, all the backup power supply in the building may have become exhausted.

Exemplary Embodiment—Authorisation System

The network 12 may be constantly operating to provide the ability for emergency communication by/between the one or more facilities 11, allowing permanent communication capabilities to be provided so that the position and location detection functionalities, their recording, transcieving of SOS alerts and ability to find persons of interest is preserved. In some embodiments of the present invention, the network 12 can be used to provide an authorisation system to support access control of the premises/building 10 by for example, using one or more facility/fixing 11 to act as a proxy to validate one or more devices or persons (e.g., third party personnel) attempting to access the building 10 (e.g., during an event for intervention/rescue). This can potentially minimise property damage by eradicating the need for unnecessary force typically used by first responders of for example fire brigades, who are usually forced to damage the building to break into the premises. Third party personnel and/or a device may be able to initiate a connection with one or more facilities 11 (referred to as nodes in this context) by provisioning such facilities to activate a connection with other facilities 11 within the network 12. The authorisation system may comprise an electronic lock that may be configured to connect with at least one facility 11 in its proximity and also operate as a node of the network 12.

The device or person can generally comprise anything that would require access to the premises/building 10, examples of which include but are not limited to personal devices (e.g., mobile phone, smartwatch etc.), unmanned robotic carriers or machinery and the like. The one or more devices/UEs and/or the unmanned device may be controllable by the third party personnel and may be configured to be a provisioner for activating one or more facilities 11 (e.g., a luminaire herewith) by acting as their agent or proxy to activate the authorisation system (e.g., by unlocking the electronic lock), therefore gaining the access in and out of the premises/building 10.

The network 12 of facilities 11 (i.e., nodes) may comprise a component (e.g., a controller) that may be equipped with appropriate firmware that allows the network 12 of facilities 11 to be configured to (a) communicate with the device or person or the unmanned device (e.g., using RF signal(s))

and/or (b) obtain a passcode and/or activate from the device or person required for gaining access to the premises/building.

The authorisation system may be supported by a UPS (e.g., a two stage UPS) also, where the power supply to the subset of communication components and a controller of the authorisation system may be configured by way of two stages UPS. This is warranted by the commercial mains power, and or back-up power system that may be available at the premises/building 10. However, when such power systems become exhausted in an event (e.g., a fire or local power outage), the second stage of the two-stage UPS will initiate to support third-party access control. In some embodiments, the authorisation system may switch to a manual mode, where it may be enabled by a key or pre-set code only and so the third party personnel would need to obtain the required key or pre-set code that can be provided by the authorisation system and/or other facilities 11 of the network 12.

The passcode may be single-use such that it is required to be obtained at every attempt of entry or it may be continuously used for a non-limited number of attempts and still be valid for a period of time (or permanently). The firmware of the controller may be managed by an administrator to renew or terminate the access code of a particular device. In some embodiments, the appropriate firmware and/or the required passcode(s) may be stored in a local server that can be accessed and retrieved by the network 12 and/or its facilities/fixings 11.

Exemplary Embodiment—Use of One or More of the Embodiments

On the occurrence of an event, such as an emergency situation, the luminaire modules 111 in the system/network 12 will activate. The activation could be triggered, for example, based on there being a power cut to the regular AC power supply—thus providing the presumption that there is some sort of emergency where emergency lighting may be required. Other triggers could be used, and it will be appreciated that the luminaire modules and system described is not necessarily restricted to being used just in emergency events. It could be used in any event, or even during normal circumstances, where required. In this case the UPS of the facility/fixing 11 will power each device and the network. It can power the associated network terminals and network access point (external router) and also any external devices, such as smart phones, computers etc. The controller of each facility/fixing 11 will trigger/activate the lighting module to provide lighting. In addition, the uninterruptible power supply (UPS) will power the communications module(s) and/or the detection/positioning module(s) and/or any other components of the facility/fixing 11. The controller then can facilitate communications, persons detection and/or persons positioning. For example, if a person 11*a* in the building 10 is required to communicate with a third party, they can use their device to communicate via the Wi-Fi router, Bluetooth transceiver or any other means, to the third party via a computer network, telephony network or similar. Likewise, the third party can communicate with the person 11*a*. The system can also detect the presence of one or more persons 11*a*, for example through motion, proximity and/or object sensor (e.g. IR motion sensor, heat sensor or similar). This information can be communicated via the communications module and network/system to a server/third party, such as emergency services 15. Likewise, using triangulation or otherwise, the Beacon, Wi-Fi, Bluetooth and/or other detectors can be used alone or in combination with various luminaires to determine the position of a person 11*a* in the building. This position can then be communicated via the communications module to a third party, such as emergency services 15, to assist with rescue or to provide other assistance.

Using the various communications and/or power ports, a person 11*a* can charge their device or other apparatus using the facility/fixing 11. Likewise, a person 11*a* can use the emergency torch, which activates and lights up upon trigger of the event. Direct communications can also be made to a facility/fixing 11 via for example the USB or other data port.

The facility/fixing 11 and system as disclosed exploits the fact that there is an emergency lighting infrastructure provided on a building and builds on this to provide additional functionalities without requiring separate communications and detection infrastructure.

Some exemplary use case scenarios will now be described.

Figure 13:
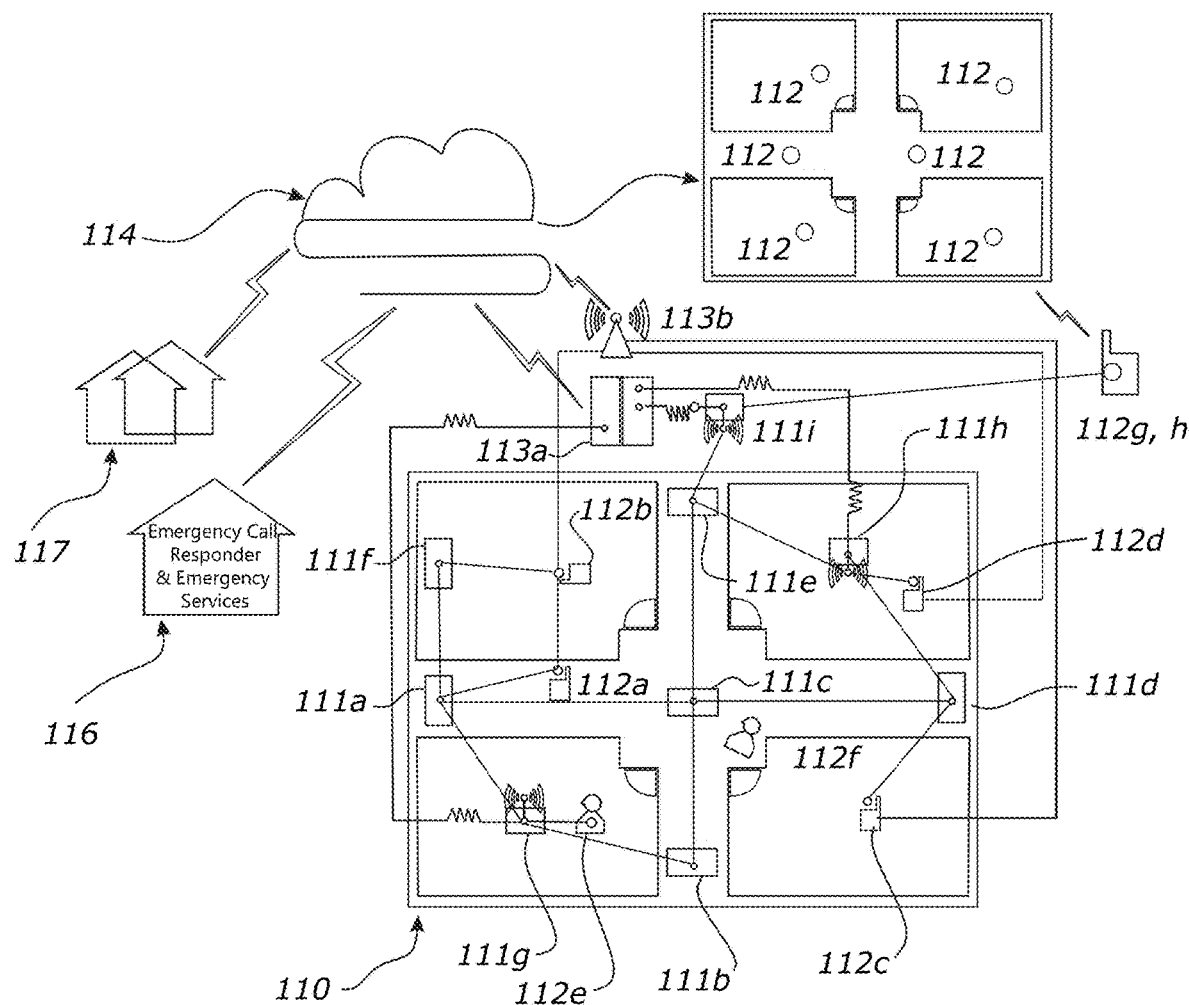
FIG. 13 shows a plan overview of one exemplary use case scenario.

FIG. 13 shows a plan overview of luminaires 111 operating together as part of a network. A network of luminaires 111 are dispersed throughout the building 110. Installing multiple luminaires 111 throughout the building allows building occupants 112 to call for assistance from any position in the building 110. In addition, it is possible to trace the location of building occupants 112 within a building 110 and even trace the movement of building occupants 112. Such data can be collected and then relayed over an external network (online server 114 for example) to emergency services 116, to a security monitoring service 115, or to any other third party 117.

In particular, FIG. 13 shows, the floor plan of a building 110 level with a system/local area network comprising a network of luminaire modules 111 in general block diagram form configured as described herein to provide communications, person detection and/or person location/positioning functionalities for locating presence of persons on a building and/or power backup. A plurality of luminaire modules are deployed in common areas. The luminaire modules 111 are further configured with power backup for either an external and/or internally detachable internet communication access point, such as home gateway router. The luminaire modules 111 are also configured to provide an internet network connection terminal device (which might be an optic network terminal (ONT) that connects to a fiber optic network), and fixed wireless, or communication satellite for internet service. Luminaire modules 111*g*, 111*h*, 111*i* may serve as a gateway that converts information/data collected within the local area network to provide an online connection. In particular, luminaire module 111*i* may be located outside of the building 110, such as at the entrance and/or the building manager's premises, and/or any other space inside building 110 where an online internet network connection terminal is warranted. Luminaire module 111*i* also has a power backup for supporting the functionalities described above and for supporting the online connectivity of devices, such as Wi-Fi and power back up of devices. It may be desirable to install luminaire module 111*i* outside of the building, as this allows emergency first responders to directly access real time information on site.

Exemplary scenarios of how the network operates will now be discussed with reference to FIGS. 14 to 23. These scenarios refer to building occupants and their devices, which will now be described as follows:

Person 112 is in possession of a device 112*a* that is out of cellular data and therefore does not have an internet connection;

Devices 112*b* and 112*c* have an active cellular internet connection;

Device 112*d* can go online because it has an active cellular internet connection, or because it has a wireless internet connection supported by the luminaire module 111;

Person 112*e* has a wearable device that can communicate with a luminaire module 111 to issue an alert;

Person 112*f* refers to any person who is not equipped with a working device. In this case, person 112*f* may have a device with a flat battery, or person 112*f* may not have a device at all. All these people may be detected and positioned by the network of luminaire modules 111 installed throughout the building.

Devices 112*g* and 112*h* are used by building managers, security officers, and emergency first responders for online communication, and/or for offline tracing of people inside the building by only connecting the nearest node (i.e., luminaire module) 111*i* of the mesh network in power outages where internet connectivity may not be available.

FIGS. 14 to 23 also refers to internet communication access 113, which is the internet infrastructure network connection infrastructure outside of the building. The internet communication access 113 may comprise:

Internet network connection 113*a* comprising a distribution panel of nodes comprising one or more of: optical fiber wire, fixed wireless, or communication satellite for internet service; and Cellular site 113*b* that is within reception range of the building.

Cloud server 114 is the hosting platform, that stores data relating to the real-time positions of building occupants. The cloud server 114 may be configured to supply third parties with a graphical representation of data 115.

Figure 14:
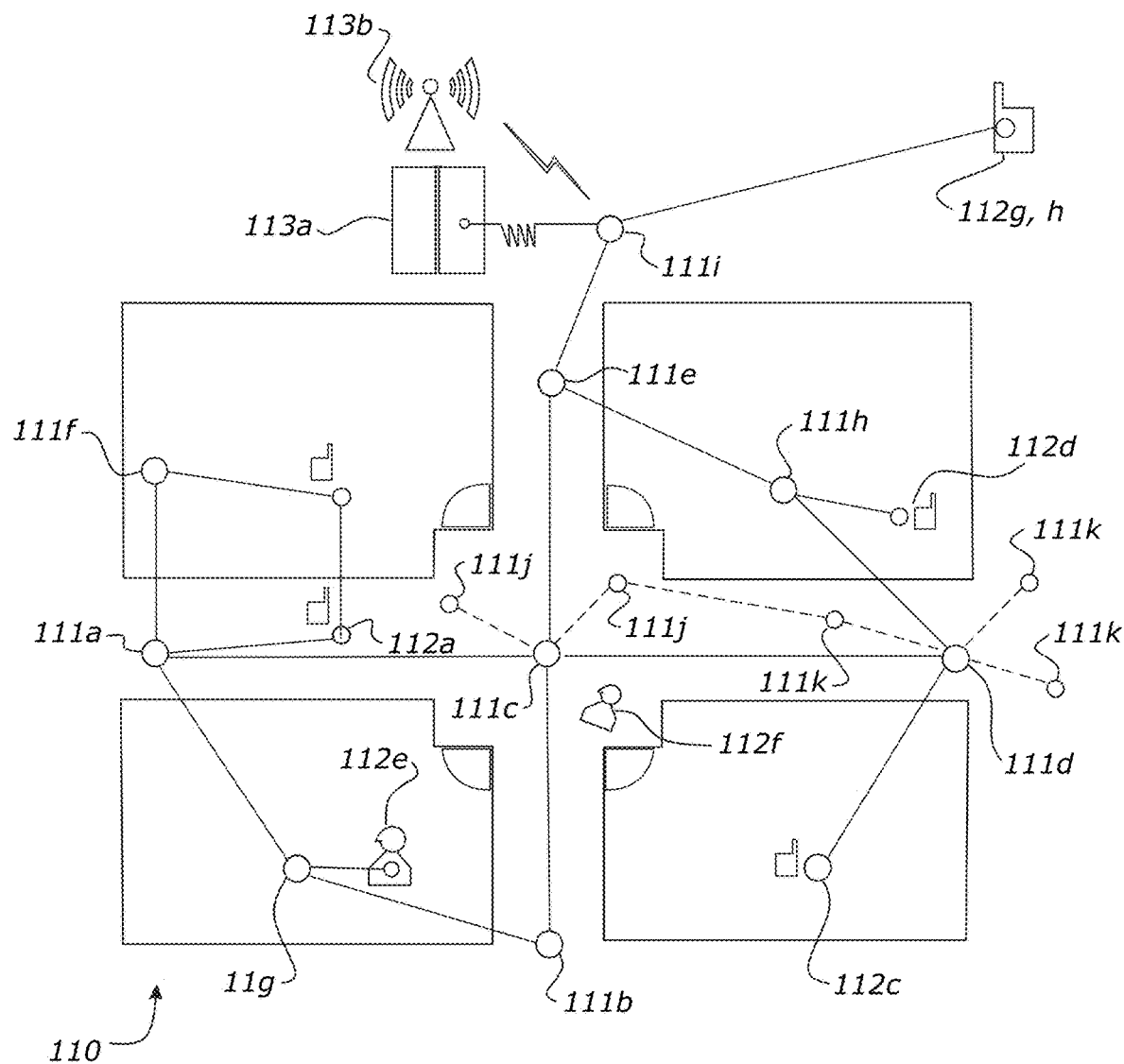
FIG. 14 shows another plan overview of one exemplary use case scenario.

FIG. 14 shows in diagrammatic form a building floor plan 110 experiencing a power outage, cutting out normal lighting and internet access facilities building. FIG. 14 shows a mesh network of luminaire modules 111*a-i* configured as network nodes on radio frequency, such as BLE. Luminaire modules 111*a-i* can be connected as part of a multi-hop mesh topology of an indoor wireless network. The network backbone infrastructure of nodes may include at least one internet connection node of 111*i* being a proxy and continent gateway that converts BLE to get online to connect with internet infrastructure network connection distribution facilities 113*a-b*. The luminaire modules 111*a-i* maybe also connect to other provisioned nodes 111*j*, 111*k*, such as smoke detectors, fire alarm, fire sprinklers, lighting switch, thermostats and etc. The provisioned nodes 111*j*, 111*k* may be deployed in their proximity using the same mesh network communication protocols as the protocol used for detecting devices. The devices 112*a-e* may interact with any nodes in the mesh network in which the Bluetooth-mesh proxy protocols may be followed by any nodes. In situations where devices that do not possess a Bluetooth-mesh stack to interact with the said mesh network, rescuers can still trace the position of a person's device by communicating with the closest node 111*i*, and/or communicating with any joined and provisioned node that is near the rescuer's Bluetooth-mesh capable device. Even if the node that detected user's device is out of range, offline positioning of the user's device by multi-hop messaging can be achieved by the use of a Bluetooth-mesh capable device 111*l*, 111*m*. Bluetooth-mesh capable devices 111*l,m* should preferably be used by rescuers, building managers, security officers, and emergency first responders to locate building occupants, even in the worst case scenarios, such as earthquakes, fire, and power outages.

Figure 15:
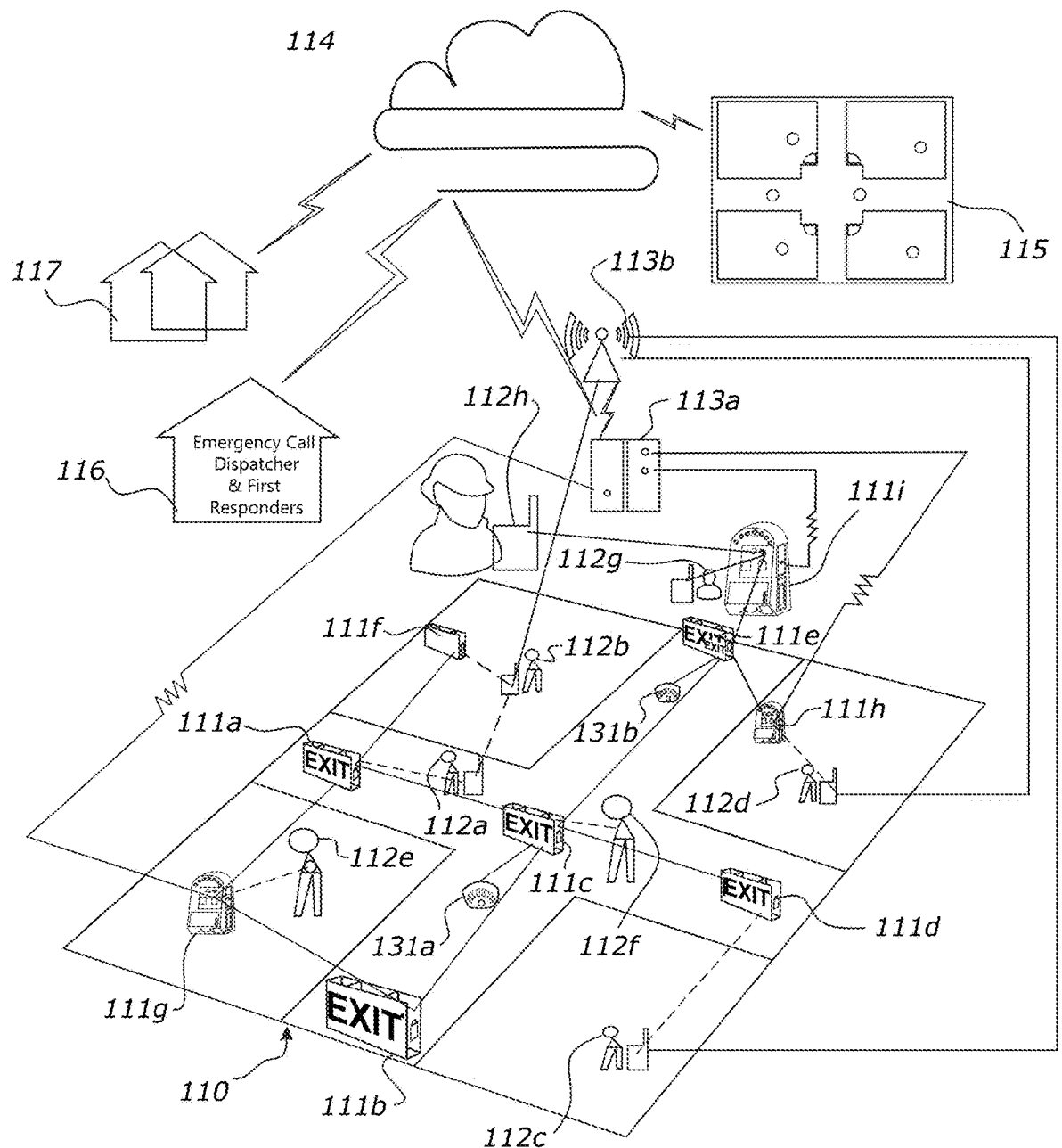
FIG. 15 shows another plan overview of one exemplary use case scenario.

FIG. 15 shows an exemplary scenario, of a local mesh network 111*a-i* that can communicate and interact with other emergency related devices, such as smoke alarms 131*a*, 131*b* by using the same networking protocols deployed on a floor level in a multi-level building. In this scenario, building occupants may issue alerts in different circumstances, wherein, all luminaire modules 111 may be configured with functions of internet connectivity such as IPV6 over BLE, with luminaire modules 111*g-i* specifically configured with an internet gateway and power backup to provide optical fiber and/or fixed wireless and communication satellite for internet service facilities 113*a*. Building occupants may use a variety of communication platforms to issue alerts from their devices of 112 which may be traceable using the devices' built-in proximity sensors, including Bluetooth transceiver, GPS, WiFi, magnetometer, gyroscope, barometer and accelerometer etc. In the case of person 112*f* who does not have access to a working device, they may be detected by the dual mode detection method.

In such mesh networks, when any occupants in the building using the abovementioned devices issues alerts, the owner of device 112*g* may share location data online to be used by a third party such as the building manager, security officer, fire warden, or anyone responsible for patrolling the building). Real time information may be transferred online through luminaire module 111*i* and deployed in the building manager's premises and/or other space where internet connection is warranted. This is so that all real-time data of detection, position/location of building occupants may be processed by an algorithm in the cloud server 114, including a mapping engine for displaying graphical representations a building occupant's location and/or movements. The information (as well its graphical representations) stored on the cloud server 114 may be shared with other third parties including emergency call dispatchers, and emergency services like fire, police and ambulance 116, and/or other authorized parties of interest 117. Therefore, luminaire module 111*i* may be considered as the secured and contingent online receiver and sender of data between the building and externally.

The exemplary scenario described above therefore describes how it is possible to locate persons in extreme conditions, regardless of whether they have a device in their possession. In such conditions where there is an absolute internet communications blackout, the enabling rescuers, building manager, security officer, fire warden, and emergency first responders, firefighters can use devices 112*g, h* with installed offline application programs to locate any building occupants by connecting to any node in the mesh network on site and/or remotely.

Figure 16:
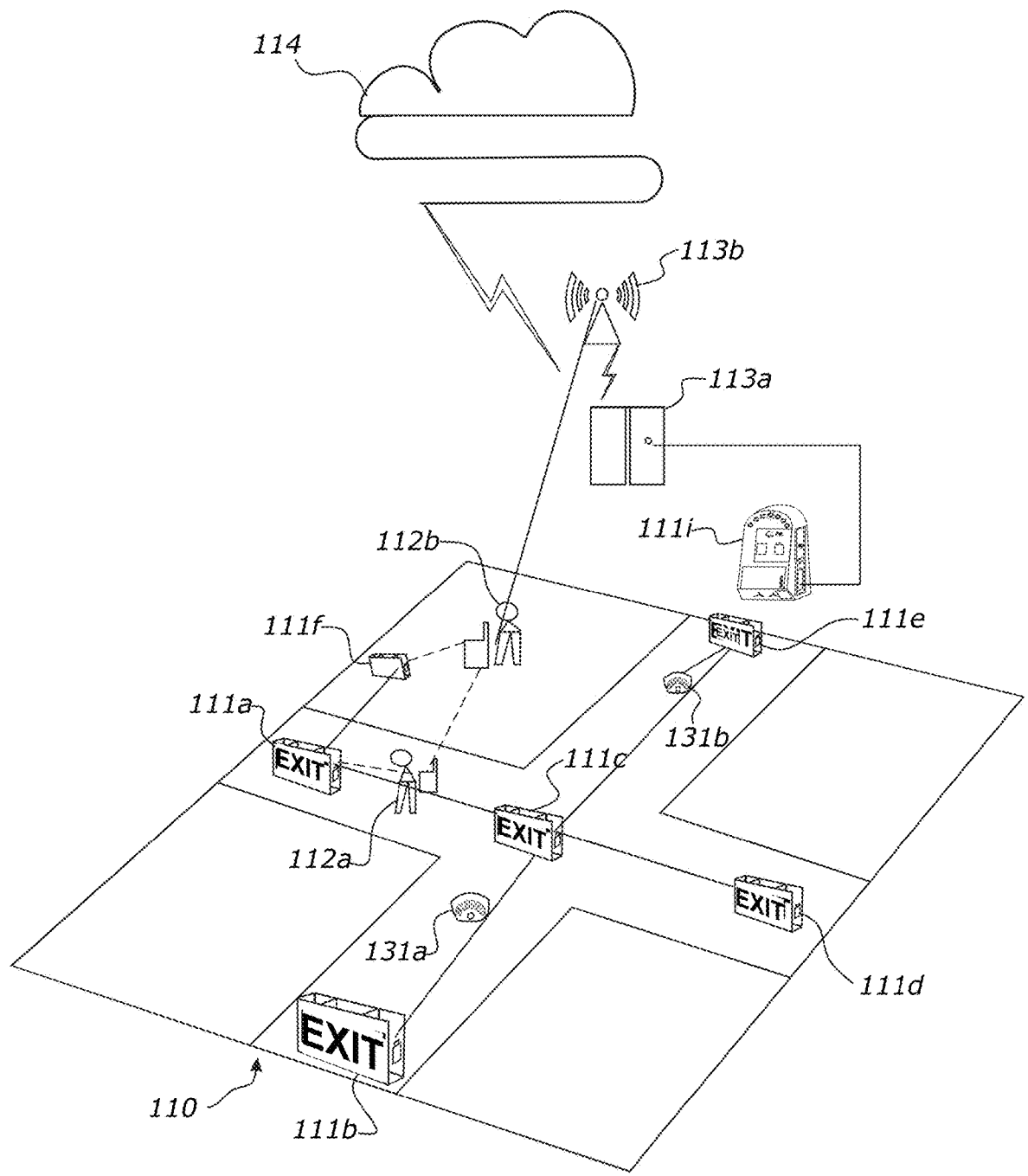
FIG. 16 shows another plan overview of one exemplary use case scenario.

FIG. 16 shows an exemplary scenario where the supply of power is cut to a building 110, but otherwise there is no emergency incident. In this situation, the main building lights are out, and the building Wi-Fi network is down. The building occupants do not need to evacuate in this scenario, because there is no emergency situation taking place. The building occupants simply need to stay put and wait until power to the building 110 is restored. In the meantime, the building occupants can use the network of luminaire modules 111 to communicate that they are safe. The building occupants can use their devices 112*a, b* to connect to the Wi-Fi within the communications module 22 of an luminaire modules 111 and notify their friends and families that they are safe. In this situation, the building occupant can use Wi-Fi Ad-Hoc messaging such as Wi-Fi Direct (Brand) for issuing alert to a nearby device 112b that has active online connectivity, such as cellular connection, and/or Wi-Fi connection supported by the luminaire module 111, so as to contact emergency services 16 directly (the building occupant may use any form of digital multi-media such as text, photo, voice assistant, video and VoIP to call for help). Both the devices and the person possessing the device may be detected and located under the dual sensing method. The alert and position data can be relayed over the internet cellular network; or by relaying the alert and position data across local mesh network (via multi hop messaging) to reach gateway luminaire module 111i, which can then be relayed onwards to the online server 122.

Figure 17:
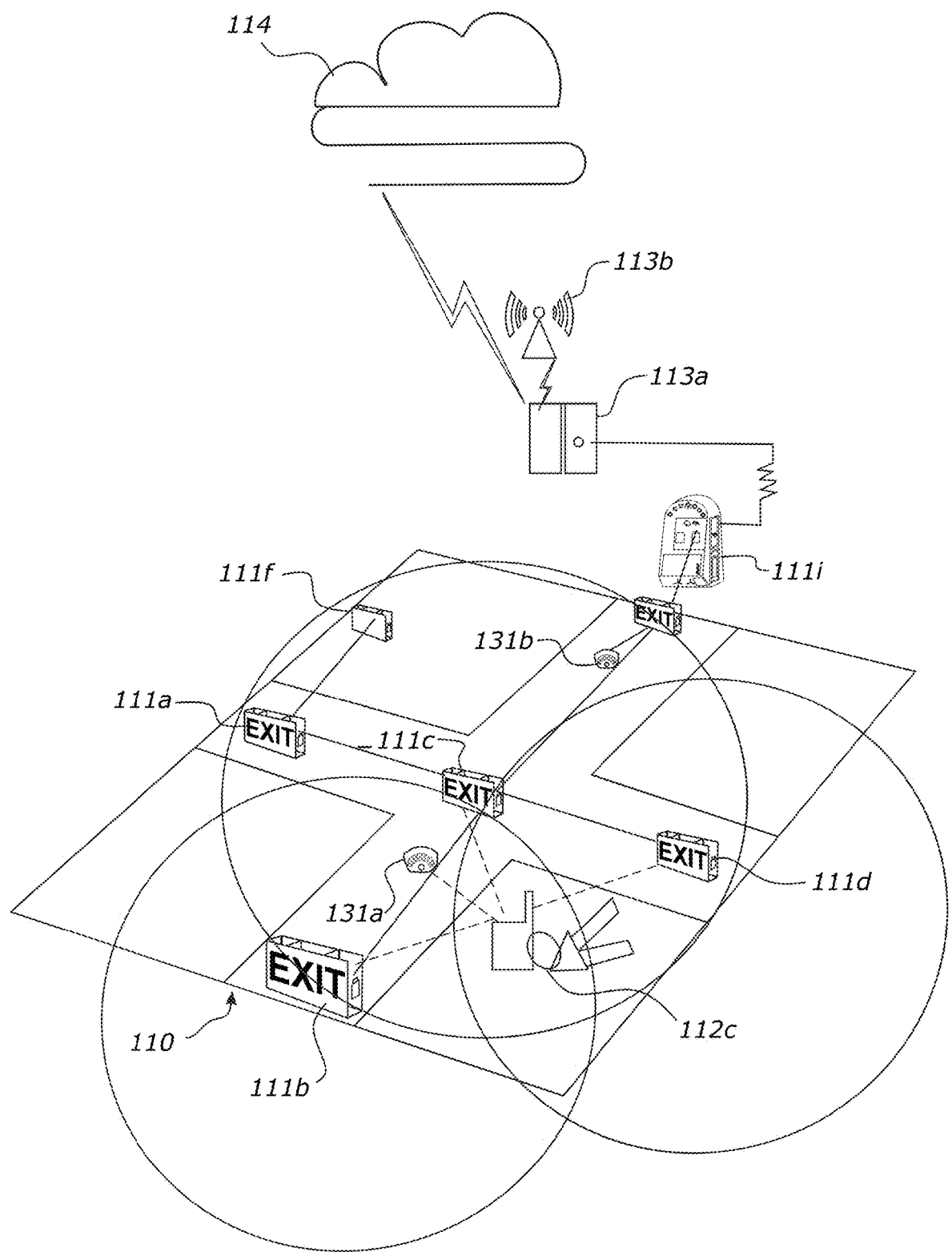
FIG. 17 shows another plan overview of one exemplary use case scenario.

FIG. 17 shows another exemplary scenario where a building occupant 63a is subject to an accident (e.g., falls over) and requires medical attention. In this situation normal lighting and Wi-Fi internet access facilities may also not functioning. The person 63a can have a device 112c with an active cellular online connection to contact emergency services 16 directly (the building occupant may use any form of digital multi-media such as text, photo, voice assistant, video of VoIP to call for help). In addition, the device's 112c position may be detected by BLE beacon transceiver/transmitter integrated in the luminaire module 111b, 111c, or possibly by the smoke alarm 131a and/or luminaire module 111d if it has a BLE beacon. The alert and position data can be relayed across local mesh network (via multi hop messaging) to reach gateway luminaire module 111i, which can then be relayed onwards to the online server 122.

Figure 18:
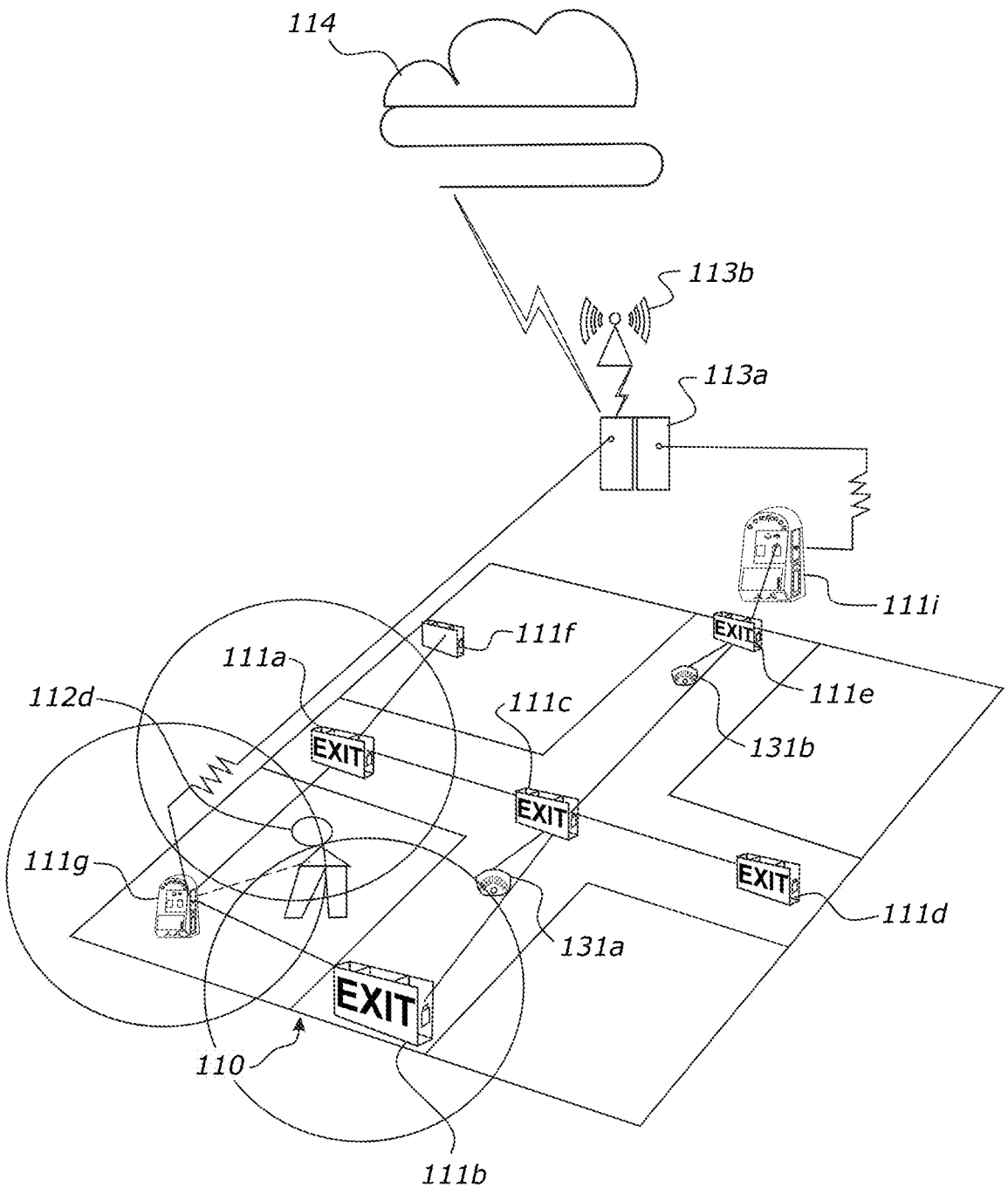
FIG. 18 shows another plan overview of one exemplary use case scenario.

FIG. 18 shows a similar exemplary scenario to FIG. 17, except in this scenario, the building occupant can call for medical assistance using a device 112e (e.g., wearable device) to communicate. Under this exemplary scenario, the person's movement maybe detected by the movement sensor integrated in luminaire module 111g. However, in addition, the position of the device 112e on the building occupant may be detected by BLE beacon transceiver/transmitter integrated in luminaires module 111a, 111b, and 111g. The alert and position data can be relayed across local mesh network (via multi hop messaging) to reach gateway luminaire module 111i, which can then be relayed onwards to the online server 122.

Figure 19:
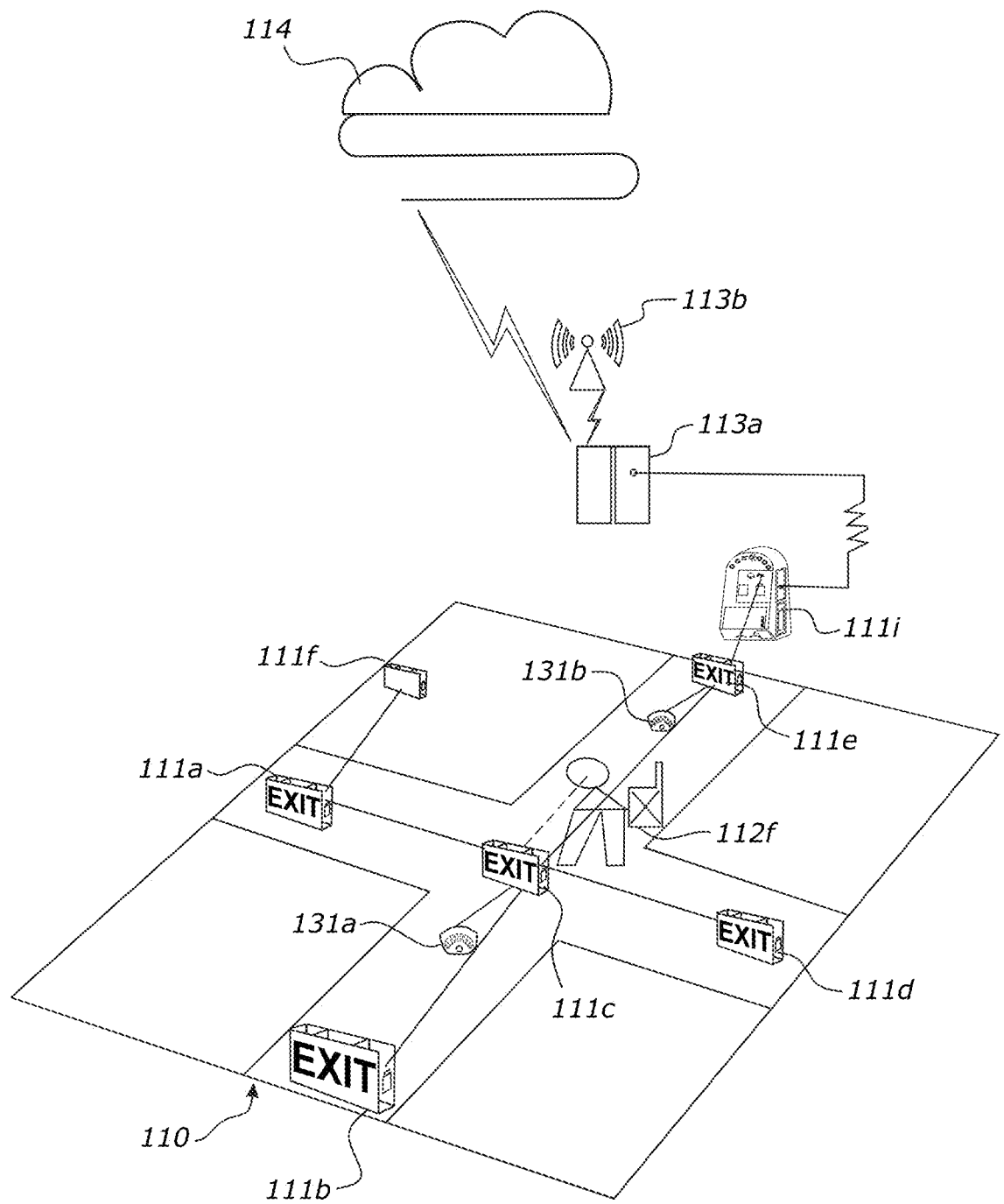
FIG. 19 shows another plan overview of one exemplary use case scenario.

FIG. 19 shows an exemplary scenario in which normal lighting and Wi-Fi internet access facilities in the building are down. In this situation, the person with device 112f does not have access to a working device. However, the person's movements can be traced by the movement sensor integrated in the luminaire module 111c. The alert and position data can be relayed across local mesh network (via multi hop messaging) to reach gateway luminaire module 111i, which can then be relayed onwards to the online server 122.

Figure 20:
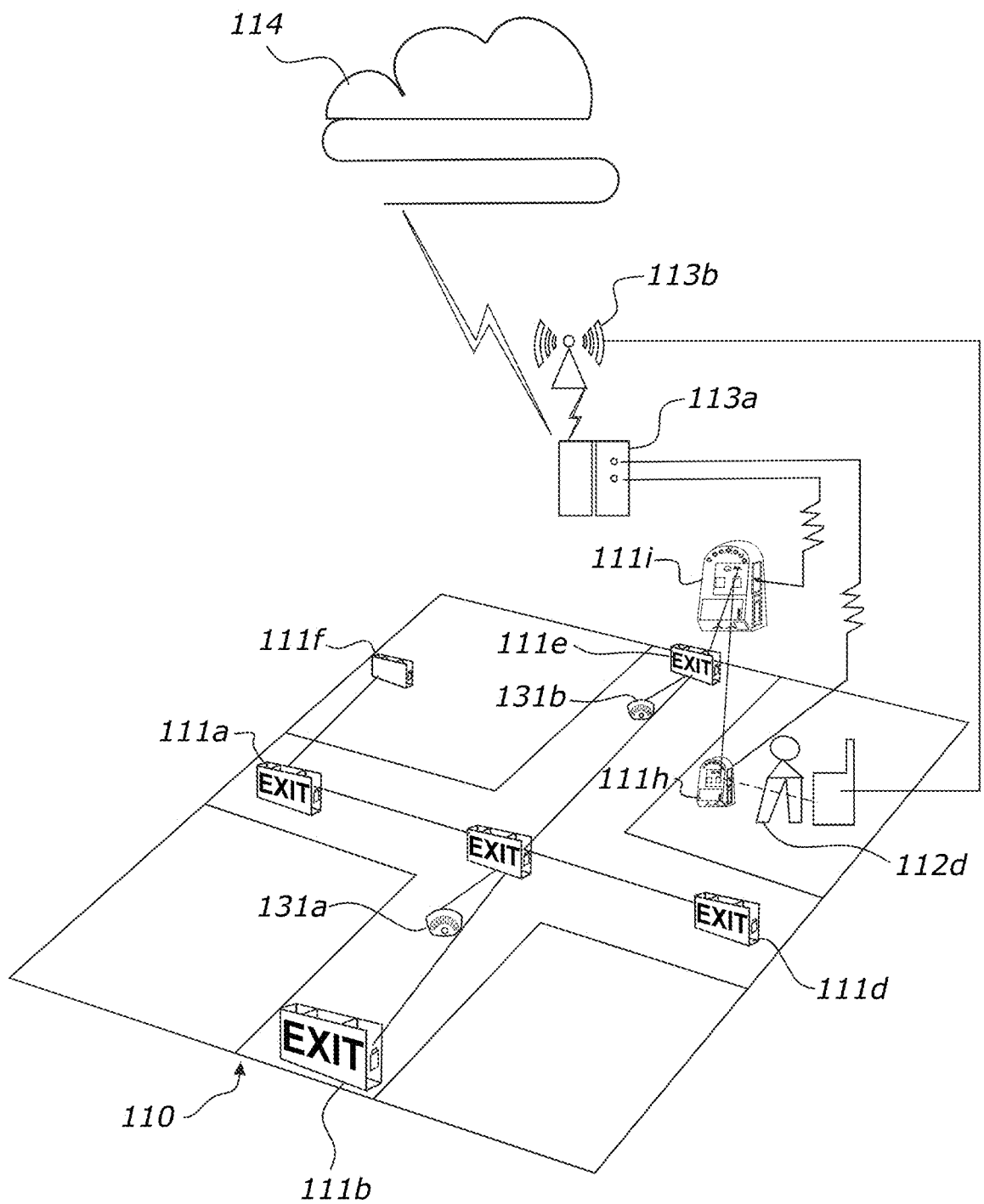
FIG. 20 shows another plan overview of one exemplary use case scenario.

FIG. 20 shows an exemplary scenario in which normal lighting and Wi-Fi internet access facilities in the building are down. A person in possession of device 112d, which has an active cellular connection can use their device to contact emergency services 16 directly (the building occupant may use any form of in digital multi-media such as text, photo, voice assistant, video and VoIP call for help). Alternatively, the device may be operated/utilized to connect to the BLE and Wi-Fi provided by the luminaire module 111h in order to issue an alert to emergency services 16. Both the devices and the person possessing the device may be detected and located under the dual sensing method. The alert and position data can be relayed across local mesh network (via multi hop messaging) to reach gateway luminaire module 111i, which can then be relayed onwards to the online server 122.

Figure 21:
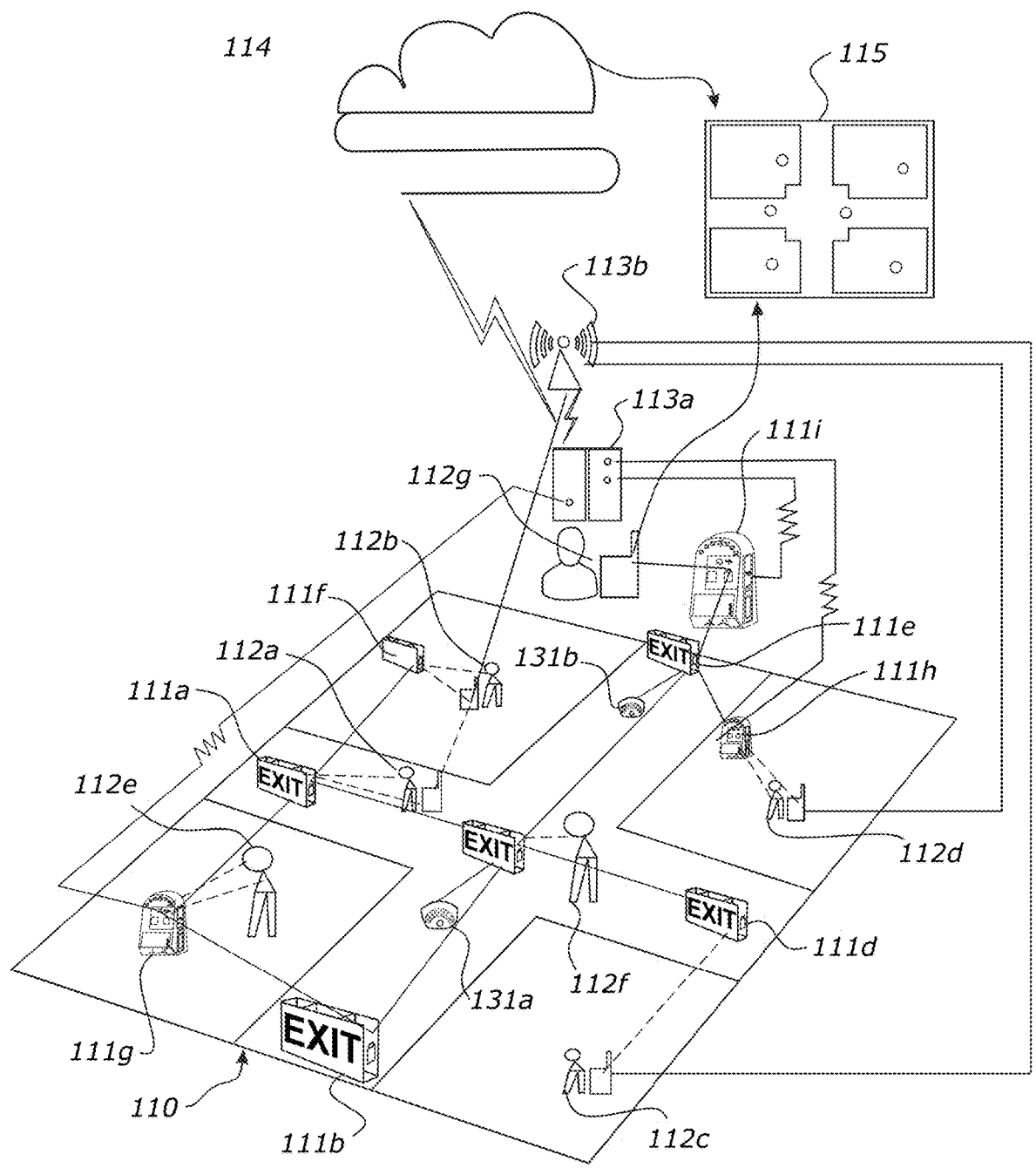
FIG. 21 shows another plan overview of one exemplary use case scenario.

FIG. 21 shows an exemplary scenario in which normal lighting and Wi-Fi internet access facilities in the building are down. In this scenario, the on-site building manager/warden/security officer can use device 112g to monitor the location of persons. In this scenario device 112g connects to luminaire module 111i, which may be located in a control room office and the like. This allows the onsite building manager/warden/security officer to take advantage of the power backup functionalities configured in the luminaire module 111i to charge up their device 112g. If the UPS in luminaire module 111i is operating in the first stage and the UPS is running low, the building manager/warden/security officer can still use their device 112g to connect with any luminaire module 111i if the UPS switches to operating on the second stage.

Figure 22:
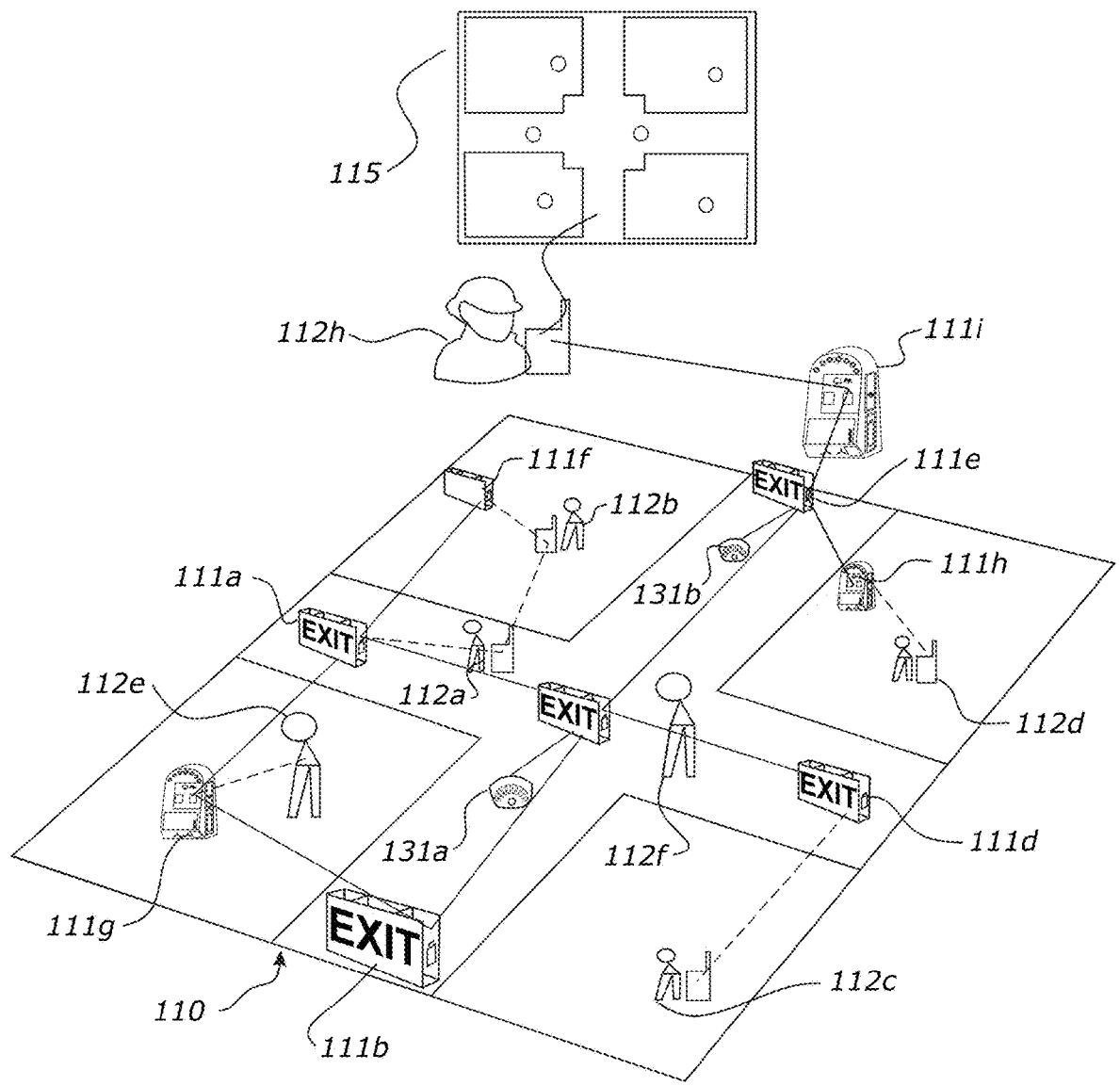
FIG. 22 shows another plan overview of one exemplary use case scenario.

FIG. 22 shows an exemplary scenario in the case of an extreme natural disaster, in which the online server 114 may not be working. Rescuers (such as emergency first responders) can rely on device 112h to maintain a BLE connection with luminaire module 111i and/or any other node (including luminaires module 111a-h) that has a UPS operating in the second stage. This allows rescuers to locate building occupants in need of assistance.

Figure 23:
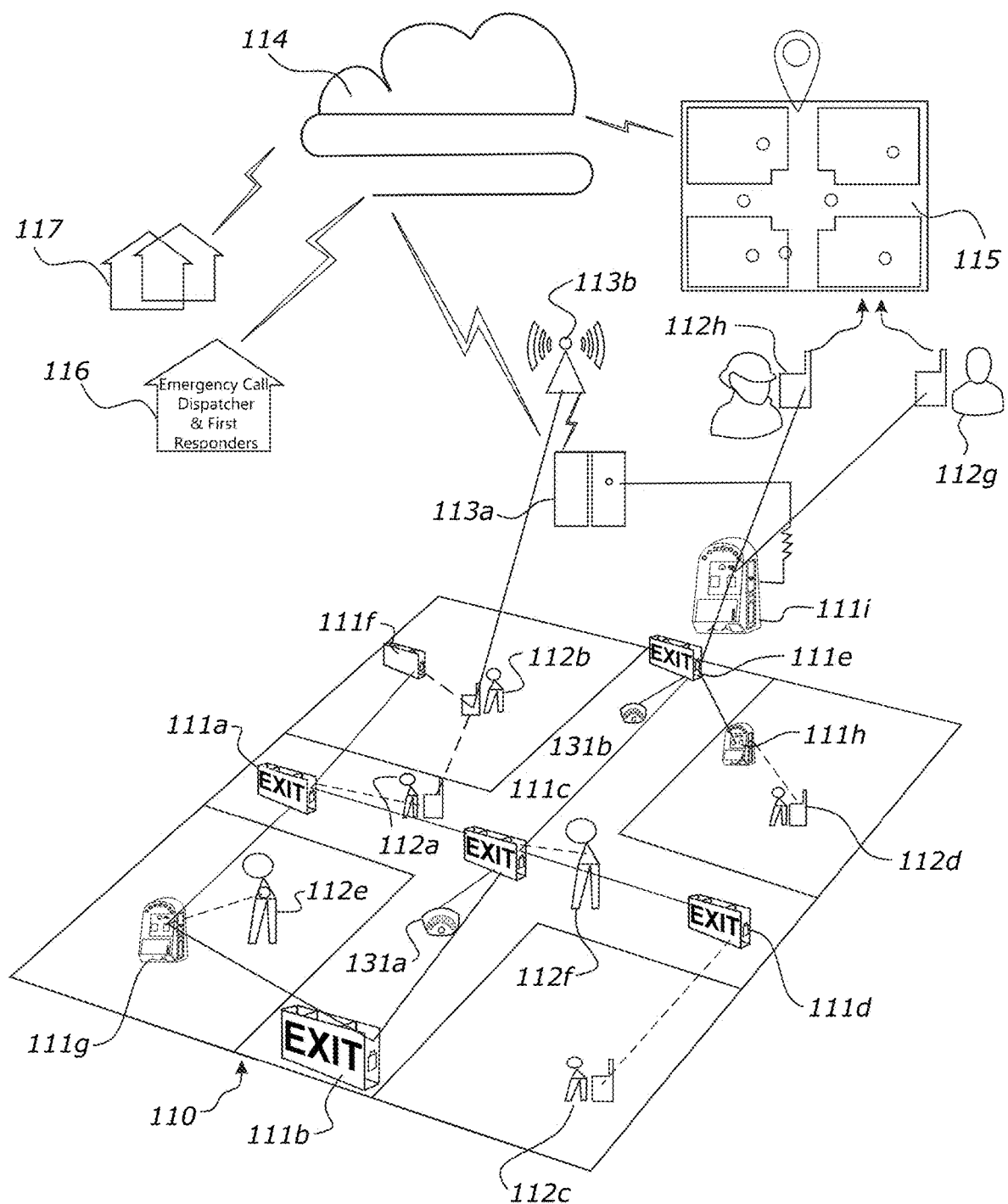
FIG. 23 shows another plan overview of one exemplary use case scenario.

FIG. 23 shows an exemplary scenario in which emergency call dispatchers, emergency first responders 116 and other parties of interest 117 can access data relating to the position of building occupants in a building by accessing the data on their device 112h. Realtime data of detection, position/location of presence of persons may be displayed online and/or offline on devices 112g, h in graphical representations.

In view of the aforementioned possible embodiments of the present invention such as the "facility/fixing location" feature and "black-box" feature, another possible methods of use of the present invention for communication and response during an event (e.g., supporting the end user (person in the building) and/or third parties (e.g., emergency service agencies)) is described below which can be alternative or in addition to those previously described.

The person 11a may initiate a communication (e.g., emergency call) to the third party directly using their device and/or via the network 12 and/or its one or more facilities 11. This can be done using the person's device or any other device available within the premises/building—these include but are not limited to one or more of a mobile phone, a tablet, a laptop, a wearable device, implant devices and a wired device (e.g., landline or Voice over Internet Protocol device).

The third party (e.g., emergency call centre) may respond to this communication with a message or link that may be able to trigger the device (user equipment, UE) of the person 11a to communicate with the network 12 (or other internet networks) and/or its one or more facilities 11, to e.g., acquire preset data that indicates the location/position of the caller/person 11a, in order to enable and/or obtain desired civic addresses. This message or link may also be communicated to the device/UE automatically once the initial communication from the person 11a has been sent.

The desired civic addresses may be that of one or more of the facilities 11 such as luminaire modules/nodes, wired device, fire panel etc. and/or the black box that is an independent device or may integrates into a facility 11. Moreover, the desire civic addresses may comprise the location of one or more facilities 11 in proximity to the person 11a. The civic addresses may be obtained from a local or cloud database for use by the third party.

The device of the person and/or network 12 and/or its one or more facilities/nodes 11 may be configured to transmit the desired civic addresses to the third party via one or more of the local internet network accesses, the one or more black boxes, (i.e., the local back-up database) and the cloud database. In circumstances where there is no access to the local and/or cloud databases and/or the local internet network access, the one or more black-boxes are still able to transmit the data for the desired civic addresses, as well as the records of communication (e.g., SOS alerts) and movements of persons/occupants 11a within a specific timeframe and/or period to the third party.

Some Preferred Features

Preferably parameters of the Bluetooth transceiver and/or beacon transmitter may contain the horizontal and vertical address information of the facility/fixing deployed in the building.

Preferably, the Bluetooth transceiver and/or beacon transmitter may be integrated in the above-mentioned detection and/or position module; and/or coupled to the UPS individually using Universal Serial Bus protocols.

Preferably the person's detection and/or positioning component comprises one or more components being one or more of: motion detector using PIR and or heat sensor and the like.

Preferably the controller can facilitate Bluetooth beacon mesh networking communications, and communications with environment sensors, such as thermostat for temperature/humidity, occupancy lighting switches in a building, as well as other emergency sensor devices deployed in a building, such as smoke detector, fire alarm, fire sprinklers, that may also use Bluetooth mesh networking protocols.

Preferably the controller can detect a person and/or determine the location of a person in a building, collect real time information, and/or communicate the detection and/or location of the person to the system's internet server, as well as a third party (e.g. inside and/or outside the building), such as emergency services. It can do this using an external internet connectivity access point of either an existing wired and wireless communication connectivity in the building, such as optical fiber and fixed wireless and communication satellite internet service, and the like installed at the premises; or a communications gateway router integrated with the apparatus; and/or alert caller's mobile cellular online connectivity device, such as a smart cellular mobile phone.

Preferably, the controller can control the uninterruptible power supply at two stages, wherein the first stage power supply is the power supplier for supporting emergency lighting and online network communications, detection, position/locations; the second stage power supply is the power supplier for supporting offline network communications, detection, position/locations.

Preferably the controller can activate an alert on persons, either by responding to alert person's mobile communication device, or, by detecting presence of person in an event.

An alert could be, but is not limited to, those issued by persons' mobile communication devices, such as smart phone, smart watch and wearable, phablet, tablet and laptop computer; or, persons and occupants detected and positioned by the invention apparatus and system in emergency; and/or an abnormal change of physical environmental data collected and reported by the invention apparatus network.

The network of such can be controlled to: trigger the lighting modules to illuminate upon power outages, and/or warning lighting at responding to an activation event; utilise the person's detection and/or position module to detect presence of persons and/or determining their positions and their devices in the building, wherein, the beacon transmitters continuously transmit radio signals intermittently to reach persons mobile devices at variable distances within the networked beacons' effective propagation range in the building.

All mobile devices in best radio propagation range of the beacon transmitters may be detected by scanning for these radio waves when issuing alerts, which are requests in radio signal issued by alert mobile communication devices in response to the scanning of the beacon transmitters' transmission power value in RSSI; facilitate communication via the communications modules, and/or utilize the persons detection and/or position module to detect a person in a building and/or determining the position of a person in the building.

The luminaire can form a backbone infrastructure of emergency lighting local area network in plural numbers in a building, such as a high-rise, wherein, such network can be either joined by adding virtually unlimited number of the luminaire, and peripheral devices such as internet access and mobile device power backup. It might also be combined with smoke detectors, fire alarms, thermostats, fire sprinklers, occupancy lighting switches, security cameras and so on, all of which may be following the same networking protocols used by the luminaire. It may be scaled up beyond the building in network connection with other buildings from one building to another building.

The invention claimed is:

1. A location detection system for use in assisting one or more persons in a building during an event, the system comprising a network of one or more facilities, installed in the building and powered by AC mains power supply, at least one of the one or more facilities being configured to record, store and/or provide building data, the building data comprising history of activities in the building and a civic address of the one or more facilities, each of the one or more facilities comprising:
   a civic address;
   at least one communications component;
   at least one position detecting component; and
   an uninterruptible power supply in or coupled to the one or more facilities, wherein the uninterruptible power supply is configured to operate in a first mode of operation for a first period of time and operate in a second mode of operation for a second period of time;
   wherein, upon the presence of the event being indicated or triggered, wherein the event comprises building losing power and/or internet access, the at least one of the one or more facilities is configured to:
   operate as a gateway and/or access point of the network; and/or
   to permit third party access to the network and/or the building,
   wherein the system is configured to:
   detect and store the location of one or more devices of the one or more persons using the at least one position detecting component;
   obtain and store the civic address of each of the one or more facilities in proximity to the one or more devices of each of the one or more persons; and
   communicate the obtained civic address(es) and the location of one or more devices of the one or more person to the one or more devices of the one or more persons and to a third party using the at least one communications component,
   wherein the one or more devices of the one or more persons is able to communicate with the third party via the network of the one or more facilities, the one or more facilities comprise a luminaire, the luminaire comprising one or more of: one or more light receiving portions; at least one lighting element; at least one communication component; at least one position detecting component; at least one controller; and the uninterruptible power supply in or coupled to the luminaire to power the at least one lighting element, the at least communication component, the at least position detecting component and/or the at least one controller in the absence of a mains power supply, wherein: each of the one or more light receiving portions being configured to securably receive a lighting module or light bulb.

2. The location detection system of claim 1, wherein the one or more devices of the one or more persons are configured to initiate a connection with each of the one or more facilities in proximity to the one or more devices, to at least obtain the civic address of the one or more facilities in proximity to the one or more devices.

3. The location detection system of claim 1, comprising one or more databases configured to record, store and/or provide the civic address of the one or more facilities when requested.

4. The location detection system of claim 3, wherein the one or more databases comprise a cloud database and/or a back-up local database.

5. The location detection system of claim 1, wherein the one or more facilities further comprise one or more of:
light socket(s);
switch(es)
fire panel(s);
smoke detector(s)/alarm(s);
burglar alarm(s);
speaker(s) and/or video camera(s);
access control/lock(s);
electronic doorbell(s);
window control/louvers, and
home and office equipment.

6. The location detection system of claim 1, wherein the one or more devices of the one or more persons comprise one or more of personal devices and/or wearable devices, wherein optionally, the one or more devices are configured to co-operate with the one or more facilities of the network to monitor the health conditions and/or indicators of the one or more persons.

7. The location detection system of claim 1, wherein the one or more light receiving portions comprise a socket.

8. The location detection system of claim 1, comprising a main body comprising or enclosing one or more of the at least one lighting element, at least communication component, the at least one position detecting component, the at least one controller and uninterruptible power supply.

9. The location detection system of claim 1 wherein the luminaire further comprising one or more of: at least one connector portion; at least one emergency lighting element; and the uninterruptible power supply in or coupled to the luminaire to power the at least one connector portion and/or the at least one emergency lighting element, in the absence of the mains power supply, wherein each of the at least one connector portion is configured to be securably received in a cooperating portion.

10. The location detection system of claim 9 wherein the luminaire further comprises a housing comprising one or more of the at least one connector portion, and the uninterruptible power supply, wherein the housing comprises a connector portion for connecting to the cooperating portion.

* * * * *